(12) United States Patent
Fujisawa

(10) Patent No.: US 6,324,084 B1
(45) Date of Patent: Nov. 27, 2001

(54) POWER SUPPLY DEVICE, POWER SUPPLY METHOD, PORTABLE ELECTRONICS APPARATUS, AND ELECTRONIC TIMEPIECE

(75) Inventor: Teruhiko Fujisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/601,482

(22) PCT Filed: Dec. 1, 1999

(86) PCT No.: PCT/JP99/06730

§ 371 Date: Aug. 1, 2000

§ 102(e) Date: Aug. 1, 2000

(87) PCT Pub. No.: WO00/33454

PCT Pub. Date: Jun. 8, 2000

(30) Foreign Application Priority Data

Dec. 2, 1998 (JP) .................................................. 10-343377
Dec. 14, 1998 (JP) .................................................. 10-375322

(51) Int. Cl.⁷ ............................. H02M 7/217; H02M 5/42
(52) U.S. Cl. ............................................. 363/127; 363/89
(58) Field of Search .................................. 363/127, 125, 363/89, 84, 44, 53

(56) References Cited

U.S. PATENT DOCUMENTS

| | | | |
|---|---|---|---|
| 3,665,221 | * 5/1972 | Wickliff | 307/255 |
| 3,930,196 | * 12/1975 | Park et al. | 307/254 |
| 4,307,305 | * 12/1981 | Morris | 307/261 |
| 4,562,814 | * 1/1986 | Miura et al. | 328/26 |
| 4,571,502 | * 2/1986 | Kimura et al. | 307/262 |
| 4,590,547 | * 5/1986 | Goinga | 363/127 |
| 4,748,342 | * 5/1988 | Dijkmans | 307/66 |
| 4,777,580 | * 10/1988 | Bingham | 363/127 |
| 4,875,151 | * 10/1989 | Ellsworth et al. | 363/127 |
| 5,510,972 | * 4/1996 | Wong | 363/127 |

FOREIGN PATENT DOCUMENTS

| | | | |
|---|---|---|---|
| WO98/21815 | 5/1998 | (JP) | H02M/7/21 |
| WO 85/01161 | 3/1985 | (WO) | H02M/7/217 |

* cited by examiner

Primary Examiner—Peter S. Wong
Assistant Examiner—Bao Q. Vu

(57) ABSTRACT

In a rectifier circuit that rectifies an alternating current voltage generated by a generator and supplies the alternating current voltage to a capacitor as a power storage unit, a plurality of level shifters supplies a voltage level-shifted by an offset voltage to respective comparators when the comparators corresponding to transistors perform an on-and-off control, based on voltages across terminals of each of a plurality of transistors forming the rectifier circuit. The offset voltage is set accounting for a response delay time of each comparator. Each transistor is reliably turned off at the time the transistor should be turned off in relation to the voltage across the output terminals of the generator. As a result, a reverse current from the capacitor is thus prevented. A delay in the timing of turning off each transistor is eliminated.

32 Claims, 27 Drawing Sheets

POWER SUPPLY DEVICE, POWER SUPPLY METHOD, PORTABLE ELECTRONICS APPARATUS, AND ELECTRONIC TIMEPIECE

DESCRIPTION

1. Technical Field

The present invention relates to a power supplying device and a power supplying method for efficiently rectifying generated alternating power and for supplying the rectified voltage as power, and portable electronic equipment and an electronic timepiece, each incorporating the power supplying device.

2. Background Art

With a generator built in, small portable electronic equipment, such as a wristwatch, is always ready to be operative, requiring no troublesome battery replacement. If the power generated by the generator is an alternating-current power, the use of a diode bridge circuit as a rectifier circuit is contemplated. However, since the diode bridge circuit creates a loss due to a voltage drop through two diodes, the diode bridge circuit is not appropriate for use with the generator for the compact portable electronic equipment, i.e., not appropriate as a rectifier for use with the generator that generates a small-amplitude alternating-current voltage.

To cope with this problem, a rectifier circuit has been proposed having, instead of the four diodes, four uni-direction units, each permitting a current to flow in one direction only (Japanese Unexamined Patent Application Publication No. 9-131064).

The uni-direction unit has two terminals so that a current flows from one terminal to the other terminal when the voltage at one terminal rises above the voltage at the other terminal and that no current flows when the voltage at the one terminal drops below the voltage at the other terminal.

In this case, each uni-direction unit includes a comparator and a P-channel or an N-channel field-effect transistor.

A current, rectified through a rectifier circuit, charges a power storage unit such as a capacitor, and power is supplied to a load. In this arrangement, an alternating current generated across output terminals of a generator is full-wave rectified, and because of the use of active elements, there occurs no loss due to a voltage drop in full-wave rectification. Even if a generator 100 generates a small-amplitude alternating current, the load is driven by the charged power source (capacitor) or directly by the rectified current.

The uni-direction unit allows a current to flow in one direction depending on the voltage across both terminals, and the comparator for comparing the terminal voltages suffers from a response delay time from the magnitude inversion of the terminal voltages to the reflection of the result of the transition in the output signal thereof.

The response delay time of the comparator, typically constructed of a MOS transistor, is proportional to "Cg/Iop", where Cg represents a gate capacitance of the output transistor, and Iop represents an operating current of the comparator. In other words, the response delay time and the current consumption are mutually inversely proportional. In an electronic timepiece, operated from power from a built-in generator, no large generated power is obtained because the size of the generator is limited by the space availability of an electronic timepiece. To meet available power, low power consumption design is implemented in the circuit of the electronic timepiece.

In the comparator constituting the above-referenced uni-direction unit, low current consumption design is implemented, and the operating current Iop needs to be minimized, and the response delay time of the comparator tends to increase.

For this reason, a rectifying transistor is turned on while the rectifying transistor should be turned off, allowing a current to reversely flow.

A surge current flows out of a capacitor in response to the reverse flow of current, and damages the capacitor.

Since the reverse flow of current adds impulsive noise to power source voltage, the load operated from the supply of the power source voltage is subject to erratic operations.

If the response delay time of the comparator is too long, the timing of charging the capacitor by controlling the uni-direction unit is delayed from the timing the generated voltage of the generator in the phase of the generated voltage.

As a result, the capacitor is charged for only a duration throughout which the amplitude of the generated voltage of the generator is greater than the voltage difference between a high potential voltage and a low potential voltage, and a chargeable duration is shortened, and rectification efficiency drops.

If the operating current of the comparator constituting the uni-direction unit is increased, the response delay time is shortened. But this raises a new problem that power is consumed by the comparator itself, lowering the efficiency of the power supplying device.

It is a first object of the present invention to provide a power supplying device and a power supplying method for preventing a reverse flow of current due to a delay time of a uni-direction unit, and portable electronic equipment and an electronic timepiece, each incorporating the power supplying device.

It is a second object of the present invention to provide a power supplying device and a power supplying method for efficiently rectifying generated alternating current power and supplying the rectified power, and portable electronic equipment and an electronic timepiece, each incorporating the power supplying device.

DISCLOSURE OF THE INVENTION

The present invention in a first aspect lies in a power supplying device for rectifying an alternating current voltage to supply power to a first power source line and a second power source line, including a uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, the power supplying device including a storage unit for storing power, arranged between the first power source line and the second power source line, wherein the uni-direction unit starts an operation for turning off the switching unit with a duration in advance, corresponding to a response delay time.

In the present invention in a second aspect, in the power supplying device in accordance with the first aspect, the uni-direction unit turns off the switching unit when the voltage level at the one terminal drops below a voltage level which is the sum of the voltage at the other terminal and a predetermined voltage.

The present invention in a third aspect lies in a power supplying device for rectifying an alternating current voltage to supply power to a first power source line and a second power source line, including a plurality of uni-direction units, each uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, and a storage unit for storing power, arranged between the first power source line and the second power source line, wherein one terminal of a first uni-direction unit is connected to a first input terminal to which the alternating current voltage is supplied, the other terminal of the first uni-direction unit is connected to the first power source line, one terminal of a second uni-direction unit is connected to a second input terminal to which the alternating current voltage is supplied, the other terminal of the second uni-direction unit is connected to the first power source line, one terminal of a third uni-direction unit is connected to the second power source line, the other terminal of the third uni-direction unit is connected to the first input terminal, one terminal of a fourth uni-direction unit is connected to the second power source line, the other terminal of the fourth uni-direction unit is connected to the second input terminal, and at least two of the four uni-direction units start an operation for turning off the switching unit with a duration in advance, corresponding to a response delay time.

In a fourth aspect of the present invention, in the power supplying device in accordance with the second aspect, at least two of the four uni-direction units turn off the respective switching units when the voltage at the one terminal drops below a voltage level which is the sum of the voltage at the other terminal and a predetermined voltage.

The present invention in a fifth aspect lies in a power supplying device which includes a plurality of uni-direction units, each uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, a first storage unit with one terminal thereof connected to a first input terminal to which an alternating current voltage is supplied, and a second storage unit with one terminal thereof connected to a second input terminal to which the alternating current voltage is supplied, wherein one terminal of a first uni-direction unit is connected to the other terminal of the first storage unit, the other terminal of the first uni-direction unit is connected to the first input terminal to which the alternating current voltage is supplied, one terminal of a second uni-direction unit is connected to the other terminal of the second storage unit, and the other terminal of the second uni-direction unit is connected to the other terminal of the first storage unit, and the first and second uni-direction units start a operation for turning off the respective switching unit with a duration in advance, corresponding to a response delay time.

In a sixth aspect of the present invention, in the power supplying device in accordance with the fifth aspect, the first and second uni-direction units turn off the respective switching unit when the voltage level at the one terminal drops below a voltage level which is the sum of the voltage at the other terminal and a predetermined voltage.

The present invention in a seventh aspect lies in a power supplying device in accordance with the first aspect, for full-wave rectifying an alternating current voltage supplied to the two terminals to supply power to the first power source line and the second power source line, including a first switching unit connected between a first input terminal and the first power source line, a second switching unit connected between a second input terminal and the first power source line, a first unit, connected between the first input terminal and the second power source line, for allowing a current to flow in one direction only, a second unit, connected between the second input terminal and the second power source line, for allowing a current to flow in one direction only, a first comparator for comparing a voltage at the first input terminal with a voltage at the first power source line, a second comparator for comparing a voltage at the second input terminal with the voltage at the first power source line, a first controller which controls the first switching unit for an on-and-off operation in response to the comparison result provided by the first comparator, while forcing the first switching unit to turn off in response to the voltage at the second input terminal even when the comparison result provided by the first comparator indicates that the first switching unit is turned on, and a second controller which controls the second switching unit for an on-and-off operation in response to the comparison result provided by the second comparator, while forcing the second switching unit to turn off in response to the voltage at the second input terminal even when the comparison result provided by the second comparator indicates that the second switching unit is turned on.

The present invention in an eighth aspect lies in a power supplying device in accordance with to the first aspect, including a diode connected in parallel with the switching unit.

In a ninth aspect of the present invention, in a power supplying device in accordance with the first aspect, the switching unit is a field-effect transistor.

In a tenth aspect of the present invention, in a power supplying device in accordance with the eighth aspect, the switching unit is a field-effect transistor while the diode is a parasitic diode of the field-effect transistor.

In an eleventh aspect of the present invention, in a power supplying device in accordance with the first aspect, the uni-direction unit is integrated on a semiconductor substrate.

In a twelfth aspect of the present invention, in a power supplying device in accordance with the seventh aspect, the first controller includes a first detector unit for detecting that a voltage difference between the second input terminal and the first power source line becomes larger than a predetermined reference value, and a first control unit which controls the first switching unit for an on-and-off operation in response to the comparison result provided by the first comparator, while forcing the first switching unit to turn off in response to the detection result provided by the first detector unit even when the comparison result provided by the first comparator indicates that the first switching unit is turned on, and the second controller includes a second detector unit for detecting that a voltage difference between the first input terminal and the first power source line becomes larger than a predetermined reference value, and a second control unit which controls the second switching unit for an on-and-off operation in response to the comparison result provided by the second comparator, while forcing the second switching unit to turn off in response to the detection result provided by the detector unit even when the comparison result provided by the second comparator indicates that the second switching unit is turned on.

In a thirteenth aspect of the present invention, in a power supplying device in accordance with the seventh aspect, the first unit is a third switching unit that is controlled for an on-and-off operation in response to the voltage at the first input terminal, and the second unit is a fourth switching unit that is controlled for an on-and-off operation in response to the voltage at the second input terminal.

The present invention in a fourteenth aspect lies in a power supplying device in accordance with the seventh aspect, including a first detector unit for detecting that a voltage difference between the second input terminal and the first power source line is larger than a predetermined reference value, and a second detector unit for detecting that a voltage difference between the first input terminal and the first power source line is larger than a predetermined reference value, wherein the first comparator and the second comparator are supplied with power when the first detector unit or the second detector unit detects the voltage difference larger than the predetermined reference value.

The present invention in a fifteenth aspect lies in a power supplying device in accordance with the third aspect, including a first diode connected in parallel with the first switching unit, a second diode connected in parallel with the second switching unit, a third diode connected in parallel with the third switching unit, and a fourth diode connected in parallel with the fourth switching unit.

In a sixteenth aspect of the present invention, in a power supplying device in accordance with the third aspect, the first through fourth switching units are respectively field-effect transistors.

In a seventeenth aspect of the present invention, in a power supplying device in accordance with the fifteenth aspect, the first through fourth switching units are respectively field-effect transistors, and the first and second diodes are respectively parasitic diodes of the first and second field-effect transistors.

The present invention in an eighteenth aspect lies in a power supplying device in accordance with the third aspect, for full-wave rectifying an alternating current voltage supplied to the two terminals to supply power to the first power source line and the second power source line, including a first comparator for comparing a voltage at the first input terminal with a voltage at the first power source line, a second comparator for comparing a voltage at the second input terminal with the voltage at the first power source line, a third comparator which compares the voltage at the first input terminal with a voltage at the second power source line and has a response delay time shorter than that of the second comparator, a fourth comparator which compares the voltage at the second input terminal with the voltage at the second power source line, and has a response delay time shorter than that of the first comparator, a first switching unit connected between the first input terminal and the first power source line, a second switching unit connected between the second input terminal and the first power source line, a third switching unit connected between the first input terminal and the second power source line, and controlled for an on-and-off operation in response to the comparison result provided by the third comparator, a fourth switching unit connected between the second input terminal and the second power source line, and controlled for an on-and-off operation in response to the comparison result provided by the fourth comparator, a first controller which controls the first switching unit for an on-and-off operation in response to the comparison result provided by the first comparator, while forcing the first switching unit to turn off when the comparison result provided by the fourth comparator indicates the turning off of the fourth switching unit even when the comparison result provided by the first comparator indicates that the first switching unit is turned on, and a second controller which controls the second switching unit for an on-and-off operation in response to the comparison result provided by the second comparator, while forcing the second switching unit to turn off when the comparison result provided by the third comparator indicates the turning off of the third switching unit even when the comparison result provided by the second comparator indicates that the second switching unit is turned on.

The present invention in a nineteenth aspect lies in a power supplying device in accordance with the eighteenth aspect, including a first detector unit for comparing the voltage at the second input terminal with the voltage at the second power source line, and a second detector unit for comparing the voltage at the first input terminal with the voltage at the first power source line, wherein the first through fourth comparators are supplied with power when one of the first detector unit and the second detector unit detects power generation.

In a twentieth aspect of the present invention, in a power supplying device in accordance with the third aspect, the first through fourth switching units are integrated on a semiconductor substrate.

The present invention in a twenty-first aspect lies in a power supplying device in accordance with to the fifth aspect, including a first diode connected in parallel with the first switching unit, and a second diode connected in parallel with the second switching unit.

In a twenty-second aspect of the present invention, in a power supplying device in accordance with the fifth aspect, the first and second switching units are respectively field-effect transistors.

In a twenty-third aspect of the present invention, in a power supplying device in accordance with the twenty-first aspect, the first and second switching units are respectively field-effect transistors and the first and second diodes are parasitic diodes of the respective field-effect transistors.

In a twenty-fourth aspect of the present invention, in a power supplying device in accordance with the fifth aspect, the first and second switching unit and the first and second control units are integrated on a semiconductor substrate.

The present invention in a twenty-fifth aspect in a power supplying device in accordance with one of the first, third, and fifth aspects, including an alternating current voltage generator unit for supplying the alternating current voltage.

The present invention in a twenty-sixth aspect lies in a power supplying method for a power supplying device for rectifying an alternating current voltage to supply power to a first power source line and a second power source line, the power supplying device including a plurality of uni-direction units, each uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, and a storage unit, for storing power, arranged between the first power source line and the second power source line, wherein an operation for turning off the switching unit is started with a duration in advance, corresponding to a response delay time.

The present invention in a twenty-seventh aspect lies in a power supplying method for a power supplying device for rectifying an alternating current voltage to supply power to a first power source line and a second power source line, including a plurality of uni-direction units, each uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, and a storage unit for storing power, arranged between the first power source line and the second power source line, wherein one terminal of a first uni-direction unit is connected to a first input terminal to which the alternating current voltage is supplied, the other terminal of the first uni-direction unit is connected to the first power source line, one terminal of a second uni-direction unit is connected to a second input terminal to which the alternating current voltage is supplied, the other terminal of the second uni-direction unit is connected to the first power source line, one terminal of a third uni-direction unit is connected to the second power source line, the other terminal of the third uni-direction unit is connected to the first input terminal, one terminal of a fourth uni-direction unit is connected to the second power source line, the other terminal of the fourth uni-direction unit is connected to the second input terminal, wherein an operation for turning off the switching units of at least two of the four uni-direction units is started with a duration in advance, corresponding to a response delay time.

The present invention in a twenty-eighth aspect lies in a power supplying method for a power supplying device including a plurality of uni-direction units, each uni-direction unit including two terminals, a comparator for comparing terminal voltages at the two terminals, and a switching unit that is controlled for an on-and-off operation in response to the comparison result provided by the comparator, the uni-direction unit allowing a current to flow from one terminal to the other terminal through the switching unit, and a first storage unit with one terminal thereof connected to a first input terminal to which an alternating current voltage is supplied, and a second storage unit with one terminal thereof connected to a second input terminal to which the alternating current voltage is supplied, wherein one terminal of a first uni-direction unit is connected to the other terminal of the first storage unit, the other terminal of the first uni-direction unit is connected to the first input terminal to which the alternating current voltage is supplied, one terminal of a second uni-direction unit is connected to the other terminal of the second storage unit, and the other terminal of the second uni-direction unit is connected to the other terminal of the first storage unit, wherein a operation for turning off the respective switching units for the first and second uni-direction units is started with a duration in advance, corresponding to a response delay time.

The present invention in a twenty-ninth aspect lies in a portable electronic equipment including a power supplying device in accordance with one of the first, third, and fifth aspects, and a processing unit for performing a predetermined process, operated from power supplied by the power supplying device.

In a thirtieth aspect of the present invention in the portable electronic equipment in accordance with the twenty-ninth aspect, at least a portion of the processing unit is integrated on a semiconductor substrate.

The present invention in a thirty-first aspect lies in an electronic timepiece including a power supplying device in accordance with one of the first, third, and fifth aspects, and a time measurement unit for performing a time measurement operation, operated from power supplied by the power supplying device.

In a thirty-second aspect of the present invention, in an electronic timepiece in accordance with the thirty-first aspect, at least a portion of the time measurement unit is integrated on a semiconductor substrate.

BEST MODE FOR CARRYING OUT THE INVENTION

Figure 1:
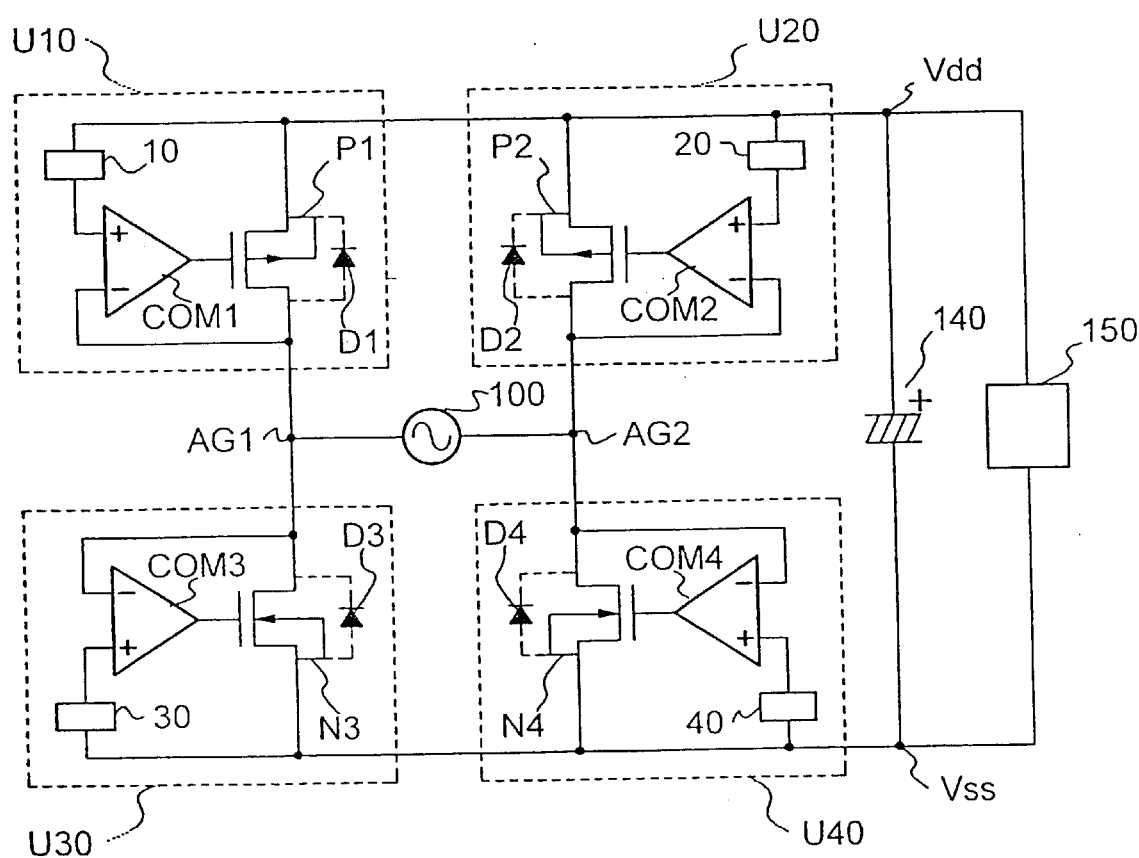
FIG. 1 is a circuit diagram showing the construction of the power supplying device of a first embodiment of the present invention.

The best mode for carrying out the present invention is now discussed, referring to the drawings.

1 First Embodiment
[1.1] Technical field of a first embodiment (–a fourth embodiment)

To help understand a first embodiment (–a fourth embodiment) to be discussed below, the technical field in which the first embodiment (–the fourth embodiment) is implemented is discussed, referring to the drawings.

Figure 15:
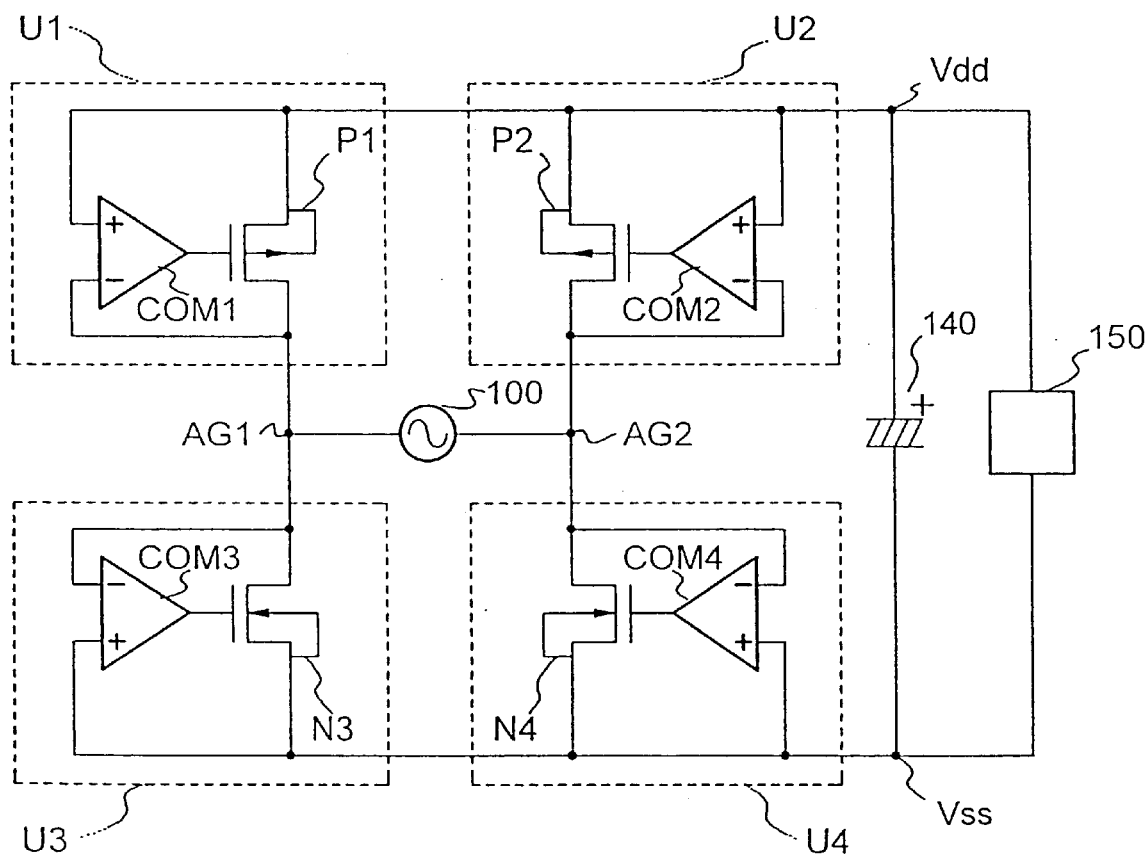
FIG. 15 is a circuit diagram showing the construction of the power supplying device in the technical field in which the first through fourth embodiments are implemented.

FIG. 15 shows a power supplying device having a rectifier circuit which employs four uni-direction units for allowing a current to flow in one direction, instead of four diodes, in the technical field of the first embodiment.

Referring to FIG. 15, one terminal AG1 and the other terminal AG2 of a generator 100 are respectively coupled with a high-potential voltage Vdd via a uni-direction unit U1 and a uni-direction unit U2. The one terminal AG1 and the other terminal AG2 are respectively coupled with a low-potential voltage Vss via a uni-direction unit U3 and a uni-direction unit U4.

The uni-direction unit U1 is composed of a comparator COM1 and a P-channel field-effect transistor P1, uni-direction unit U2 is composed of a comparator COM2 and a P-channel field-effect transistor P2. Further, the uni-direction unit U3 is composed of a comparator COM3 and an N-channel transistor N3, and the uni-direction unit U4 is composed of a comparator COM4 and an N-channel transistor N4.

A capacitor 140 stores the rectified current and a load 150, operated from power from the capacitor 140 as the power source thereof, performs a diversity of processes in electronic equipment. In this arrangement, when the voltage at the terminal AG1 rises above the high-potential voltage Vdd during power generation, the output voltage from the comparator COM1 is driven to a low level, thereby turning on the transistor P1. When the voltage at the terminal AG2 drops below the low-potential voltage Vss during power generation, the output of the comparator COM4 is driven to a high level, turning on the transistor N4. In this way, a current flows in a closed loop of the terminal AG1→transistor P1→capacitor 140→transistor N4→terminal AG2. As a result, the capacitor 140 is charged.

On the other hand, when the voltage level at the terminal AG1 drops below the low-potential voltage Vss and the voltage level at the terminal AG2 rises above the high-potential voltage Vdd, the transistors P2 and N3 are turned on. A current flows in a closed loop of the terminal AG2 transistor P2→capacitor 140→transistor N3→terminal AG1. As a result, the capacitor 140 is charged.

The alternating current generated between the terminals AG1 and AG2 is thus full-wave rectified. There is no loss due to voltage drops in the full-wave rectification, and even when the generator 100 generates a small-amplitude alternating current, the load 150 is operated by the charged capacitor 140 or directly from the rectified current.

Each of the uni-direction units U1–U4 allows a current to flow depending on the voltage across the terminals, and the comparators COM1–COM4 for comparing the terminal voltages suffer from response delay time from the magnitude inversion of the terminal voltages to the reflection of the transition in the output signal thereof.

The response delay time of the comparator, typically constructed of a MOS transistor, is proportional to "Cg/Iop", where Cg represents a gate capacitance of the output transistor, and Iop represents an operating current of the comparator. In other words, the response delay time and the current consumption are mutually inversely proportional. In an electronic timepiece driven from power from a built-in generator, no large generated power is obtained because the size of the generator is limited by the space availability of an electronic timepiece. To meet available power, low current consumption design is implemented in the circuit of the electronic timepiece. In comparators COM1–COM4, low current consumption design is promoted, and the operating current Iop needs to be minimized, and as a result, the response delay time of the comparators COM1–COM4 tends to increase.

Figure 16:
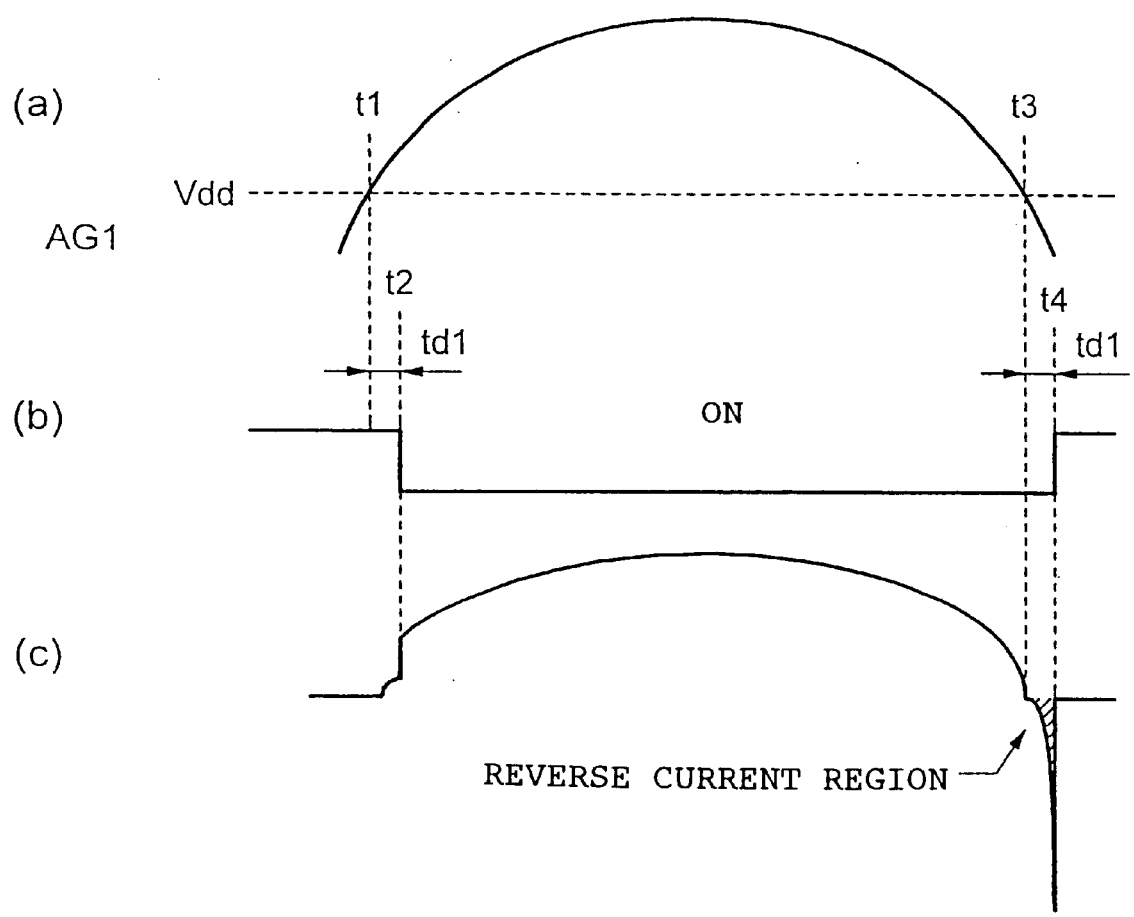
FIG. 16 is a timing diagram explaining the reverse flow of current involved in a delay time of a comparator in the power supplying device of FIG. 15.

For this reason, a rectifying transistor is turned on while the rectifying transistor should be turned off, allowing a current to reversely flow. FIG. 16 is a timing diagram explaining the reverse flow of current involved in the response delay time of the comparator.

Referring to FIG. 16(a), the voltage at the terminal AG1 becomes higher than the high-potential voltage Vdd at time t1, and becomes lower than the high-potential voltage vdd at time t3. In this case, the comparator COM1 of the uni-direction unit U1 feeds the output signal shown in FIG. 16(b) to the transistor P1. The output signal is transitioned from a high level to a low level at time t2, a delay time of td1 after time t1, and is transitioned from a low level to a high level at time t4, a delay time of td1 after time t3.

During the delay time td1, the transistor P1 remains turned on, although the voltage at the terminal AG1 is lower than the high-potential voltage Vdd. The same is true of the uni-direction unit U4, and the N-channel transistor N4 remains turned on during the same delay time.

During this duration of time, a current reversely flows in a closed loop of the capacitor 140→transistor P1→terminal AG1→terminal AG2→transistor N4→capacitor 140.

FIG. 16(c) shows a current flowing through the transistor P1. In this case, the peak of a charging current is 2–3 mA, for instance, but the peak of reverse current reaches 10 mA or so.

If such a surge current flows out of the capacitor 140, the capacitor 140 can be damaged. With the current reversely flowing, impulsive noise is added to the power source voltage, and the load 150, operated from the power from the power source, is subject to erratic operations.

In view of the above problem, the first embodiment has been developed, and it is an object of the present invention to prevent a reverse current involved in the response delay time of the uni-direction unit and to efficiently rectify the generated alternating current to feed power.

[1.2] Construction of the First Embodiment

FIG. 1 is a circuit diagram showing the construction of the power supplying device of the first embodiment of the present invention.

As shown, the power supplying device of this embodiment is different from the power supplying device shown in FIG. 15 in that the uni-direction units U10–U40 replace the uni-direction units U1–U4.

Parasitic diodes D1–D4 of the uni-direction units U10–U40 are embedded when the uni-direction units U10–U40 are integrated. Since in this case, the bulks (bodies) of the transistors P1 and P2 are connected to the high-potential voltage Vdd, the parasitic diodes D1 and D2 of the transistors P1 and P2 are produced in the direction represented by dotted lines. Since the bulks (bodies) of the transistors N3 and N4 are connected to the low-potential voltage Vss, the parasitic diodes D3 and D4 of the transistors N3 and N4 are produced in the direction represented by dotted lines. The directions of the parasitic diodes D1–D4 are arranged to be aligned with the direction of current that flows when each transistor is turned on. In this example, the voltage drop of each of the parasitic diodes D1–D4 is designated by Vf. When the voltage at the terminal AG1 exceeds Vdd+Vf, the parasitic diode D1 is turned on, allowing a current to flow from the terminal AG1 to the capacitor 140. Even if there is a large response delay time in the comparator COM1, the parasitic diode D1 performs a rectification operation.

When a charging current flows through each of the parasitic diodes D1–D4, the parasitic transistor becomes conductive, causing a latchup. The latchup is a phenomenon unique to CMOSs and LSIs, and can be prevented by integrated circuit techniques, such as a guard band and trench isolation.

Figure 2:
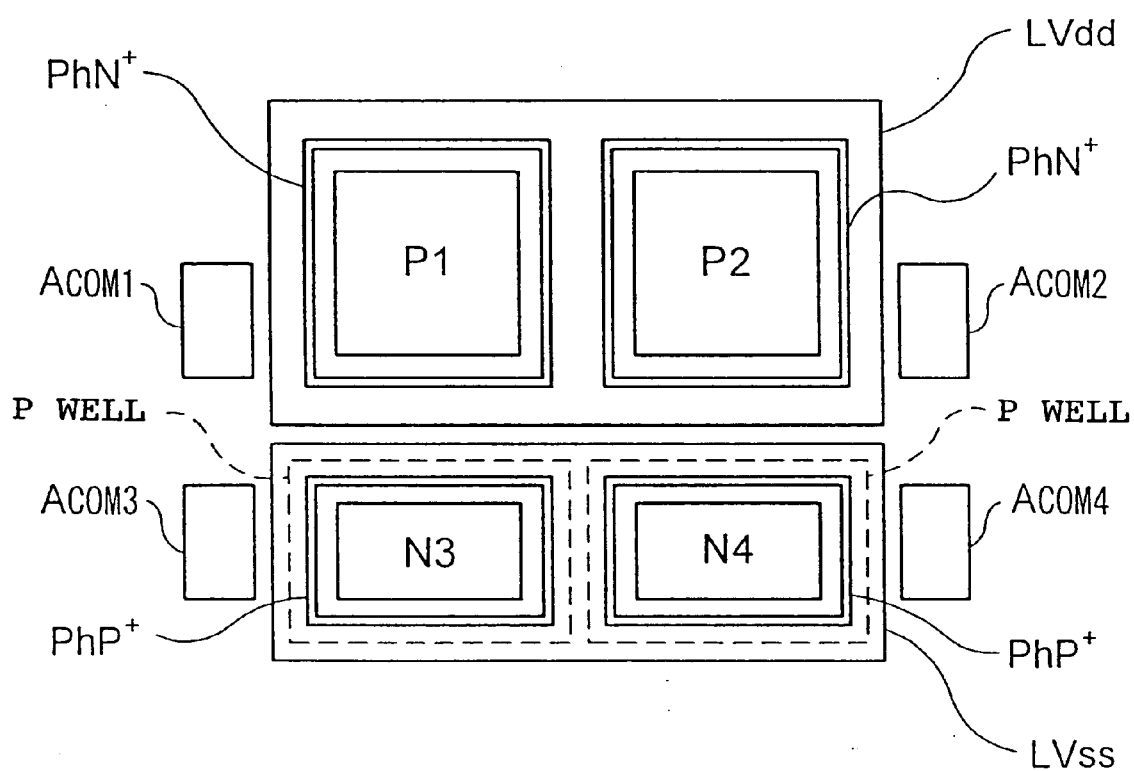
FIG. 2 is a diagram illustrating the layout of a semiconductor substrate of the power supplying device of the first embodiment.

FIG. 2 shows a layout of the power supplying device of FIG. 1 integrated on a semiconductor substrate.

Since the field-effect transistor to be used for rectification application is supplied with voltages in excess of the high-potential voltage Vdd and the low-potential voltage Vss, a consideration needs to given to the latchup.

FIG. 2 shows the power supplying device arranged on an N-type substrate.

An N+ diffusion layer PhN+, surrounding the P-channel transistors P1 and P2, is connected to the high-potential voltage Vdd, and a P+ diffusion layer PhP+ surrounding the N-channel transistors N3 and N4 is connected to the low-potential voltage Vss. These N+ diffusion layer PhN+ and the P+ diffusion layer PhP+ serve as a guard ring, and controls a substrate current that becomes a cause of the latchup.

As a further preventive step for the latchup, the rectifying field-effect transistors of the P-channel transistors P1 and P2 and the N-channel transistors N3 and N4 are thus surrounded by power lines of high-potential voltage wiring LVdd and low-potential voltage wiring LVss, and the elements P1, P2, N3, and N4 are sufficiently spaced apart from each other.

The power supplying device is a bridge circuit, and to reduce variations in rectification performance, the circuit is bilaterally (left-and-right) symmetrically arranged with respect to the center of the terminal AG1 and the terminal AG2 as shown in FIG. 2.

Specifically, an imaginary border line is drawn between the P-channel transistors P1 and P2, or between the N-channel transistors N3 and N4. The P-channel transistor P1 and the N-channel transistor N3 are arranged on the left-hand side, sufficiently spaced apart from the imaginary line, and a mounting area ACOM1 for the comparator COM1 and a mounting area ACOM3 for the comparator COM3 are arranged further apart from the imaginary line.

Arranged opposite to the P-channel transistor P1, the N-channel transistor N3, the mounting area ACOM1 and the mounting area ACOM3 bilaterally symmetrically with respect to the imaginary line are the P-channel transistor P2, the N-channel transistor N4, a mounting area ACOM2 for the comparator COM2 and a mounting area ACOM4 for the comparator COM4.

The reason why the reverse flow of current takes place in the power supplying device shown in FIG. 15 is that the transistors P1, P2, N3, and N4 is turned on in reality due to the response delay time of the comparators COM1–COM4 when these transistors should remain turned off.

When the comparators COM1–COM4 perform the comparison operation in the first embodiment, an offset is given in the input signals to the comparators COM1–COM4 to set a response start timing to be earlier than conventional, so that a comparison result is obtained earlier, given the same response delay time.

Level shifters 10–40 are arranged to give these offsets. The level shifters 10 and 20 respectively shift the output voltages to higher voltage level by offset voltages Voffset1 and Voffset2 relative to the high-potential voltage Vdd, and respectively feed the level-shifted voltages to positive input terminals (+) of the comparators COM1 and COM2.

Furthermore, the level shifters 30 and 40 respectively shift output voltages to lower voltage level by offset voltages Voffset3 and Voffset 4 and respectively feed the level-shifted voltages to positive input terminals (+) of the comparators COM3 and COM4.

The values of voltages Voffset1–Voffset4 respectively generated by the level shifters 10–40 are determined based on the response delay times td1–td4 of the respective comparators COM1–COM4 so that no reverse flow of current takes place. Specifically, the voltages Voffset1–Voffset4 are set to several tens of mV.

The comparator COM1 or COM2 generates the output signal thereof that is transitioned from a low level to a high level immediately prior to the voltage at the terminal AG1 or AG2 dropping below the high-potential voltage Vdd, thereby switching the transistor P1 or P2 from on to off. The comparator COM3 or COM4 generates the output signal thereof that is transitioned from a high level to a low level immediately prior to the voltage at the terminal AG1 or AG2 rising above the low-potential voltage Vss, thereby switching the transistor N3 or N4 from on to off.

Figure 3:
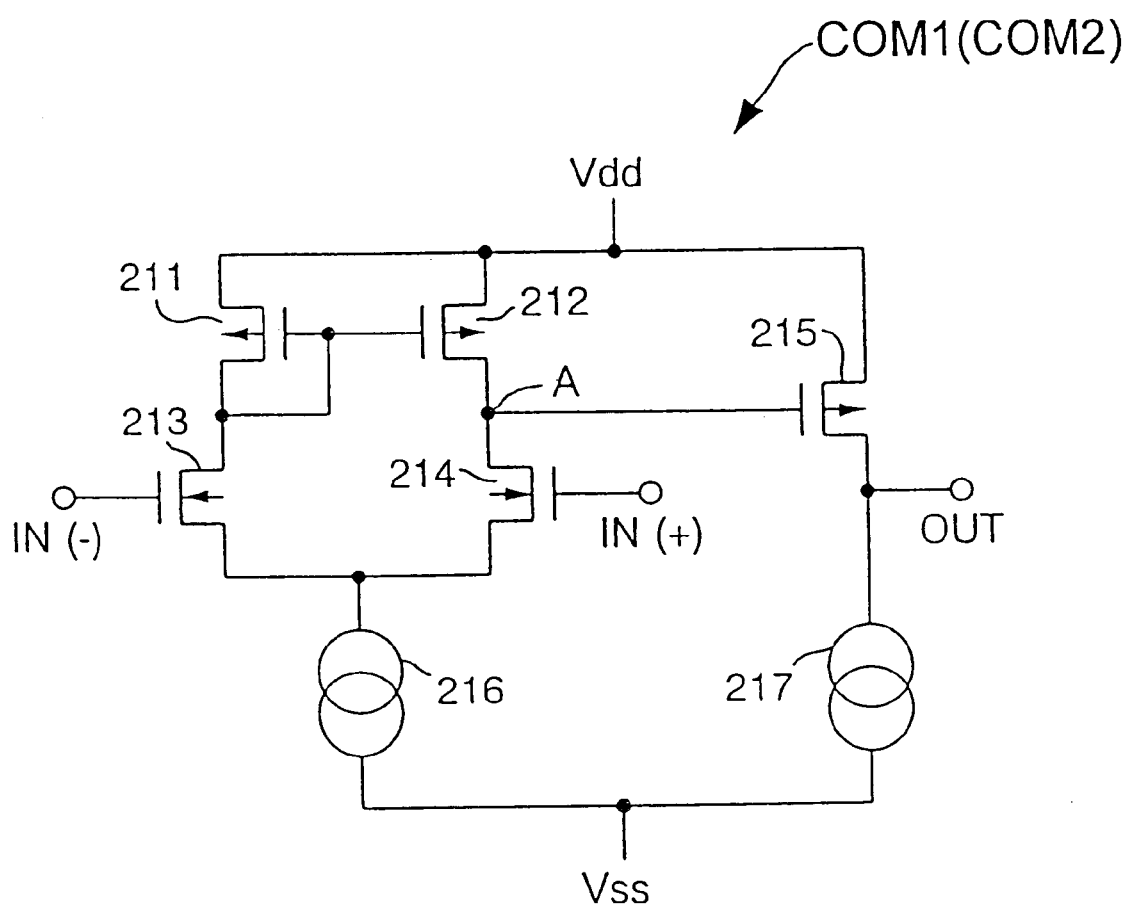
FIG. 3 is a circuit diagram showing one example of comparators COM1 and COM2 in accordance with the first embodiment.

One example of the comparators COM1 and COM2 connected to the high-potential voltage Vdd is now discussed, referring to FIG. 3.

As shown in FIG. 3, each of the comparators COM1 and COM2 includes a pair of load transistors 211 and 212, a pair of input transistors 213 and 214, an output transistor 215, and constant current power sources 216 and 217. The load transistors 211 and 212 and the output transistor 215 are P-channel field-effect transistors, while the input transistors 213 and 214 are N-channel field-effect transistors. The gates of the input transistors 213 and 214 respectively serve as a negative input terminal (−) and a positive input terminal (+) of the comparator COM1 (COM2), while the drain of the output transistor 215 serves as an output terminal OUT.

Since the load transistors 211 and 212 form a current-mirror circuit in this arrangement, input current values to the load transistors 211 and 212 are mutually equal to each other. A difference between currents (voltages) input to the gates of the input transistors 213 and 214 is amplified and appears at a terminal A. Since the transistors 211 and 212, which receive the difference on the way, receive the same current values, the current difference (voltage) is gradually amplified and flows into the gate of the transistor 215.

As a result, the drain voltage at the drain of the transistor 215 serving as the output terminal OUT of the comparator 201 is swung greatly to the high-potential voltage Vdd side when the gate current (voltage) of the transistor 214 at the positive input terminal (+) rises above the gate current (voltage) of the transistor 213 at the negative input terminal (−) by any slight amount, and otherwise, the drain voltage is greatly swung to the low-potential voltage Vss side.

Since the transistors 211 and 212 are used as an active element in the comparator COM1 (COM2), there is no need for resistors, except for the constant current power sources 216 and 217. This arrangement is particularly advantageous in integration efforts.

The response delay time of the comparator, typically constructed of a MOS transistor, is proportional to "Cg/Iop", where Cg represents a gate capacitance of the output transistor, and Iop represents an operating current of the comparator. In other words, the response delay time and the current consumption are mutually inversely proportional. In an electronic timepiece operated from power from a built-in generator, no large generated power is obtained because the size of the generator is limited by the space availability of an electronic timepiece. To meet available power, low current consumption design is implemented in the circuit of the electronic timepiece. In comparators COM1–COM2, low current consumption design is promoted, and the operating current Iop needs to be minimized, and as a result, the response delay time of the comparators COM1–COM2 tends to increase.

The comparators COM1 and COM2 are supplied with voltages level-shifted by the level shifters 10 and 20, and this arrangement allows threshold voltages Vth of the input transistors 213 and 214 to be differentiated in FIG. 3.

Specifically, if the threshold voltage Vth of the transistor 213 on the negative input terminal (−) side is set to be greater than the threshold voltage Vth of the transistor 214 on the positive input terminal (+) side, the function and effect comparable to the function and effect of the level shifters 10 and 20 shown in FIG. 1 can be achieved.

By making the transistor sizes different, the threshold voltages Vth of the input transistors 213 and 214 are differentiated. More specifically, by setting the gate width of the input transistor 213 to be narrower than the gate width of the input transistor 214, the threshold voltage Vth of the input transistor 213 is increased. The threshold voltages Vth of the input transistors 213 and 214 are also differentiated through manufacturing process such as implantation of impurity.

Figure 4:
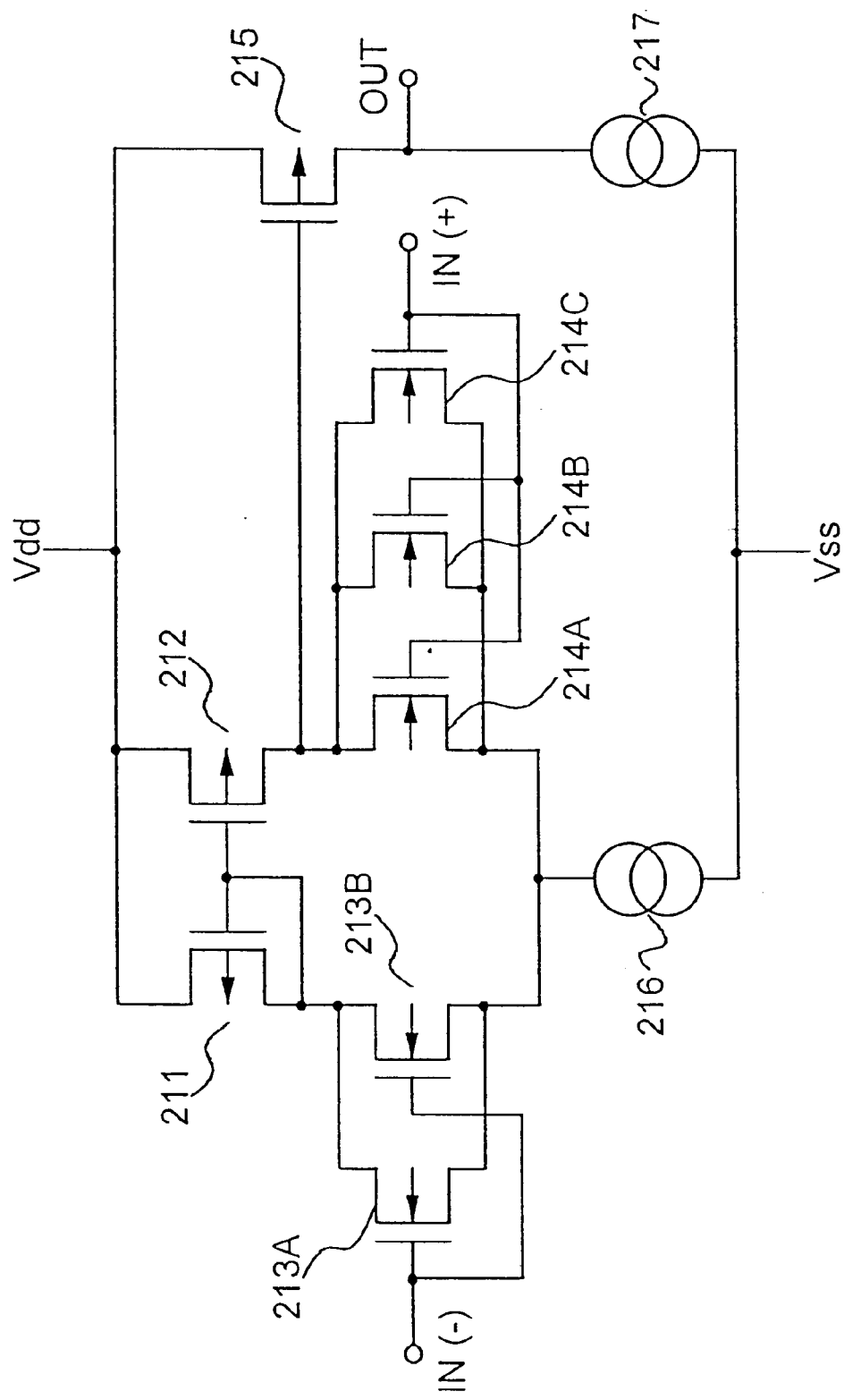
FIG. 4 is a circuit diagram of a circuit in which differential pair transistors configured by connecting identical transistors having identical sizes in parallel form a circuit equivalent to that constructed of transistors having different sizes.

Referring to FIG. 4, a circuit equivalent to the circuit of the transistor 213 or 214 is produced by connecting several transistors having an identical size and identical performance in parallel. Specifically, instead of the transistor 213, two transistors 213A and 213B having identical sizes and identical performance are connected in parallel, and instead of the transistor 214, transistors 214A, 214B, and 214C having identical sizes and identical performance are connected in parallel.

In this arrangement, the performance of the differential pair of transistors becomes higher at the positive input terminal (+), and the terminal voltage at the negative input terminal (−) must be higher than the terminal voltage at the positive input terminal (+) to turn on the transistors 214A, 214B, and 214C and to invert the comparator output.

In the detection operation by the comparator with respect to the positive input terminal (+), the high-potential voltage Vdd is input to the positive input terminal (+), and the comparator is inverted to output an "L" level only when a voltage higher than the voltage Vdd by a voltage α, namely, Vdd+α, is fed to the negative input terminal (−).

Figure 5:
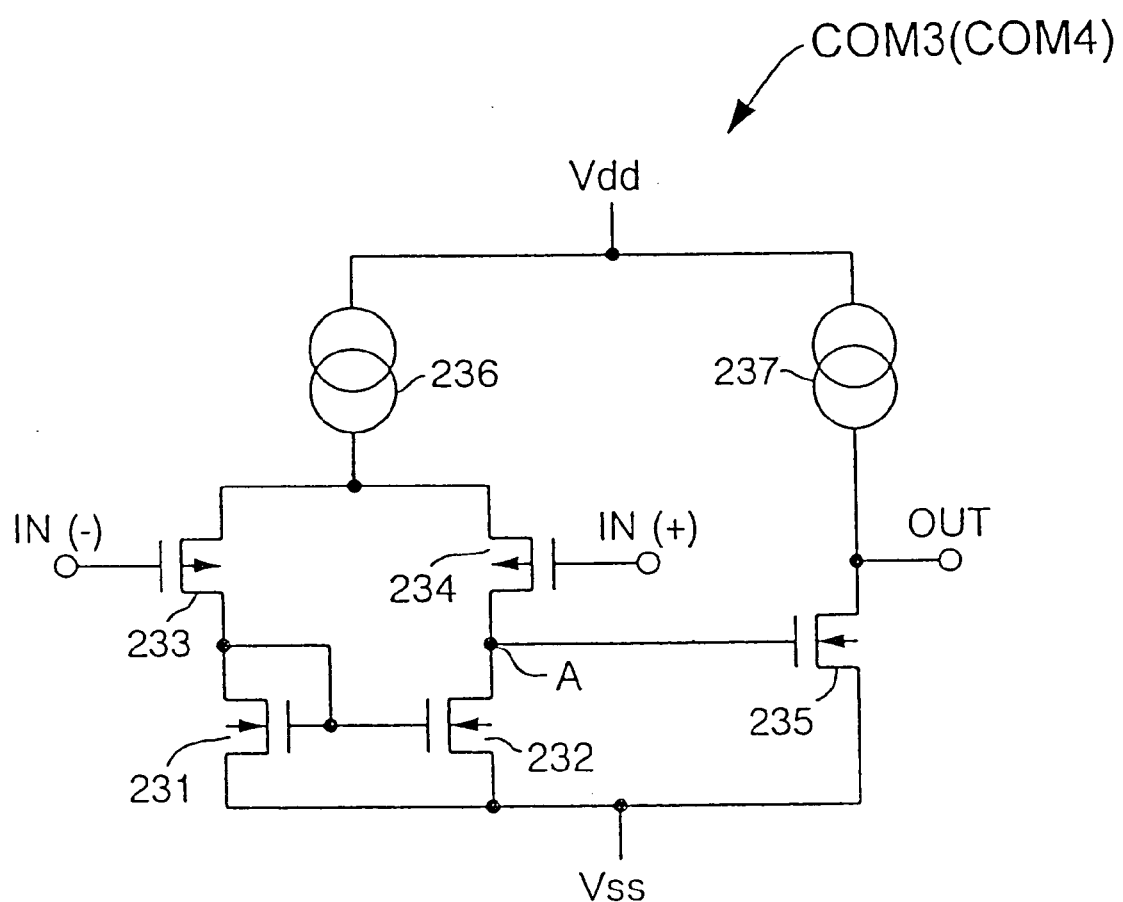
FIG. 5 is a circuit diagram showing one example of comparators COM3 and COM4 in the first embodiment.

One example of the comparators COM3 and COM4 connected to the low-potential voltage Vss is now discussed, referring to FIG. 5.

As shown, the comparator COM3 (COM4) includes a pair of load transistors 231 and 232, a pair of input transistors 233 and 234, an output transistor 235, and constant current power sources 236 and 237. The load transistors 231 and 232 and the output transistor 235 are N-channel field-effect transistors, while the input transistors 233 and 234 are P-channel field-effect transistors. The gates of the input transistors 233 and 234 respectively serve as the negative input terminal (−) and the positive input terminal (+) of the comparator COM3 (COM4), while the source of the output transistor 235 serves as the output terminal OUT.

In this way, the comparator COM3 (COM4) is arranged in a polarity configuration entirely opposite to that of the comparator COM1 (COM2) coupled to the high-potential voltage Vdd (see FIG. 3). As in the comparator COM1 (COM2), the threshold voltages Vth of the input transistors 233 and 234 are differentiated in the comparator COM3 (COM4), and the level shifters 30 and 40 are thus intrinsically implemented.

Specifically, by setting the threshold value Vth of the transistor 233 on the negative input terminal (−) side to be greater than that of the transistor 234 on the positive input terminal (+) side, the function and effect identical to the function and effect of the level shifters 30 and 40 shown in FIG. 1 can be achieved. The method of differentiating the threshold voltages Vth of the input transistors 233 and 234 remains unchanged from that for the comparator COM1 (COM2).

[1.3] Operation of the First Embodiment

The operation of the power supplying device of the present embodiment is now discussed. In this embodiment, it is assumed that the response delay time of each of the comparators COM1–COM4 is equal to td, that the offset voltage Voffset of the each of the level shifters 10–40 is set to several mV, and that the voltage drop through each of the transistors P1, P2, N3, and N4 is equally Von.

In the power supplying device of this embodiment, the uni-direction units U10 and U40 are symmetrically arranged to the uni-direction units U20 and U30. The operation of the uni-direction units U20 and U30 with the voltage at the terminal AG2 larger than the voltage at the terminal AG1 is identical to that of the uni-direction units U10 and U40 with the voltage at the terminal AG1 larger than the voltage at the terminal AG2. The operation with the voltage at the terminal AG1 larger than the voltage at the terminal AG2 is discussed. The operation of the opposite case is also identical, and the discussion thereabout is omitted here.

The above-discussed offset voltage Voffset is determined depending on the response delay time td. Therefore, the offset voltage Voffset becomes greater than the voltage drop Von in some cases and becomes smaller than the voltage drop Von in other cases. Both cases are separately discussed.

[1.3.1] Offset Voltage Smaller than the Voltage Drop of the Transistor

Figure 6:
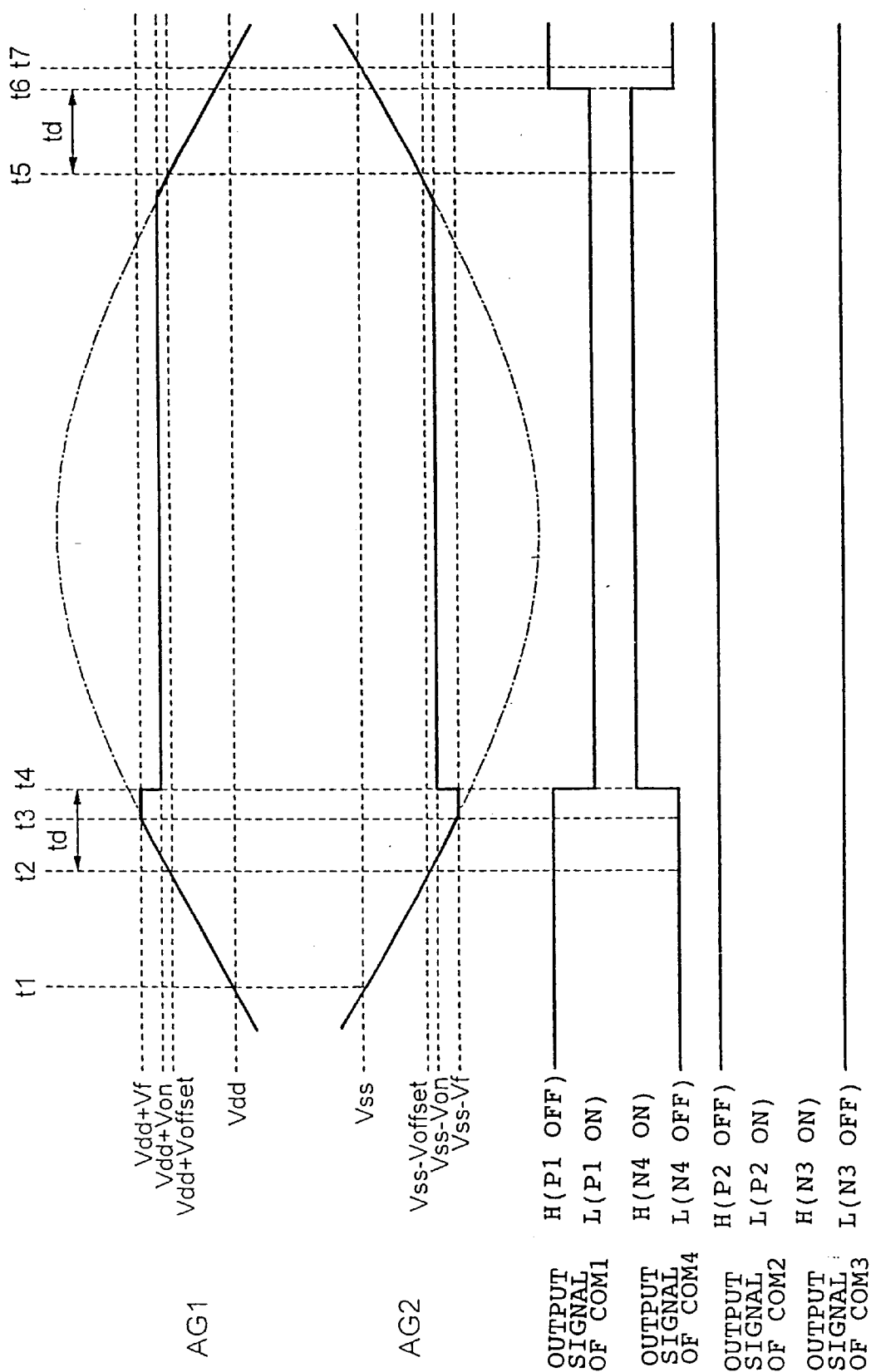
FIG. 6 is a timing diagram showing that an offset voltage is lower than a voltage drop of a transistor in the power supplying device of the first embodiment.

The case of Voffset<Von is discussed, referring to FIG. 6.

FIG. 6 is a timing diagram illustrating the case in which the offset voltage is smaller than the voltage drop of the transistor.

At time t1, the voltage at the terminal AG1 rises above the high-potential voltage Vdd, and later exceeds the voltage Vdd+Voffset at time t2. The comparator COM1 starts operating to transition the output signal thereof from a high level to a low level. However, since the comparator COM1 suffers from the response delay time td, the output signal is transitioned to a low level, but not immediately subsequent to time t2. For this reason, the voltage at the terminal AG1 further rises, and reaches the voltage Vdd+Vf at time t3. The parasitic diode D1 is then switched from off to on.

At time t1, the voltage at the terminal AG2 drops below the low-potential voltage Vss, and later drops below the voltage Vss-Voffset at time t2. The comparator COM4 starts operating to transition the output signal thereof from a low level to a high level. However, since the comparator COM4 suffers from the response delay time td, the output signal is transitioned to a high level, but not immediately subsequent to time t2.

The voltage at the terminal AG2 further drops after time t2, and reaches the voltage Vss-Vf at time t3. The parasitic diode D4 is then switched from off to on.

As a result, the charging operation through the parasitic diodes D1 and D4 thus starts at time t3.

In this case, a closed loop of the terminal AG1→parasitic diode D1→capacitor 140→parasitic diode D4→terminal AG2 is formed, allowing a charging current to flow into the capacitor 140.

At time t4, the response delay time td later than t2, the output signal of the comparator COM1 is transitioned from a high level to a low level, and the transistor P1 is switched from off to on. The voltage at the terminal AG1 thus drops down to the voltage Vdd+Von.

At time t4, the output signal of the comparator COM4 is transitioned from a low level to a high level, switching the transistor N4 from off to on. The voltage at the terminal AG2 thus rises to the voltage Vss−Von.

The charging operation through the transistors P1 and N4 starts at time t4. In this case, a closed loop of the terminal AG1→transistor P1→capacitor 140→transistor N4→terminal AG2 is formed, allowing a current to flow into the capacitor 140. Since the on resistance of the transistor is smaller than the on resistance of the parasitic diode, the charging operation through the transistor permits a larger charging current. This is the reason why the waveform of the charging current sharply rises at time t4.

The voltage generated by the generator 100 starts gradually decreasing, thereby causing the voltage at the terminal AG1 to drop below the voltage Vdd+Voffset at time t5. The comparator COM1 then starts operating to transition the output signal thereof from a low level to a high level.

Because of the response delay time td, the comparator COM1 cannot immediately reflect the magnitude inversion of the input signals in the output signal thereof.

The transistor P1 continuously stays turned on even from time t5 to time t6, the response delay time td later. Similarly, the output of the comparator COM4 continuously remains at a high level even from time t5 to time t6, and the transistor N4 continuously stays turned on throughout.

The charging operation through the transistors P1 and N4 is also continuously performed from time t5 to time t6.

At time t6, the output signal of the comparator COM1 is transitioned to a high level, while the output signal of the comparator COM4 is transitioned to a low level, and the transistors P1 and N4 are switched from on to off. The closed loop of the terminal AG1→transistor P1→capacitor 140→transistor N4→terminal AG2 is opened, stopping the charging current.

The offset voltage Voffset is determined accounting for the response delay time td of the comparators COM1 and COM4, and the above-discussed closed loop is reliably opened prior to time t7, at the moment the voltage at the terminal AG1 drops below the high-potential voltage Vdd and the voltage at the terminal AG2 rises above the low-potential voltage Vss. In other words, the comparison operations by the comparators COM1–COM4 are started in advance taking into account the response delay time td so that the transistors P1, P2, N3, and N4 are turned off before one terminal voltage drops below the other terminal voltage in the uni-direction units U10–U40.

[1.3.2] Offset Voltage Voffset Greater than the Voltage Drop of the Transistor

Figure 7:
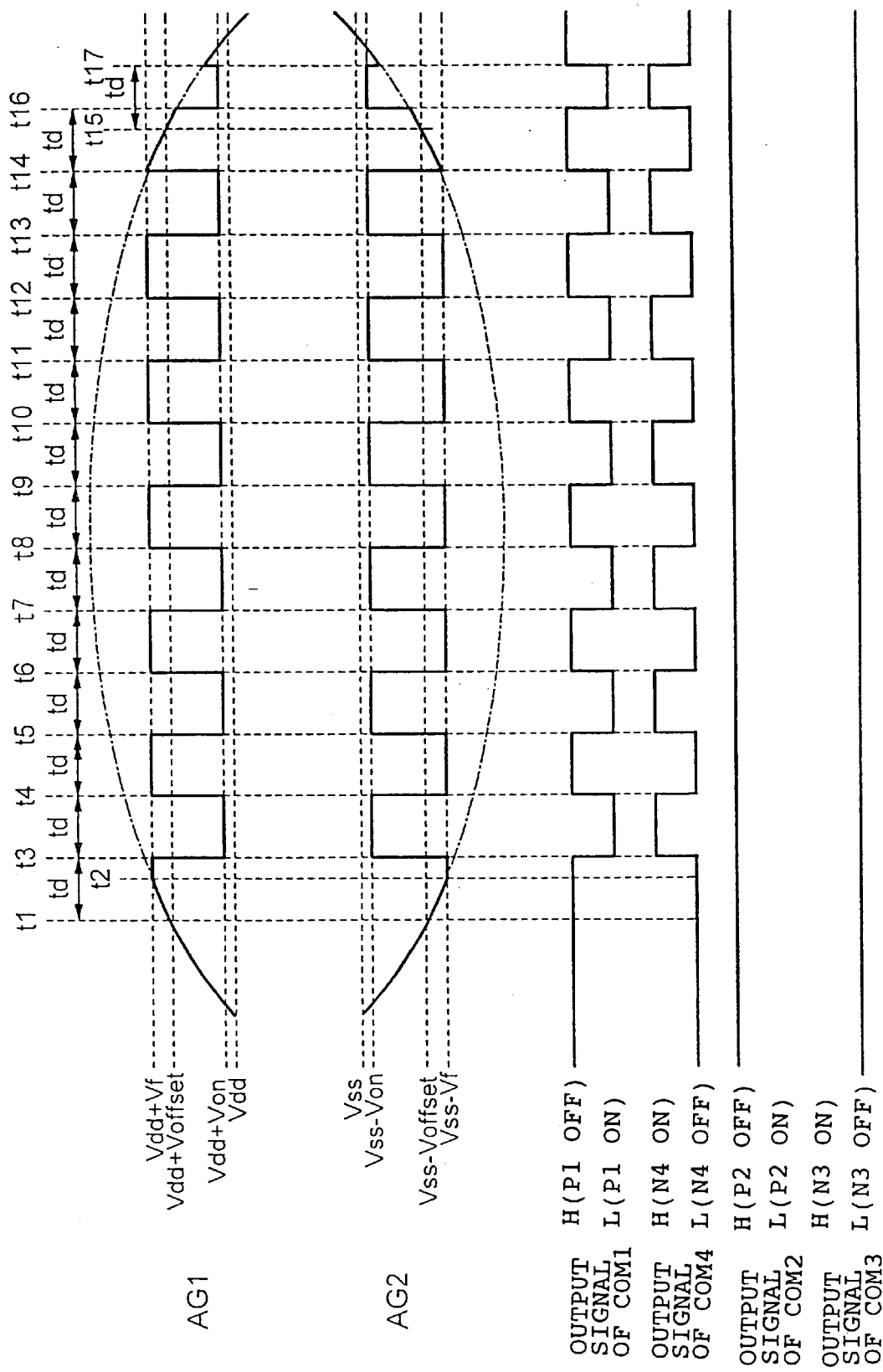
FIG. 7 is a timing diagram showing that an offset voltage is higher than a voltage drop of a transistor in the power supplying device of the first embodiment.

The case of Vf>Voffset>Von is discussed, referring to FIG. 7. FIG. 7 is a timing diagram illustrating the case in which the offset voltage is greater than the voltage drop of the transistor.

[1.3.2.1] Operation for Switching from a Non-charging State to a Charging State

Referring to FIG. 7, when the voltage at the terminal AG1 rises above the high-potential voltage Vdd at time t1, the comparator COM1 starts operating to transition the output signal thereof from a high level to a low level. Because of the response delay time td, the output signal of the comparator COM1 cannot be switched from a high level to a low level immediately subsequent to time t1. The voltage at the terminal AG1 further increases.

When the voltage at the terminal AG2 drops below the low-potential voltage Vss at time t1, the comparator COM4 starts operating to transition the output signal thereof from a low level to a high level. Because of the response delay time td in the comparator COM4, the transistor N4 cannot be immediately switched from off to on. The voltage at the terminal AG2 further drops.

At time t2, the parasitic diode D1 is turned on when the voltage at the terminal AG1 reaches the voltage Vdd+Vf, higher than the high-potential voltage Vdd by the voltage drop Vf of the parasitic diode D1. Also, the parasitic diode D4 is turned on when the voltage at the terminal AG2 reaches the voltage Vss−Vf, lower than the low-potential voltage Vss by the voltage drop Vf of the parasitic diode D4.

A closed loop of the terminal AG1→parasitic diode D1→capacitor 140→parasitic diode D4→terminal AG2 is formed, allowing a charging current to flow, and thereby charging the capacitor 140. The parasitic diodes D1 and D4 allow the charging current to flow into the capacitor 140, regardless of the operation of the comparators COM1 and COM4.

At the moment the non-charging state is switched to the charging state, the charging operation through the parasitic diodes D1 and D4 is performed. When the voltage at the terminal AG1 mildly rises, in other words, when the generation frequency is low, or when the voltage Voffset is small, the voltage at the terminal AG1 does not rise above the voltage Vdd+Vf before the response delay time has elapsed from time t1. In such a case, the charging operation through the transistors P1 and N4 is performed.

[1.3.2.2] Operation in the Charging State

At time t3, the response delay time td later than time t1, the output signal of the comparator COM1 is transitioned from a high level to a low level. The transistor P1 is then switched from off to on, and the voltage at the terminal AG1 drops and reaches the voltage Vdd+Von.

At time t3, the output signal of the comparator COM4 is transitioned from a low level to a high level. This switches the transistor N4 from off to on, and the voltage at the terminal AG2 rises and reaches the voltage Vss−Von. The voltage at the terminal AG1 is maintained until the transistor P1 is next turned off, and the voltage at the terminal AG2 is maintained until the transistor N4 is next turned off.

From the duration from time t3 to time t4, a charging current flows through a closed loop of the terminal AG1→transistor P1→capacitor 140→transistor N4→terminal AG2, thereby charging the capacitor 140.

Since the on resistance of the transistors P1 and N4 is small, the voltage value Von is also small. For this reason, the voltage at the terminal AG1 drops below the voltage Vdd+Voffset, and the voltage at the terminal AG2 rises above the Vss−Voffset. At time t3, the comparator COM1 starts operating to transition the output signal thereof from a low level to a high level, while the comparator COM4 starts operating to transition the output signal thereof from a high level to a low level.

Because of the response delay time td, the output signals of the comparators COM1 and COM4 cannot change immediately subsequent to time t3.

At time t4, the response time delay td later than t3, the output signal of the comparator COM1 is transitioned to a high level, switching the transistor P1 from on to off. On the other hand, at time t4, the output signal of the comparator COM4 is transitioned to a low level, switching the transistor N4 from on to off.

When the transistor P1 is turned off, the voltage at the terminal AG1 rises and reaches the voltage Vdd+Vf, higher than the high-potential voltage Vdd by the voltage drop Vf of the parasitic diode D1. The parasitic diode D1 is then switched from off to on. For this reason, the voltage at the terminal AG1 is maintained at the voltage Vdd+Vf until the transistor P1 is next turned on.

At time t4, the voltage at the terminal AG2 drops and reaches the voltage Vss−Vf, lower than the low-potential voltage Vss by the voltage drop Vf of the parasitic diode D4, switching the parasitic diode D4 from off to on. The voltage at the terminal AG2 is thus maintained at the voltage Vss−Vf until the transistor N4 is next turned on.

For the duration from time t3 to time t4, the charging operation through the parasitic diodes D1 and D4 is performed. A charging current flows through a closed loop of the terminal AG1→parasitic diode D1→capacitor 140→parasitic diode D4→terminal AG2, thereby charging the capacitor 140.

A first state in which the transistors P1 and N4 are turned on with the parasitic diodes D1 and D2 off and a second state in which the parasitic diodes D1 and D2 are turned on with the transistors P1 and N4 off are alternately repeated, charging the capacitor 140.

[1.3.2.3] Operation for Switching from a Charging State to a Non-charging State

The operation for switching from a charging state to a non-charging state is now discussed.

Referring to FIG. 7, at time t14, the voltage at the terminal AG1 drops below the voltage Vdd+Vf and the voltage at the terminal AG2 rises above the voltage Vss−Vf. The parasitic diodes D1 and D4 are switched from on to off, and are maintained at an off state thereafter.

At time t14, the transistors P1 and N4 are turned off, thereby gradually lowering the voltage at the terminal AG1 while raising the voltage at the terminal AG2. At time t16, the transistors P1 and N4 are turned on again. Since at time t15, the voltage at the terminal AG1 drops below the voltage Vdd+Voffset, and the voltage at the terminal AG2 rises above the voltage Vss−Voffset, and the transistors P1 and N4 are turned off at time t17, the response time delay td later than time t15.

The offset voltage Voffset is thus set up taking into account the above-discussed response delay time td so that the transistor P1 is turned off before the voltage at the terminal AG1 drops below the high-potential voltage Vdd and so that the transistor N4 is turned off before the voltage at the terminal AG2 rises above the low-potential voltage Vss.

The current charged in the capacitor 140 is thus reliably prevented from reversely flowing.

In accordance with the first embodiment, the offset voltage Voffset taking into account the response delay time td of the comparators COM1–COM4 is set up and the level-shifted voltage is fed to the positive input terminal (+) of each of the comparators COM1–COM4. In order to switch the capacitor 140 from the charging state to the non-charging state, the transistors P1, P2, N3, and N4 are reliably turned off when the voltage at the terminal AG1 is lower than the high-potential voltage Vdd or when the voltage at the terminal AG2 is higher than the low-potential voltage Vss. This arrangement reliably prevents a surge current from flowing out of the capacitor 140.

The above arrangement protects the capacitor 140, and prevents impulsive noise resulting from the reverse flow of current from being added on the power supply voltage, thereby allowing the load 150 to stably operate.

Under the condition of Voffset<Von, the parasitic diodes D1–D4 perform charging when the capacitor 140 is switched from the non-charging state to the charging state, and the charging efficiency is thus heightened. Under the condition of Voffset>Von, the charging operation through the parasitic diodes D1–D4 and the charging operation through the transistors P1, P2, N3, and N4 are alternated during charging, and the charging efficiency is thus twice as high as the case with no parasitic diodes D1–D4 employed.

[1.4] Modification of the First Embodiment

[1.4.1] First Modification

In the power supplying device of the first embodiment, the level shifters 10–40 are respectively arranged on the positive input terminal (+) sides of the comparators COM1–COM4, but alternatively, the level shifters 10–40 may be arranged on the negative input terminal (−) sides of the comparators COM1–COM4. When the level shifters 10 and 20 are arranged on the negative input terminal (−) sides, the voltages at the terminals AG1 and AG2 are shifted to lower level by voltages Voffset1 and Voffset2 respectively corresponding to the response delay times td1 and td2, and the level-shifted voltages are respectively fed to the negative input terminals (−) of the comparators COM1 and COM2. When the level shifters 30 and 40 are arranged on the negative input terminal (−) sides, the voltages at the terminal AG1 and the terminal AG2 are shifted to higher level by the voltages Voffset3 and Voffset4 respectively corresponding to response delay times td3 and td4, and the level-shifted voltages are fed to the negative input terminals (−) of the comparators COM3 and COM4. In summary, taking into account the response delay times td1–td4, the comparators COM1–COM4 open the closed loops before the voltage at the terminal AG1 drops below the high-potential voltage Vdd and before the voltage at the terminal AG2 rises above the low-potential voltage Vss.

[1.4.2] Second Modification

If the comparators COM1–COM4 are identical, the response delay times td1–td4 become substantially identical, and offset voltages can be set to be Voffset1=Voffset2=Voffset3=Voffset4. If the rectification performance is of a main concern, however, Voffset1–Voffset4 are individually set to match the characteristics of the comparators COM1–COM4.

In the illustrated example, the level shifters 10–40 are respectively external to the comparators to COM1–COM4. Alternatively, the comparators COM1–COM4 may respectively include the level shifters 10–40, and may further respectively integrate the transistors P1, P2, N3, and N4.

The uni-direction units U1–U4 may be integrated as an MOS-IC, or at least a portion of electronics forming the uni-direction units U1–U4 and the load 150 may be integrated as an MOS-IC.

Such an integration substantially helps miniaturize the device.

[1.4.3] Third Modification

To prevent the reverse flow of current, the closed loop of the terminal AG1→transistor P1→capacitor 140→transistor N4→terminal→AG2, and the closed loop of the terminal AG2→transistor P2→capacitor 140→transistor N3→terminal AG1 must be partly opened.

For this reason, only both level shifters 10 and 20 may be used with the level shifters 30 and 40 eliminated, or only both level shifters 30 and 40 may be used with the level shifters 10 and 20 eliminated.

Alternatively, only both level shifters 10 and 30 may be used with the level shifters 20 and 40 eliminated, or only both level shifters 20 and 40 may be used with the level shifters 10 and 30 eliminated. This arrangement may be applied to the case in which the threshold voltages Vth are differentiated in the comparators COM1–COM4 or in which the level shifters 10–40 are connected to the negative input terminal (−) sides of the comparators COM1–COM4.

2 Second Embodiment

[2.1] Construction of a Second Embodiment

The construction of the power supplying device of a second embodiment of the present invention is now discussed, referring to the drawings.

Figure 8:
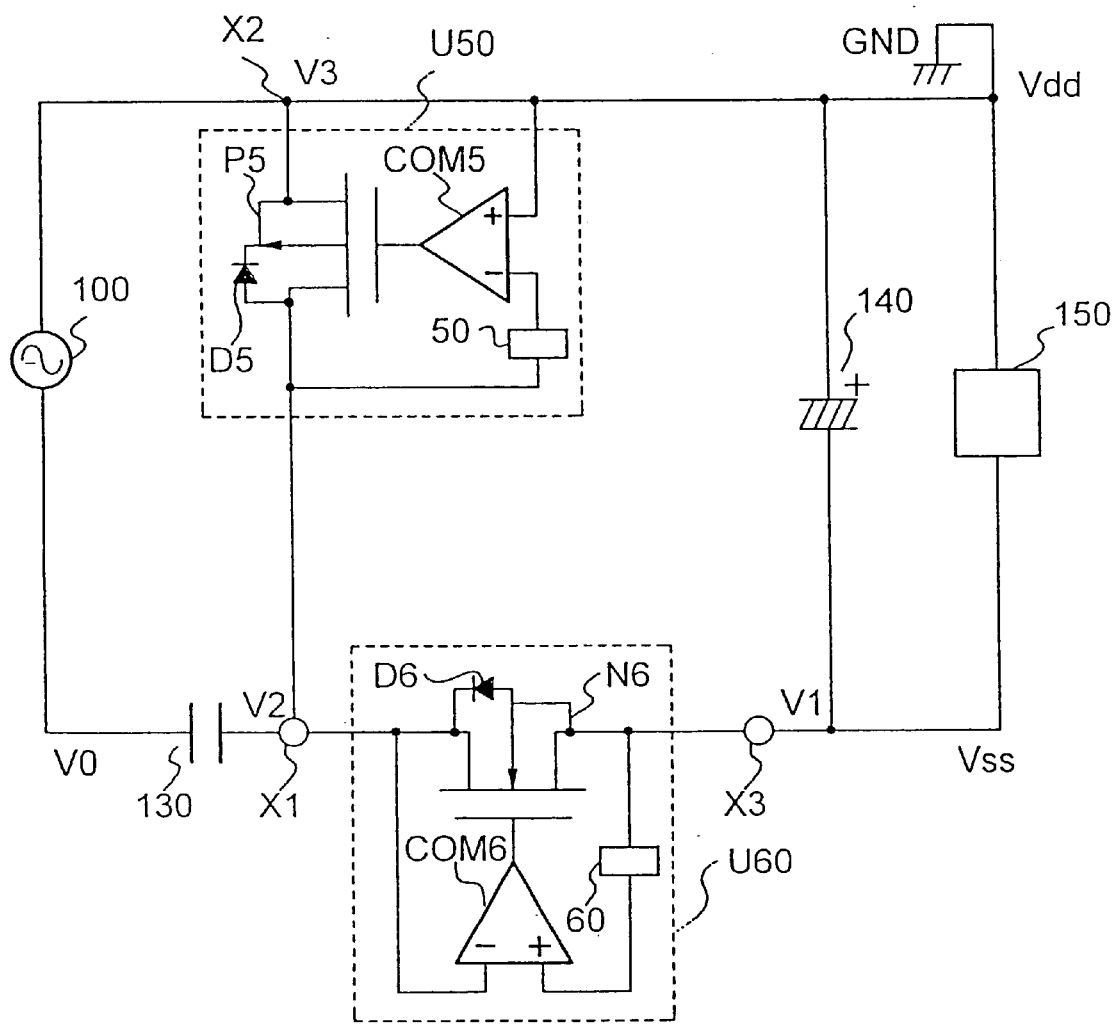
FIG. 8 is a circuit diagram showing the construction of the power supplying device of a second embodiment of the present invention.

FIG. 8 is a block diagram of the power supplying device of the second embodiment.

As shown, the power supplying device includes a generator 100, a voltage boost capacitor 130, uni-direction units U50 and U60, a capacitor 140, and a load 150, and performs voltage boost and rectification. In this example, the high-potential voltage Vdd is a common potential (GND).

The uni-direction unit U50 is configured so that a current is allowed to flow from a terminal X1 to a terminal X2 when a voltage V2 is higher than the high-potential voltage Vdd, and so that no current flows when the voltage V2 is lower than the high-potential voltage Vdd. The uni-direction unit U50 half-wave rectifies the voltage generated by the generator 100, and charges the voltage boost capacitor 130. The uni-direction unit U50 includes a transistor P5, a parasitic diode D5, a comparator COM5, and a level shifter 50. The level shifter 50 generates a voltage (V2−Voffset5) by level shifting the voltage V2 to lower level by a voltage Voffset5, and feeds the voltage (V2−Voffset5) to an negative input terminal (−) of the comparator COM5.

If the voltage V2 is directly fed to the negative input terminal (−) of the comparator COMS with the level shifter 50 eliminated, a current flows in a closed loop of the voltage boost capacitor 130→generator 100→transistor P5→voltage boost capacitor 130 from when the voltage V2 drops below the high-potential voltage Vdd until a response delay time td5 has elapsed, because of the response delay time td5 of the comparator COM5.

The above-referenced level shifter 50 is arranged to prevent this. In this case, the comparator COMS compares the voltage (V2−Voffset5) with the high-potential voltage Vdd, and starts operating to transition the output signal thereof from a low level to a high level at the moment the voltage V2 becomes higher than the high-potential voltage Vdd by the voltage Voffset5.

The voltage Voffset5 is so determined that no reverse flow of current takes place with the response delay time td5 accounted for, and is set to several tens of mV.

The comparator COMS generates the output signal thereof that is transitioned from a low level to a high level immediately before the voltage V2 drops below the high-potential voltage Vdd, thereby switching the transistor P5 from on to off. The comparator COM1 (see FIG. 3) used in the first embodiment can also be used for the comparator COM5.

On the other hand, the uni-direction unit U60 allows a current to flow from a terminal X3 to a terminal X1 when a voltage V1 is higher than the voltage V2, and allows no current to flow when the voltage V1 is lower than the voltage V2. The uni-direction unit U60 performs voltage boost by connecting the voltage stepup capacitor 130 to the capacitor 140, while rectifying the voltage generated by the generator 100. The uni-direction unit U60 includes a transistor N6, a parasitic diode D6, a comparator COM6, and a level shifter 60. The level shifter 60 generates a voltage (V1−Voffset6) by shifting a voltage V1 by a voltage Voffset6, and feeds the voltage (V1−Voffset6) to a positive input terminal (+) of the comparator COM6.

If the voltage V1 is directly fed to the positive input terminal (+) of the comparator COM6 with the level shifter 60 eliminated, the transistor N6 remains turned on from when the voltage V1 becomes lower than the voltage V2 until a response delay time td6 has elapsed, because of the response delay time td6 of the comparator COM6. Throughout this duration, a current would reversely flow in a closed loop of the voltage boost capacitor 130→transistor N6→capacitor 140→generator 100→voltage boost capacitor 130.

The level shifter 60 is arranged to prevent this. The comparator COM6 compares the voltage (V1−Voffset6) with the voltage V2, and starts operating to transition the output signal thereof from a high level to a low level at the moment the voltage V1 becomes higher than the voltage V2 by the voltage Voffset6. The voltage Voffset6 is determined to prevent the reverse current from flowing with the response delay time td6 accounted for. The comparator COM6 generates the output signal thereof that is transitioned from a high level to a low level immediately before the voltage V1 drops below the voltage V2, thereby switching the transistor N6 from on to off.

[2.2] Operation of the Second Embodiment

The power supplying device of this embodiment is now discussed. The response delay times of the comparators COM5 and COM6 are equally td, the offset voltages of the level shifters 50 and 60 are set to Voffset, and the voltage drops of the transistors P5 and N6 are set to be equally Von.

Figure 9:
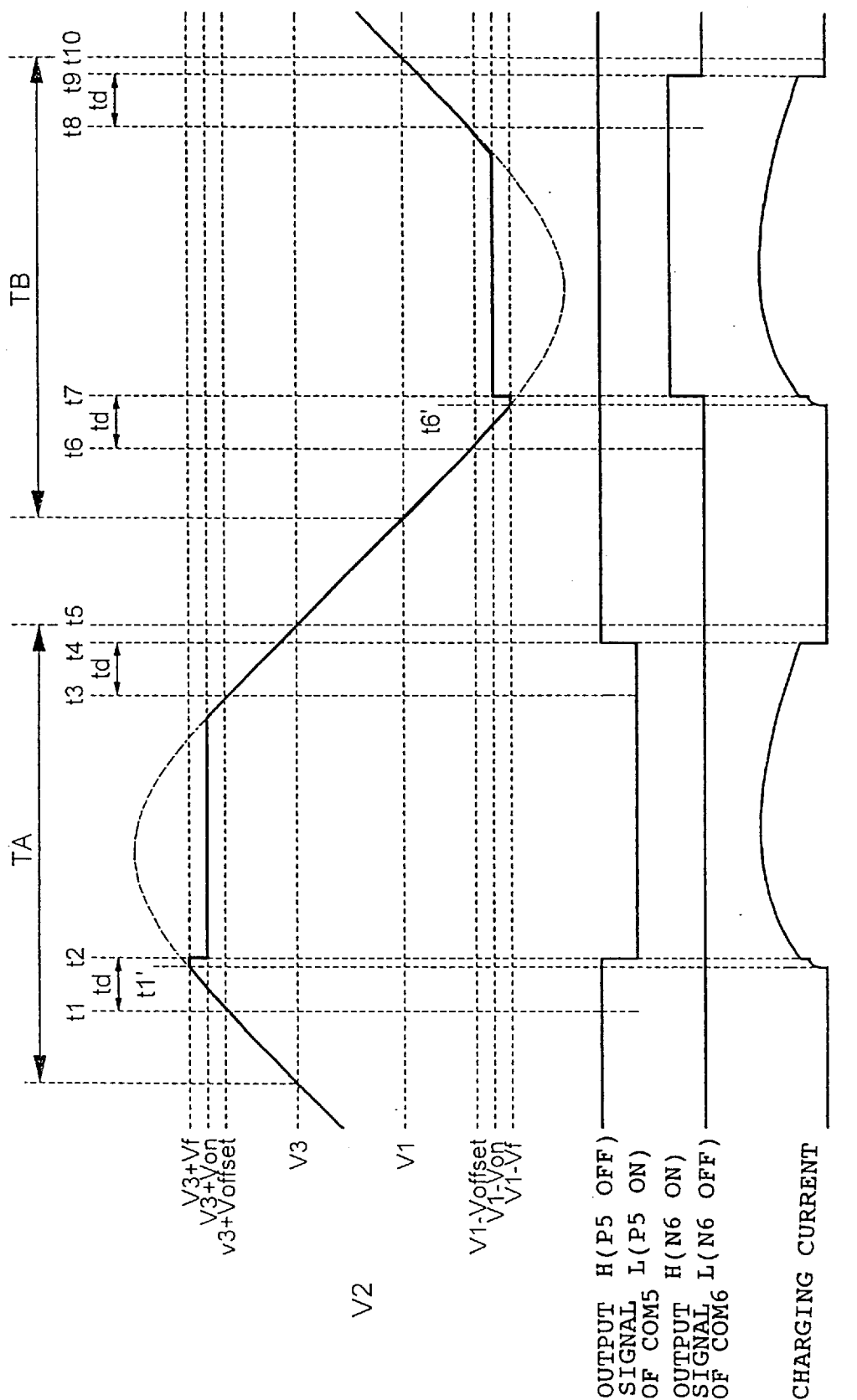
FIG. 9 is a timing diagram showing that an offset voltage is lower than a voltage drop of a transistor in the power supplying device of the second embodiment.

The above-referenced offset voltage Voffset is determined to account for the response delay time td. Therefore, the offset voltage Voffset becomes greater than the voltage drop Von in some cases and becomes smaller than the voltage drop Von in other cases. Here, the condition Voffset<Von is assumed. FIG. 9 is a waveform diagram showing the voltage V2 when the offset voltage is lower than the voltage drop of the transistor.

As shown, the voltage V2 substantially sinusoidally changes in response to the voltage generated by the generator 100.

In this case, for a duration TA, the voltage V2 becomes higher than the high-potential voltage Vdd (common voltage GND), and the uni-direction unit U50 performs half-wave rectification, charging the voltage boost capacitor 130.

For a duration TB, the uni-direction unit U60 performs half-wave rectification, charging the capacitor 140.

For the duration TB, the uni-direction unit U60 remains connected, and the capacitor 140 is charged with the sum of the voltage across the terminals of the voltage boost capacitor 130 and the voltage generated by the generator 100. Specifically, voltage boost and rectification process is performed.

The operation of the power supplying device during the duration TA is now discussed.

As shown in FIG. 9, at time t1, the voltage V2 becomes higher than the voltage Vdd+Voffset, which is higher than the high-potential voltage Vdd by the voltage Voffset, and the comparator COM5 starts operating to transition the output signal thereof from a high level to a low level.

The comparator COM5 cannot be driven in the output signal level thereof to a low level immediately subsequent to time t1, because of the response delay time td thereof.

The voltage V2 further rises and reaches the voltage Vdd+Vf at time t1'. The parasitic diode D5 is then switched from off to on. A charging current flows through a closed loop of the terminal X1→parasitic diode D5→terminal X2→generator 100→voltage boost capacitor 130→terminal X1, thereby charging the voltage boost capacitor 130.

At time t2, the response delay time td later than t1, the comparator COM5 transitions the output signal thereof from a high level to a low level. The transistor P5 is thus turned on, thereby connecting the terminal X1 and the terminal X2 therethrough. The voltage V2 drops down to the voltage Vdd+Von. Since the voltage drop Von of the transistor P5 is smaller than the voltage drop Vf of the parasitic diode D5, the parasitic diode D5 is switched from on to off at the moment the transistor P5 is turned on.

Subsequent to time t2, the charging operation is performed by the transistor P5. In this case, the charging current flows through the closed loop of the terminal X1→transistor P5→terminal X2→generator 100→voltage boost capacitor 130→terminal X1, thereby charging the voltage boost capacitor 130.

The voltage generated by the generator 100 gradually drops, and at time t3, the voltage V2 drops below the voltage Vdd+Voffset. The comparator COM5 then starts operating to transition the output signal thereof from a low level to a high level.

Because of the response delay time td, the comparator COM5 cannot immediately reflect the magnitude inversion of input signals in the output signal thereof.

The transistor P5 continuously stays turned on from time t3 to time t4, the response delay time td later than time t3. Therefore, the charging operation through the transistor P5 is also performed from time t3 to time t4.

At time t4, the comparator COM5 is driven to a high level in the output signal thereof, opening the closed loop of the terminal X1→transistor P5→terminal X2→generator 100→voltage boost capacitor 130→terminal X1, and thereby stopping the charging current.

Since the offset voltage Voffset is determined taking into account the response delay time td of the comparator COM5, the above-referenced closed loop is reliably opened prior to time t5 at the moment the voltage V2 drops below the high-potential voltage Vdd. This arrangement precludes the reverse flow of current from the voltage boost capacitor 130.

The operation of the power supplying device during the duration TB is now discussed.

When the voltage V2 drops below the voltage V1−Voffset, lower than the voltage V1 by the voltage Voffset, at time t6 as shown in FIG. 9, the comparator COM6 starts operating to transition the output signal thereof from a low level to a high level. Because of the response delay time td, the comparator COM6 cannot transition the output signal thereof to a high level immediately subsequent to time t6. The comparator COM6 transitions the output signal thereof to a high level at time t7, the response delay time td later. In this way, the transistor N6 is switched from off to on. In this example, the parasitic diode D6 is turned on at time t6' prior to time t7, because the voltage V2 reaches the voltage V1−Vf.

At time t6', the charging operation through the parasitic diode D6 starts. A closed loop of the terminal X3→parasitic diode D6→terminal X1→voltage boost capacitor 130→generator 100→capacitor 140→terminal X3 is formed, thereby charging the capacitor 140.

At time t7, the transistor N6 is turned on, and the voltage V2 rises to the voltage V1−Von. The charging operation through the transistor N6 starts. A closed loop of the terminal X3→transistor N6→terminal X1→voltage boost capacitor 130→generator 100→capacitor 140→terminal X3 is formed, thereby charging the capacitor 140.

The capacitor 140 is charged with the sum of the voltage generated by the generator 100 and the voltage across the terminals of the voltage boost capacitor 130 regardless of whether the charging operation is performed through the parasitic diode D6 or through the transistor N6. In this way, the voltage boost and rectification operation is performed, resulting in a high voltage in the capacitor 140.

The voltage generated by the generator 100 starts dropping, and at time t8, the voltage V2 drops below the voltage Vss−Voffset. The comparator COM6 starts operating to transition the output signal thereof from a high level to a low level, but no change occurs in the output signal until the response delay time td has elapsed.

The transistor N6 stays turned on from time t8 to time t9, the response delay time td later. Even for the duration from time t8 to time t9, the charging operation through the transistor N6 is performed.

At time t9, the transistor N6 is turned off, and the closed loop of the terminal X3→transistor N6→terminal X1→voltage boost capacitor 130→generator 100→capacitor 140→terminal X3 is opened, stopping the charging current.

Since the offset voltage Voffset is determined taking into account the response delay time td of the comparator COM6, the above-referenced closed loop is reliably opened prior to time t10 at the moment the voltage V2 drops below the low-potential voltage Vss. This arrangement precludes the reverse flow of current from the voltage boost capacitor 140.

In accordance with the second embodiment, the offset voltage Voffset accounting for the response delay time td of the comparators COM5 and COM6 is generated, and the comparators COM5 and COM6 are supplied with the accordingly level-shifted voltage.

When the voltage boost capacitor 130 is changed from the charging state to the non-charging state, the transistor P5 is reliably turned off before the high-potential voltage Vdd drops below the voltage V2, preventing a surge current from flowing out of the auxiliary capacitor 140 and thereby protecting the capacitor 140.

When the capacitor 140 is changed from the charging state to the non-charging state, the transistor N6 is reliably turned off before the voltage V1 drops below the voltage V2, thereby preventing a surge current from flowing out of the capacitor 140.

The above arrangement protects the capacitor 140, and prevents impulsive noise resulting from the reverse flow of current from being added on the power supply voltage, thereby allowing the load 150 to stably operate.

[2.3] Modifications of the Second Embodiment

[2.3.1] First Modification

In the power supplying device of the second embodiment, the level shifter 50 is arranged on the negative input terminal (−) side of the comparator COM5. Alternatively, the level shifter 50 may be arranged on the positive input terminal (+) side. In this case, the high-potential voltage Vdd is shifted to higher level by the voltage Voffset5 corresponding to the response delay time td5, and the level-shifted voltage is fed to the positive input terminal (+) of the comparator COM5. The level shifter 60 is arranged on the positive input terminal (+) of the comparator COM6, but alternatively, may be arranged on the negative input terminal (−) side. In this case, the voltage V2 is shifted to higher level by the voltage Voffset6 corresponding to the response delay time td6, and the level-shifted voltage is fed to the negative input terminal (−) of the comparator COM6.

[2.3.2] Second Modification

If the comparators COM5 and COM6 are identical, the response delay times td5 and td6 become substantially identical, and offset voltages can be set to be Voffset5= Voffset6. If the rectification performance is of a main concern, however, Voffset5 and Voffset6 are individually set to match the characteristics of the comparators COM5 and COM6.

In the illustrated example, the level shifters 50 and 60 are respectively external to the comparators to COM5 and COM6. Alternatively, the comparators COM5 and COM6 may respectively include the level shifters 50 and 60, and may further respectively integrate the transistors P5 and N6. Such an integration substantially contributes to the miniaturization of the device.

The uni-direction units U50 and U60 may be integrated as an MOS-IC, or at least a portion of electronics forming the uni-direction units U50 and U60 and the load 150 may be integrated as an MOS-IC.

3 Third Embodiment

The construction of the power supplying device of a third embodiment of the present invention is now discussed.

Figure 10:
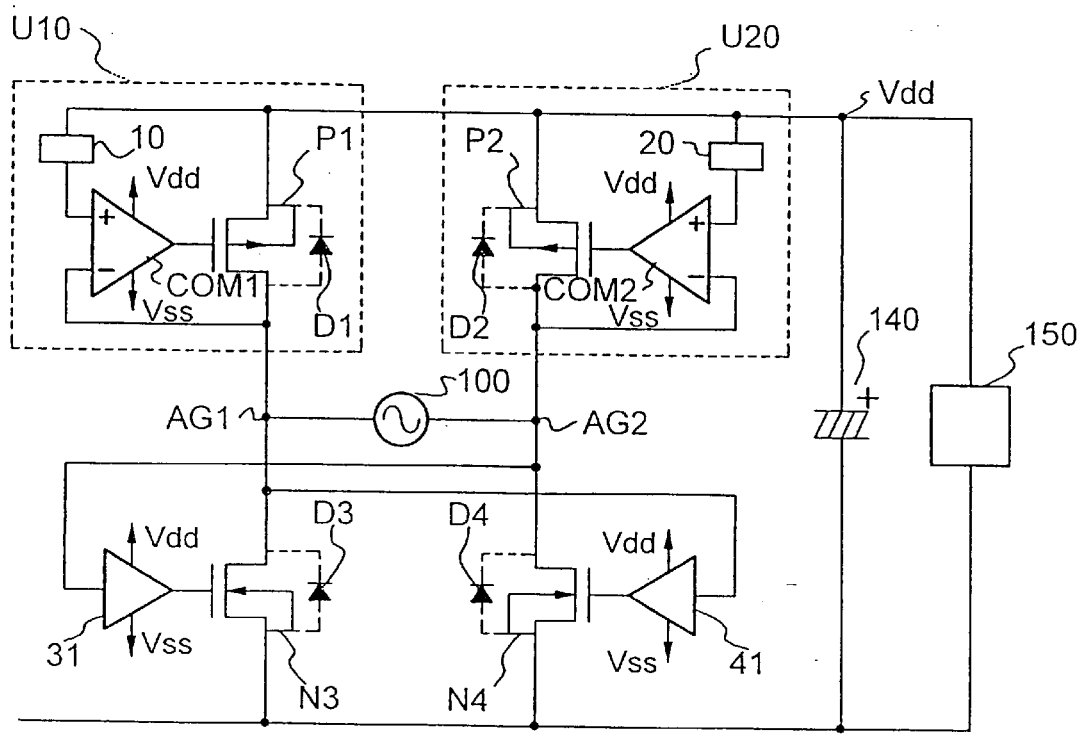
FIG. 10 is a circuit diagram showing the construction of the power supplying device of a third embodiment of the present invention.

FIG. 10 is a block diagram showing the power supplying device of the third embodiment.

The power supplying device of the third embodiment is identical to the power supplying device of the first embodiment shown in FIG. 1 except that a buffer 31 is substituted for the comparator COM3 and that a buffer 41 is substituted for the comparator COM4.

The buffer 31 receives, at the input terminal thereof, the voltage at the terminal AG2 and gives the output signal thereof to the gate of the transistor N3. The transistor N3 is turned on when the voltage at the terminal AG2 exceeds the threshold voltage of the buffer 31.

The buffer 41 receives, at the input terminal thereof, the voltage at the terminal AG1 and gives the output signal thereof to the gate of the transistor N4. The transistor N4 is turned on when the voltage at the terminal AG1 exceeds the threshold voltage of the buffer 41.

The threshold voltage of the buffers 31 and 41 is set to be (Vdd+Vss)/2. When the voltage at the terminal AG1 exceeds the voltage at the terminal AG2, the transistor N3 is turned off while the transistor N4 is turned on.

Conversely, when the voltage at the terminal AG2 exceeds the voltage at the terminal AG1, the transistor N3 is turned on while the transistor N4 is turned off.

Specifically, when the generator 100 generates power, the transistor N3 and the transistor N4 repeatedly toggle between on and off.

The uni-direction units U10 and U20 operate in the same way as already discussed in the preceding embodiments.

When the voltage at the terminal AG1 rises above the high-potential voltage Vdd, a closed loop of the terminal AG1→transistor P1→capacitor 140→transistor N4→terminal AG2 is formed. When the voltage at the terminal AG2 rises above the high-potential voltage Vdd, a closed loop of the terminal AG2→transistor P2→capacitor 140→transistor N3→terminal AG1 is formed. The capacitor 140 is charged through these closed loops.

The comparators COM1 and COM2 have the response delay time td. As already discussed in connection with the first embodiment, the level shifters 10 and 20 feed the offset voltages to the comparators COM1 and COM2 taking into account the response delay time td.

The comparator COM1 starts operating to switch the transistor P1 from on to off before the voltage at the terminal AG1 drops below the high-potential voltage Vdd. The comparator COM2 starts operating to switch the transistor P2 from on to off before the voltage at the terminal AG2 drops below the high-potential voltage Vdd.

When the capacitor 140 is switched from the charging state to the non-charging state, the transistors P1 and P2 are turned off so that a surge current flowing out of the capacitor 140 is reliably prevented.

The above arrangement protects the capacitor 140, and prevents impulsive noise resulting from the reverse flow of current from being added on the power supply voltage, thereby allowing the load 150 to stably operate.

4 Fourth Embodiment

Discussed now is an electronic timepiece (wristwatch) as an example of electronic equipment incorporating the power supplying device of the present invention.

Figure 11:
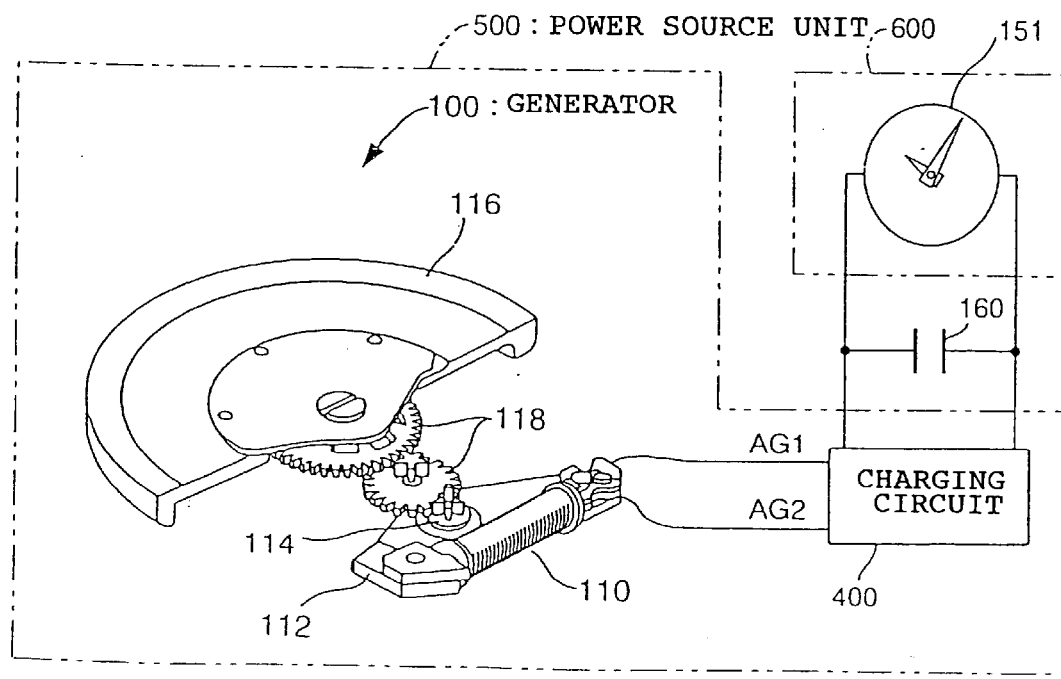
FIG. 11 is a diagram roughly showing the construction of an electronic timepiece of a fourth embodiment of the present invention.

FIG. 11 shows the general construction of the electronic timepiece. As shown, the generator 100, appropriate for use in the wristwatch, includes a stator 112 around which a coil 110 is wound, and a disk rotor 114 having a two magnetic pole structure. When the user wearing the wristwatch swings the hand, an oscillating weight rotates, and the rotary motion of the oscillating weight drives the rotor 114 through a wheel train mechanism 118.

The generator 100 generates alternating current power between terminals AG1 and AG2 positioned at both ends of the coil 110 in response to the rotation of the oscillating weight 116.

The alternating current power generated by the generator 100 is full-wave rectified through a charging circuit 400, thereby charging an auxiliary capacitor 160 and is also fed to a processing unit 600.

Operated from power stored in the auxiliary capacitor 160 or from full-wave rectified power by a power supplying circuit 500, the processing unit 600 drives a time measurement device 151.

The time measurement device 151 includes a crystal oscillator, a counter circuit, a stepping motor, etc., and frequency-divides, through the counter circuit thereof, a clock signal generated by the crystal oscillator, and measures time based on the frequency division result, while driving the stepping motor for time display.

Figure 12:
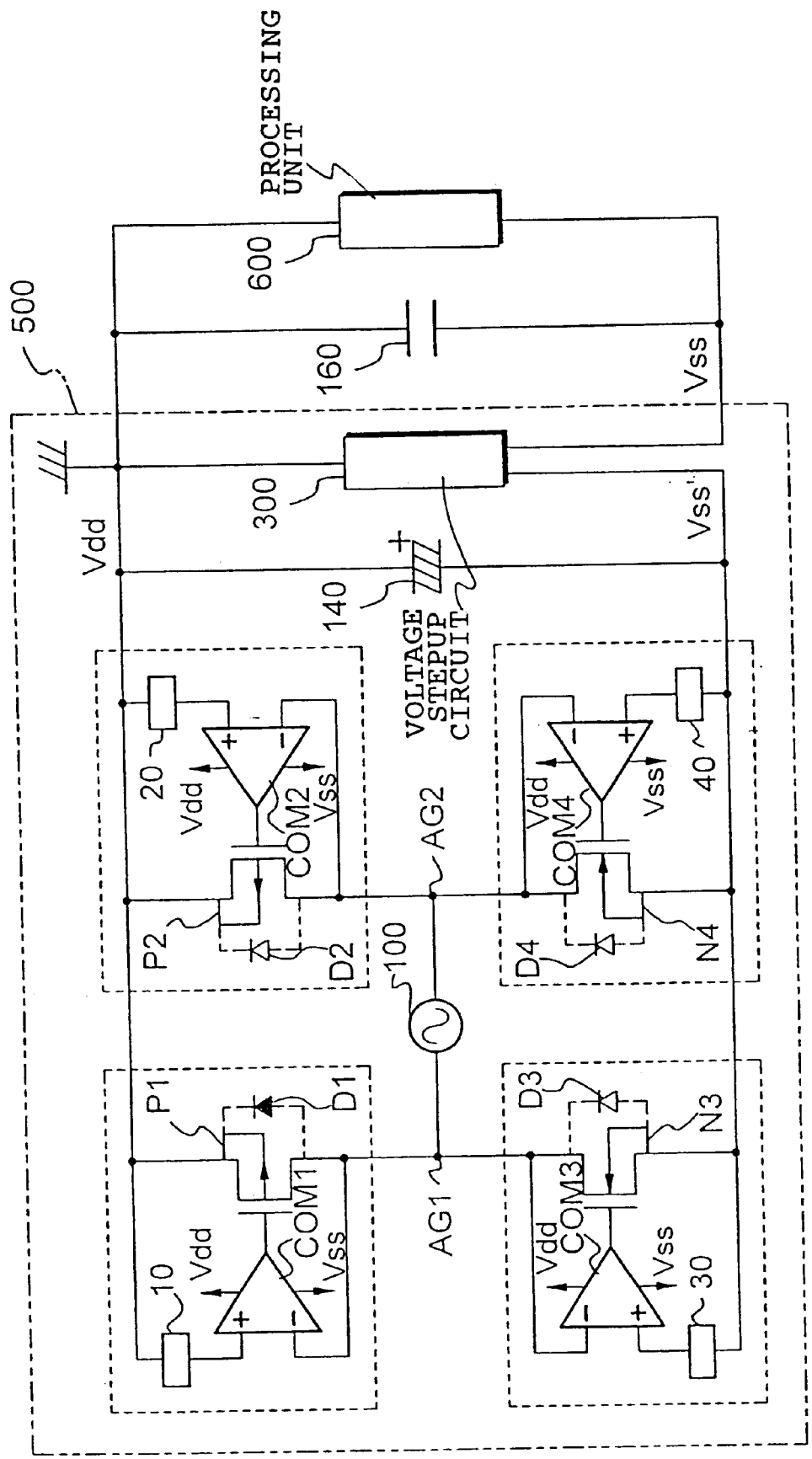
FIG. 12 is a block diagram showing the electrical arrangement of the electronic timepiece of the fourth embodiment.

FIG. 12 is a block diagram showing an electrical arrangement of the electronic timepiece.

Referring to FIG. 12, the electronic timepiece employs the power supplying device of the first embodiment. The power supplying device 500 in the electronic timepiece employs a voltage boost circuit 300.

The voltage boost circuit 300 steps up a voltage charged at the capacitor 140 as necessary, and charges the auxiliary capacitor 160, and then feed power to the processing unit 600 and the comparators COM1–COM4, as the load of the electronic timepiece. More in detail, when the power source voltage, represented by a line-to-line voltage (absolute value) between the low-potential voltage Vss and the high-potential voltage Vdd as a common voltage, drops down to a lower voltage limit value (or in the vicinity of the lower voltage limit value) able to drive circuits in operation, a voltage boost rate number is increased by one step. When the power source voltage rises to an upper voltage limit value (or in the vicinity of the upper voltage limit value), the voltage boost rate number is decreased by one step.

When the charging of the capacitor 140 is insufficient, the power source voltage Vss is maintained within an operating voltage range, and the comparators COM1–COM4 are still able to control the transistors P1, P2, N3, and N4, thereby rectifying a small-amplitude alternating voltage.

Even when the comparators COM1–COM4 are inoperative through voltage boost with the charging of the capacitor 140 insufficient, the capacitor 140 can be still charged through rectification by the diode bridge composed of the parasitic diodes D1–D4.

The power supplying device of the second embodiment or the third embodiment may be employed in the electronic timepiece.

5 Modifications of the First Through Fourth Embodiments

The present invention is not limited to the above-referenced embodiments, and the following modifications are possible.

[5.1] First Modification

In the first through fourth embodiments, the transistors P1, P2, N3, N4, P5, and N6 are of N-channel field-effect type or P-channel field-effect type, but alternatively, may be NPN-type bipolar transistors or PNP-type bipolar transistors. In case of the bipolar transistors, the saturation voltage between the emitter and the collector is typically 0.3 V or so, and the field-effect type is preferred to the bipolar transistor when the voltage generated by the generator 100 remains small.

The transistors P1, P2, N3, N4, PS, and N6 are designed to form the parasitic diodes D1–D6. When no parasitic diodes are formed, separate diodes may be connected in parallel with the respective transistors.

In each of the preceding embodiments, the component storing power is the capacitor 140. Any component works, as long as the component stores electric power. For instance, a secondary battery is also acceptable.

[5.2] Second Modification

Besides the one shown in FIG. 11, the generator 100 may be a type which creates a rotary motion using a restoring force of a mainspring and generates an electromotive force from the rotary motion, or may be a type which makes use of the piezoelectric effect for power generation by exerting a vibration or displacement to a piezoelectric material externally or in a self-driving fashion. It is important that the generator 100 generate an alternating-current voltage, and the form of the generator 100 is not important.

[5.3] Third Modification

Besides the electronic timepiece, electronic equipment in which the power source device of each of the first through fourth embodiments is incorporated may be a liquid-crystal television set, a video cassette recorder, a notebook personal computer, a portable telephone, a PDA (Personal Digital Assistant), or an electronic calculator.

The power source device of the present invention may find applications in any type of electronic equipment as long as it consumes electric power. In such electronic equipment, electrical circuits and a mechanical system are operated from power fed by the generator rather than from a storage device such as a capacitor or a secondary battery. The electronic equipment is operative any time anywhere, is free from a troublesome battery replacement, and creates no problems relating to battery disposal.

[5.4] Fourth Modification

In the above-referenced first through fourth embodiments, the offset voltages are respectively applied to the comparators COM1–COM6 of the uni-direction units U10–U60 to control the reverse flow of current from the capacitor 140. The present invention is not limited to this arrangement. Alternatively, the transistors P1, P2, N3, N4, P5, and N6 are turned on and off by switching between two offset voltages in the uni-direction units U10–U60.

Figure 13:
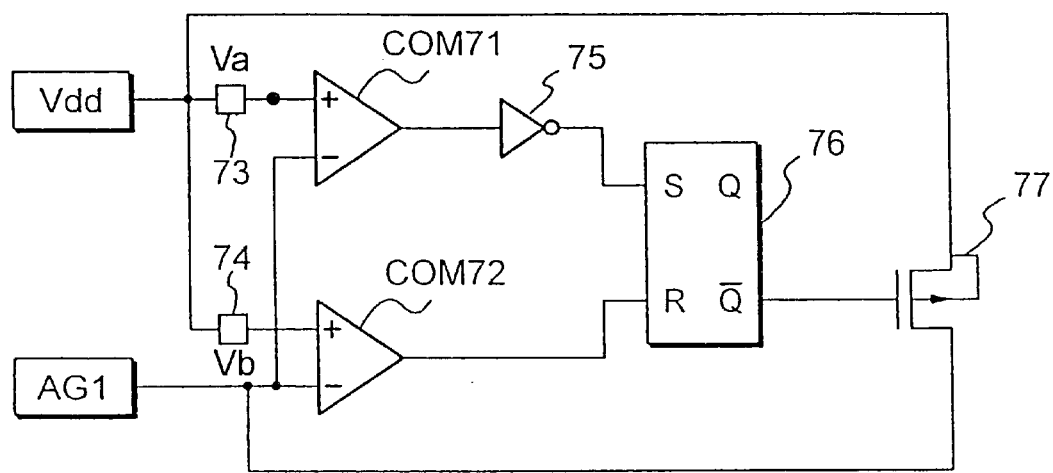
FIG. 13 is a block diagram showing the construction of a modification of a uni-direction unit.

FIG. 13 is a circuit diagram showing the construction of a uni-direction unit using the two offset voltages. As shown, the uni-direction unit includes comparators COM71 and COM72, level shifters 73 and 74, an inverter 75, an SR flipflop 76 and a P-channel transistor 77.

The level shifter 73 feeds, to a positive input terminal of the comparator COM71, a level-shifted voltage that is higher than the high-potential voltage vdd by a voltage Va, and the level shifter 74 feeds, to a positive input terminal of the comparator COM72, a level-shifted voltage that is higher than the high-potential voltage Vdd by a voltage Vb. Let Von represent the voltage drop of the transistor 77, and the condition Von>Vb>Va is established.

Figure 14:
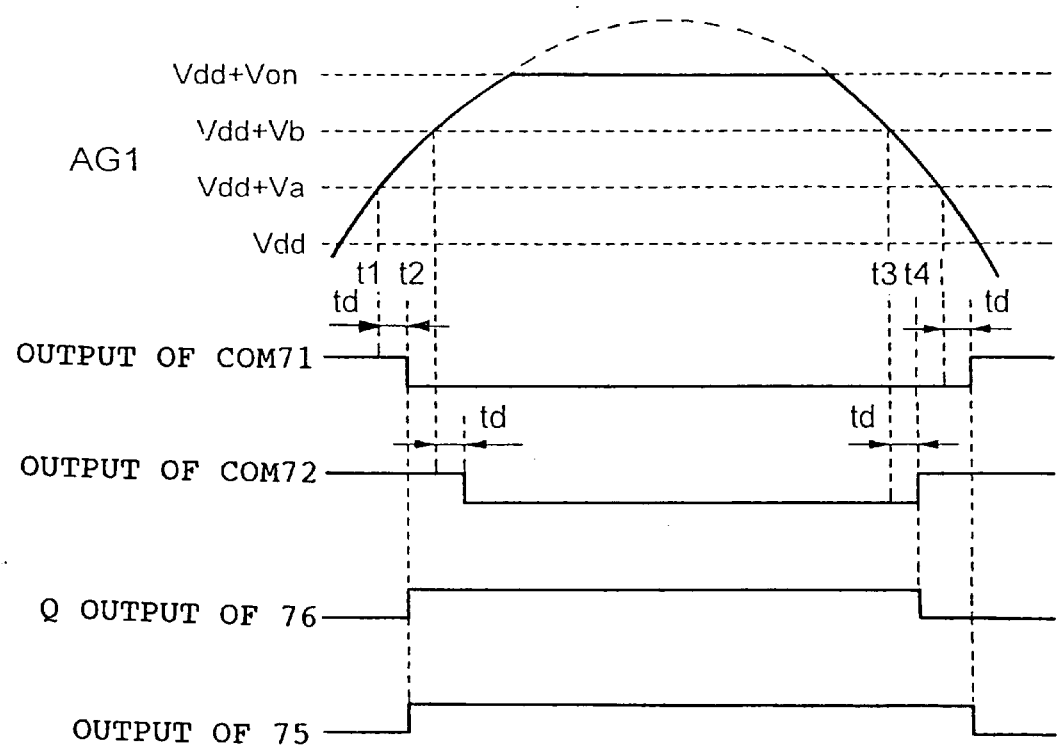
FIG. 14 is a timing diagram showing the operation of the uni-direction unit of the modification.

FIG. 14 is a timing diagram showing the operation of the uni-direction unit shown in FIG. 13.

At time t1, the voltage at the terminal AG1 rises above the voltage Vdd+Va, and the output voltage of the comparator COM71 is transitioned from a high level to a low level at time t2, the response delay time td later than time t1. With the condition Vb>Va, the output signal of the comparator COM71 is transitioned from a high level to a low level before the output signal of the comparator COM72 varies.

Since the output signal of the comparator COM71 is fed to a set terminal of the SR flipflop 76 via the inverter 75, the transistor P1 is turned on from time t1.

When the voltage at the terminal AG1 drops below the voltage Vdd+Vb at time t3, the output signal of the comparator COM72 is transitioned from a low level to a high level at time t4, the response delay time td later. Since the comparator COM72 is fed to a reset terminal of the SR flipflop 76, the transistor P1 is turned off at time t4.

By differentiating the offset voltage Va for switching from the non-charging state to the charging state from the offset voltage Vb for switching from the charging state to the non-charging state, the charging period to the capacitor 140 is prolonged, increasing the charging efficiency, and the reverse flow of current is prevented.

The offset voltage Va of COM71 may be 0 V taking into account the response delay time td from time t1 to time t2. In this case, the on time of the transistor 77 is prolonged, thereby further increasing the charging efficiency.

6 Advantages of the First Through Fourth Embodiments

As discussed above, in accordance with the first through fourth embodiments, the comparator (comparator means) offsets at least one of the two terminal voltages by a predetermined voltage corresponding to the response delay time, and the corresponding transistor (switching means) is turned off before the voltage at one terminal drops below the voltage at the other terminal. The uni-direction unit thus prevents the reverse flow of current.

As a result, the surge current flowing out of the power storage unit is prevented, and the power storage unit is thus protected. Furthermore, this arrangement removes the impulsive noise due to the reverse flow of current, which could be superimposed on the power source voltage. The load connected to the power supplying device is thus stably operated.

7 Fifth Embodiment

[7.1] Technical Field of a Fifth Embodiment (–a seventh embodiment)

To help understand a fifth embodiment (–a seventh embodiment), the technical field in which the fifth embodiment (–the seventh embodiment) is implemented is discussed, referring to the drawings.

Figure 28:
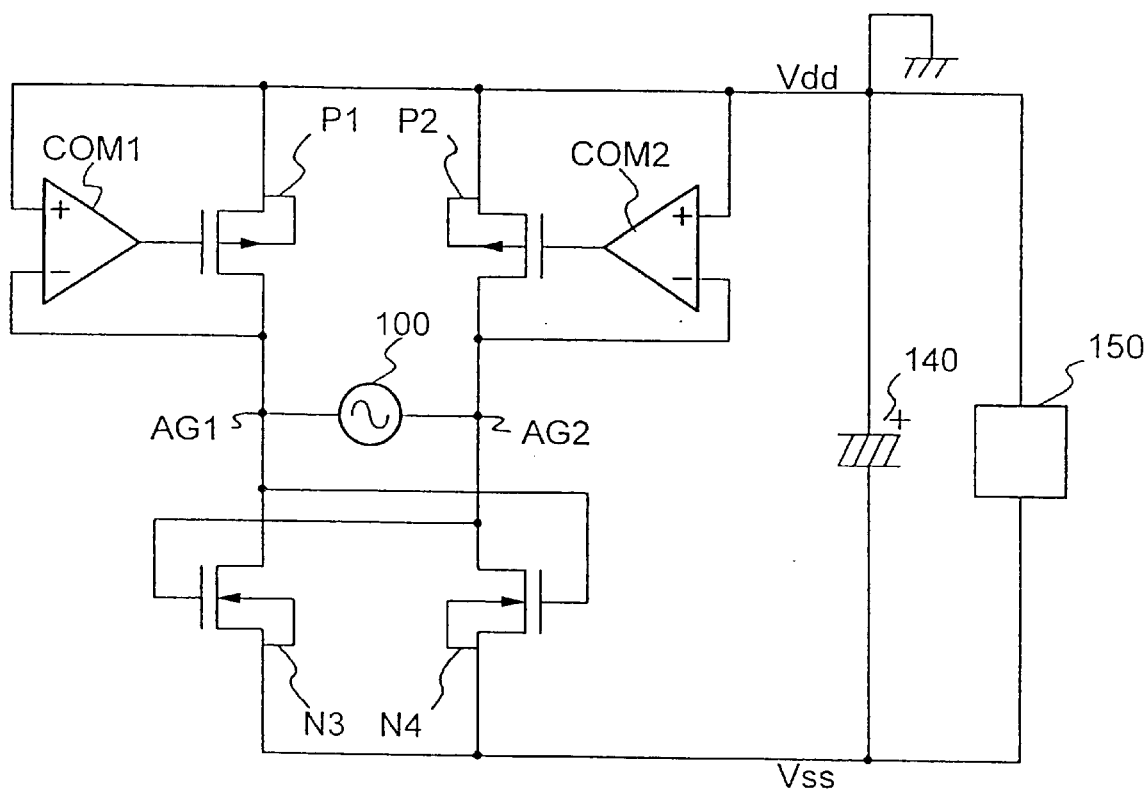
FIG. 28 is a circuit diagram showing the construction of the power supplying device in the technical field in which one of the fifth through seventh embodiments is implemented.

FIG. 28 is a circuit diagram of a power supplying device that employs a rectifier circuit, namely, the technical field in which the fifth embodiment (–the seventh embodiment) is implemented.

As shown in FIG. 28, the one terminal AG1 of a generator 100 is connected to the high-potential voltage vdd of the power source via a P-channel field-effect transistor P1, and the other terminal AG2 is connected to the high-potential voltage Vdd via a transistor P2. Furthermore, the terminal AG1 is connected to the low-potential voltage Vss of the power source via an N-channel field-effect transistor N3, and the other terminal AG2 is connected to the low-potential voltage Vss via a transistor N4.

The output signals of the comparators COM1 and COM2 are respectively fed to the transistors P1 and P2. The gate of the transistor N3 is connected to the terminal AG2 and the gate of the transistor N4 is connected to the terminal AG1.

A high-capacitance capacitor 140 is charged with a rectified current, and the load 150 is operated from the power from the capacitor 140 and performs a diversity of processes in the electronic equipment.

When the voltage at the terminal AG1 rises above the high-potential voltage Vdd as a result of power generation in the above arrangement, the output voltage of the comparator COM1 is driven to a low level, turning on the transistor P1. When the voltage at the terminal AG1 rises above the threshold voltage of the transistor N4, the transistor N4 is turned on. A current flows in a closed loop of the terminal AG1→transistor P1→high-capacitance capacitor 140→transistor N4→terminal AG2. As a result, the high-capacitance capacitor 140 is charged.

On the other hand, when the voltage at the terminal AG2 rises above the high-potential voltage Vdd, the transistor P2 and the transistor N3 are turned on. A current flows in a closed loop of the terminal AG2→transistor P2→high-capacitance capacitor 140→transistor N3→terminal AG1. As a result, the high-capacitance capacitor 140 is charged.

The alternating current power generated between the terminals AG1 and AG2 is thus full-wave rectified. There is no loss due to a voltage drop involved in the full-wave rectification. Even when the generator 100 generates a small-amplitude alternating current, the load 150 is operated from the power from the charged high-capacitance capacitor 140 or directly from the rectified current.

The comparators COM1 and COM2 respectively compare the high-potential voltage Vdd with the voltages at the terminal AG1 and the terminal AG2 in order to allow a current to flow from the terminal AG1 to the high-potential voltage Vdd and a current to flow from the terminal AG2 to the high-potential voltage Vdd, base on the comparison results.

The comparators COM1 and COM2 suffer from the response delay time from the inversion of the magnitudes of the voltages input to the positive and the negative input terminals to the reflection of the magnitude inversion result in the output signals thereof.

Figure 29:
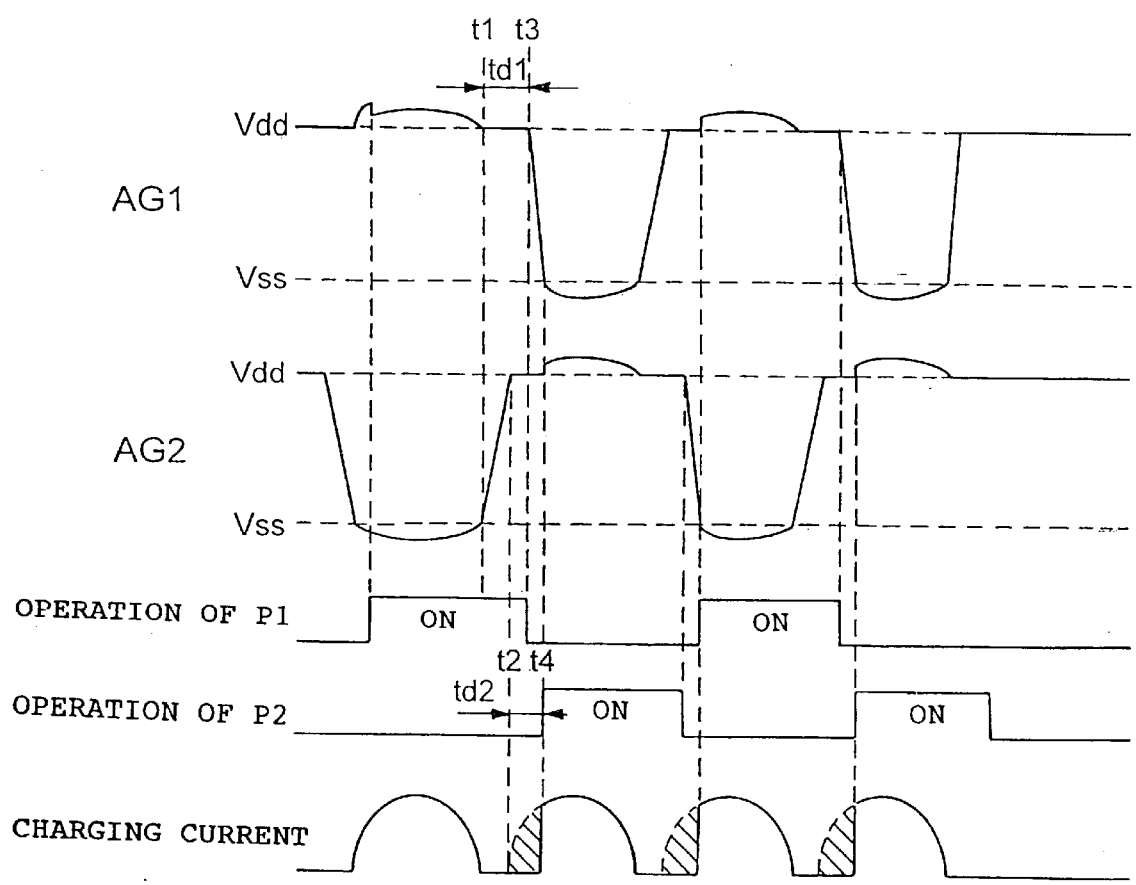
FIG. 29 is a timing diagram showing the operation of the power supplying device of FIG. 28.

There have been problems that the rectifying transistor is turned on when it should remain turned off, or that the rectifying transistor is turned off when it should remain turned on. FIG. 29 is a timing diagram explaining a drop in the rectification efficiency due to the delay time of the comparator. As shown, td1 represents the response delay time that occurs when the output signal of the comparator is transitioned from a low level to a high level, and td2 represents the response delay time that occurs when the output signal of the comparator is transitioned from a high level to a low level.

As shown in FIG. 29, the voltage at the terminal AG1 gradually drops, and reaches the high-potential voltage Vdd at time t1. At time t1, the comparator COM1 starts operating to transition the output signal thereof from a low level to a high level. Because of the response delay time td1, the comparator COM1 cannot change the output signal thereof in level immediately subsequent to time t1. The comparator COM1 transitions the output signal thereof from a low level to a high level at time t3, the response delay time td later than time t1. At time t3, the transistor P1 is thus turned off.

When the voltage at the terminal AG2 gradually rises and reaches the high-potential voltage Vdd at time t2. At time t2, the comparator COM2 starts operating to transition the output signal thereof from a high level to a low level. At time t4, the response delay time td2 later than time t2, the comparator COM2 transitions the output signal thereof from a high level to a low level, thereby turning on the transistor P2.

If the response delay times td1 and td2 of the comparators COM1 and COM2 are long, the timing of charging the high-capacitance capacitor 140 by turning on and off the transistors P1, P2, N3, and N4 is delayed from the timing of the voltage generation by the generator 100 in the phase of the voltage generation by the generator 100. The duration during which the high-capacitance capacitor 140 is charged is limited to the duration throughout which the amplitude of the voltage of the generator 100 exceeds the voltage difference between the high-potential voltage Vdd and the low-potential voltage Vss. If the timing of turning on and off the transistors P1, P2, N3, and N4 is delayed, the period of charging is shortened. Specifically, no rectification is performed in hatched portions in FIG. 29, and the rectification efficiency is lowered.

If the operating currents of the comparators COM1 and COM2 are increased, the response delay time is shortened. In such a setting, the comparators COM1 and COM2 themselves consume power, thereby lowering the efficiency of the power supplying device as already discussed.

In view of the above problem, the fifth embodiment has been developed, and the object of the fifth embodiment is to improve the rectification efficiency.

[7.2] Construction of the Fifth Embodiment

Figure 17:
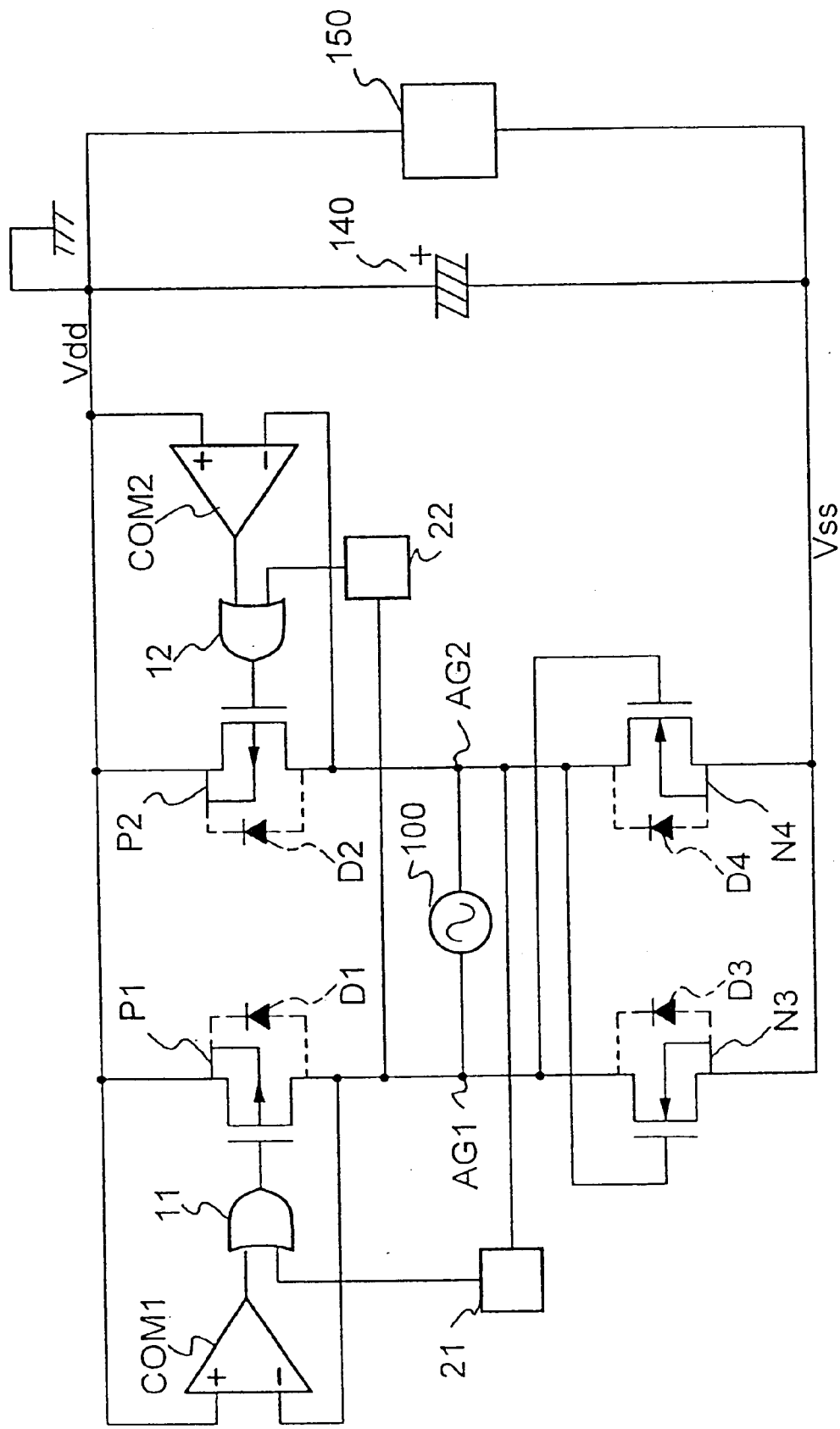
FIG. 17 is a circuit diagram showing the construction of the power supplying device of a fifth embodiment of the present invention.

FIG. 17 is a circuit diagram showing the construction of the power supplying device of the fifth embodiment.

Referring to FIG. 17, the power supplying device of this embodiment is different from the power supplying device shown in FIG. 28 in that OR gates 11 and 12 are respectively arranged between the comparator COM1 and the transistor P1 and between the comparator COM2 and the transistor P2, that generated voltage detector circuits 21 and 22 are arranged, and that parasitic diodes D1–D4 are respectively arranged in parallel with transistors P1, P2, N3, and N4.

The generated voltage detector circuit 21 compares the voltage at the terminal AG2 with a predetermined threshold voltage Vth21 thereof, and generates a signal which is transitioned to a high level when the voltage at the terminal AG2 is higher than the threshold voltage Vth21, and which is transitioned to a low level when the voltage at the terminal AG2 is lower than the threshold voltage Vth21.

Like the generated voltage detector circuit 21, the generated voltage detector circuit 22 compares the voltage at the terminal AG1 with a predetermined threshold voltage Vth22 thereof, and generates a signal which is transitioned to a high level when the voltage at the terminal AG1 is higher than the threshold voltage Vth22, and which is transitioned to a low level when the voltage at the terminal AG2 is lower than the threshold voltage Vth22.

Figure 18:
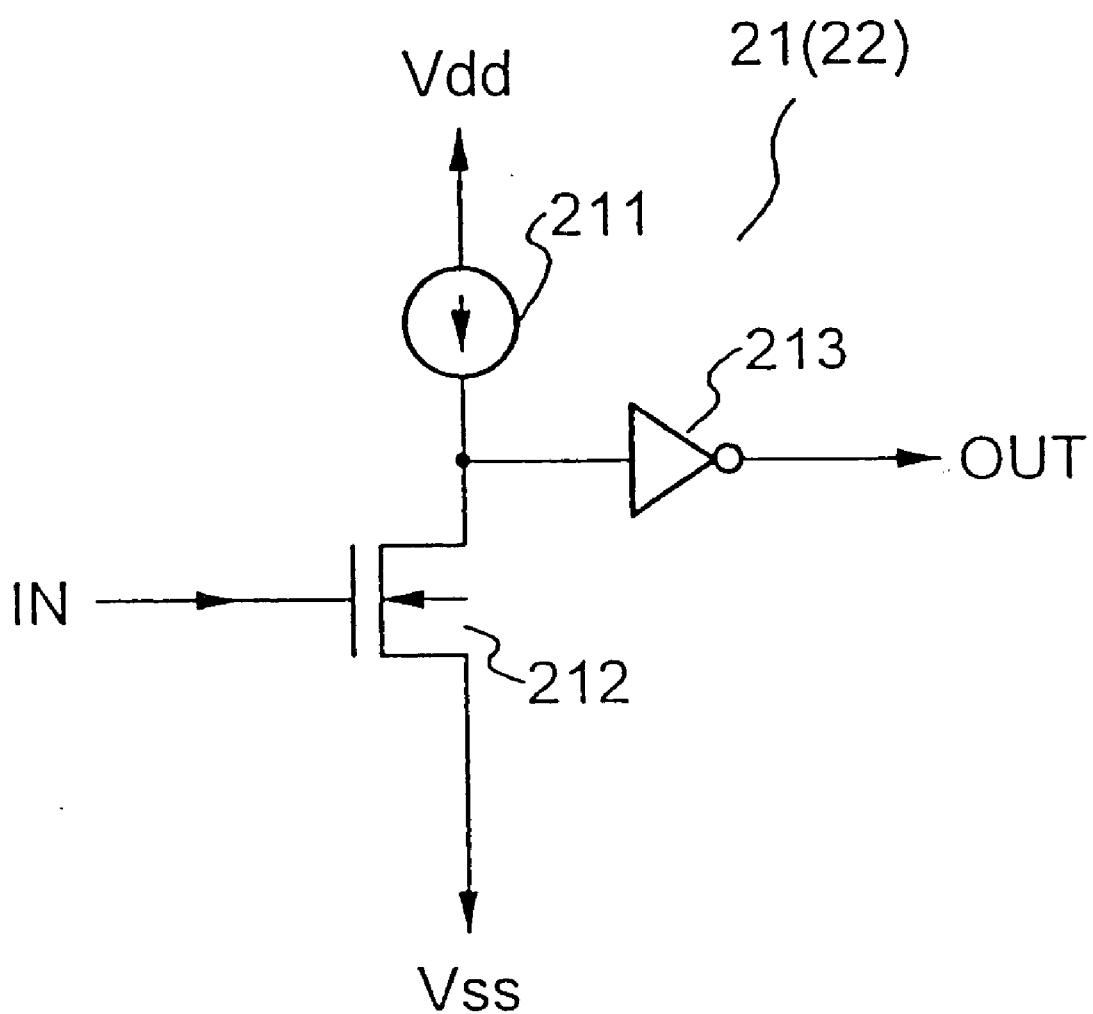
FIG. 18 is a circuit diagram showing one example of a generated voltage detector circuit in accordance with the fifth embodiment.

FIG. 18 shows one example of the construction of the generated voltage detector circuit 21 (22).

Referring to FIG. 18, a constant current source 211 is connected between the high-potential voltage Vdd and the drain of an N-channel transistor 212, and the source of the transistor 212 is connected to the low-potential voltage Vss. The threshold voltage Vth21 (Vth22) of the transistor 212 is determined by the current supplied by the constant current source 211 and the size of the transistor 212. The value of the threshold voltage Vth21 (Vth22) to be set will be discussed later.

When the voltage at the terminal AG2 (AG1), namely, an input signal, becomes higher than the threshold voltage Vth21 (Vth22), the transistor 212 is turned on, driving the drain voltage thereof to a low level. When the voltage at the terminal AG2 (AG1) becomes lower than the threshold voltage Vth21 (Vth22), the drain voltage of the transistor 212 is driven to a low level. The transistor 212 and the constant current source 211 constitute an inverter, and the output signal of the transistor 212 is output through an inverter 213. Specifically, the generated voltage detector circuit 21 (22) generates the signal which is transitioned to a high level when the input voltage is higher than the threshold voltage Vth21 (Vth22), and which is transitioned to a low level when the input voltage is lower than the threshold voltage Vth21 (Vth22). The constant current source 211 may be fabricated of a depletion-type transistor or a current mirror circuit. Alternatively, using a combination of a resistor element and a P-channel transistor, instead of the constant current source 211, an inverter may be formed in combination with the transistor 212.

The OR gate 11 OR-gates the output signal of the generated voltage detector circuit 21 and the output signal of the comparator COM1, and feeds the OR gated signal to the gate of the transistor P1. When the voltage at the terminal AG2 is higher than the threshold voltage Vth21, the output signal of the OR gate 21 is driven to a high level, regardless of the level of the output signal of the comparator COM1. The OR gate 12 operates in the same manner as the OR gate 11.

The power supplying device shown in FIG. 28 drops in rectification efficiency, because the transistors P1 and P2 are turned on because of the response delay of the comparators COM1 and COM2 when they should be turned off.

For instance, for a duration from time t1 to time t3 in FIG. 29, the voltage at the terminal AG1 is maintained at the high-potential voltage Vdd because the transistor P1 remains turned on. Focusing on the voltage at the terminal AG2 for that duration, the voltage is found to vary from a low voltage to a high voltage.

The variation (phase) in the voltage of the generator 100 can be detected referring to the voltage at the terminal AG2 while the transistor P1 connected to the one terminal AG1 is turned on. If the turning off of the transistor P1 is controlled based on the detection result, the charging of the high-capacitance capacitor 140 is also controlled in accordance with the variation in the voltage generated by the generator 100.

The generated voltage detector circuits 21 and 22 and the OR gates 11 and 12 are arranged to perform this control. When the transistor connected to the one terminal is turned on, the voltage at the other terminal is compared with the predetermined threshold voltages Vth21 and Vth22 to determine that the voltage generated by the generator 100 is insufficient to charge the high-capacitance capacitor 140, and the one transistor is forced to turn off based on the detection result.

The threshold voltages Vth21 and Vth22 are determined to detect that the voltage generated by the generator 100 is sufficient to charge the high-capacitance capacitor 140. Specifically, the threshold voltages Vth21 and Vth22 are set to be at least within a range between the low-potential voltage vss and the high-potential voltage Vdd.

The parasitic diodes D1–D4 are embedded when the respective transistors P1, P2, N3, and N4 are integrated. Since the bulks (bodies) of the transistors P1 and P2 are connected to the high-potential voltage Vdd, the parasitic diodes D1 and D2 of the transistors P1 and P2 are produced in directions represented by dotted lines. Since the bulks (bodies) of the transistors N3 and N4 are connected to the low-potential voltage Vss, the parasitic diodes D3 and D4 are produced in directions represented by dotted lines. The directions of the parasitic diodes D1–D4 are thus aligned with the directions of currents which flow through the respective transistors when these transistors are turned on.

In this embodiment, the voltage drop of each of the parasitic diodes D1–D4 is designated Vf. When the voltage at the terminal AG1 rises above Vdd+Vf, the parasitic diode D1 is turned on, thereby allowing a current to flow from the terminal AG1 to the high-capacitance capacitor 140. Even if the comparators COM1 and COM2 have large response delay time, the rectification is performed through the parasitic diodes.

When the charging current flows through the parasitic diodes D1–D4, parasitic transistors may become conductive, causing a latchup. The latchup is a phenomenon unique to CMOSs and LSIs, and can be prevented by integrated circuit techniques, such as a guard band and trench isolation.

[7.3] Operation of the Fifth Embodiment

Figure 19:
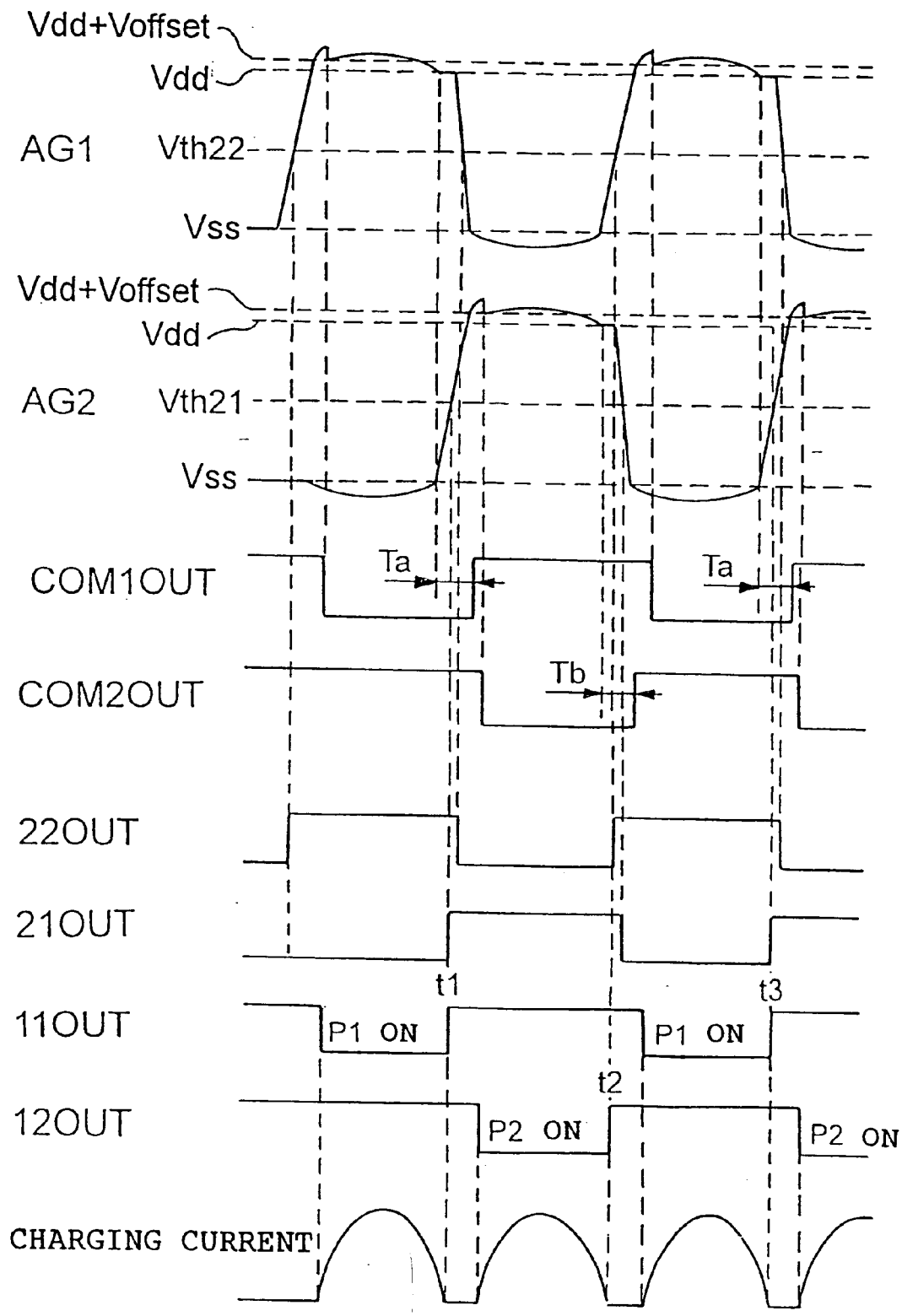
FIG. 19 is a timing diagram explaining the operation of the power supplying device of the fifth embodiment.
Figure 20:
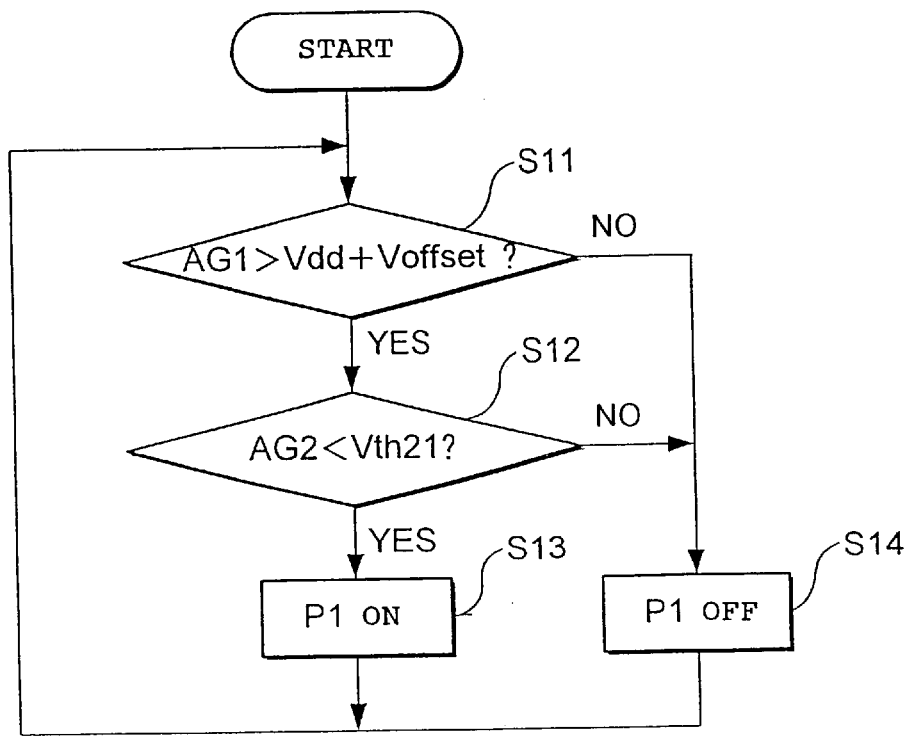
FIG. 20 is a process flow diagram explaining the operation of the power supplying device of the fifth embodiment.
Figure 20:
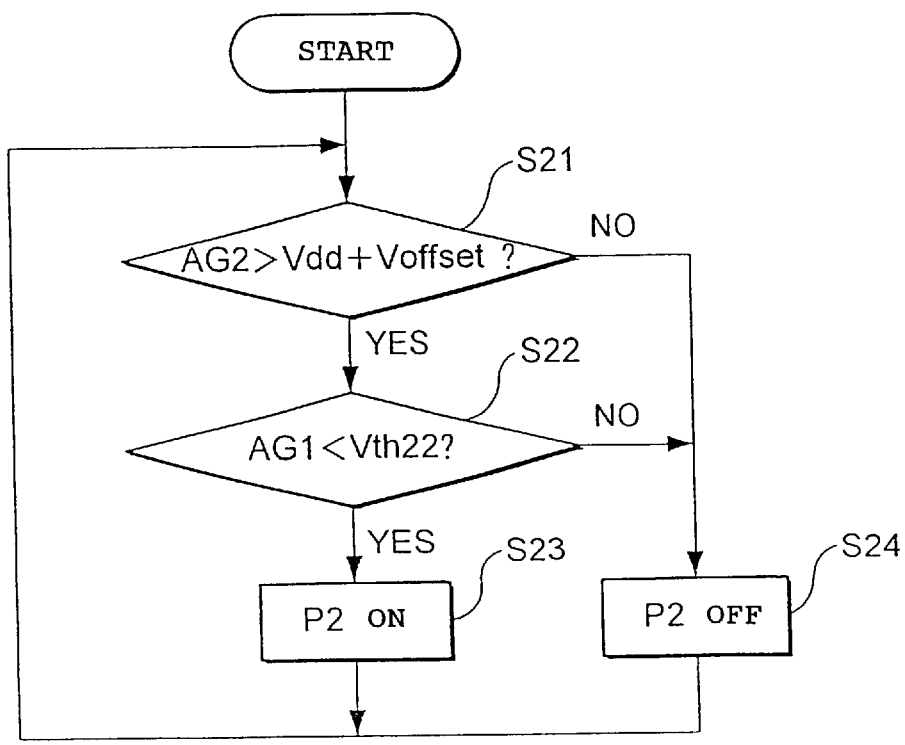

The operation of the power supplying device of this embodiment is now discussed. FIG. 19 is a timing diagram of the power supplying device of this embodiment. FIGS. 20(a) and 20(b) are process flow diagrams.

The comparator COM1 determines whether the voltage at the terminal AG1 rises above the high-potential voltage Vdd+the offset voltage Voffset (step S11).

When it is determined in step S11 that the voltage at the terminal AG1 is higher than the high-potential voltage Vdd+the offset voltage Voffset (yes in step S11), the comparator COM1 starts operating to transition the output signal thereof from a high level to a low level, and after the response delay time has elapsed, the output signal thereof is switched to a low level.

The generated voltage detector circuit 21 determines whether the voltage at the terminal AG2 is lower than the threshold voltage Vth21 (step S12).

When it is determined in step S12 that the voltage at the terminal AG2 is lower than the threshold voltage Vth21 (yes in step S12), the generated voltage detector circuit 21 generates a signal that is transitioned to a low level, thereby turning on the transistor P1 (step S13).

When it is determined in step S11 that the voltage at the terminal AG1 is lower than the high-potential voltage Vdd+ the offset voltage Voffset (no in step S11), the comparator COM1 starts operating to transition the output signal thereof from a low level to a high level, and after the response delay time has elapsed, the output signal thereof is driven to a high level, thereby turning off the transistor P1 (step S14). The output signal of the comparator COM1 still remains at a low level, because of the response delay time, for a duration Ta during which the transistor P1 should be turned off.

Similarly, the comparator COM2 determines whether the voltage at the terminal AG2 rises above the high-potential voltage Vdd+the offset voltage Voffset (step S21).

When it is determined in step S21 that the voltage at the terminal AG2 is higher than the high-potential voltage Vdd+the offset voltage Voffset (yes in step S21), the comparator COM2 starts operating to transition the output signal thereof from a high level to a low level, and after the response delay time has elapsed, the output signal thereof is transitioned to the a low level.

The generated voltage detector circuit 22 determines whether the voltage at the terminal AG1 drops below the threshold voltage Vth22 (step S22).

When it is determined in step S22 that the voltage at the terminal AG1 is lower than the threshold voltage Vth22 (yes in step S22), the generated voltage detector circuit 21 generates a signal that is transitioned to a low level, thereby turning on the transistor P2 (step S23).

When it is determined in step S21 that the voltage at the terminal AG2 is lower than the high-potential voltage Vdd+ the offset voltage Voffset (no in step S21), the comparator COM2 starts operating to transition the output signal thereof from a low level to a high level, and after the response delay time has elapsed, the output signal thereof is driven to a high level, thereby turning off the transistor P2 (step S24). The output signal of the omparator COM2 still remains at a low level, because of the response delay time, for a duration Tb during which the transistor P2 should be turned off.

When the voltage at the terminal AG2 is higher than the threshold voltage Vth21 (when the voltage difference between the voltage at the terminal AG2 and the low-potential voltage Vss exceeds the threshold voltage Vth), the output signal of the generated voltage detector circuit 21 is driven to a high level.

The threshold voltage Vth21 is set to be within a range between the low-potential voltage Vss and the high-potential voltage Vdd. After the voltage at the terminal AG2 rises above the low-potential voltage Vss, the output signal of the generated voltage detector circuit 21 is transitioned to a low level to a high level, forcing the transistor P1 to be turned off. While the voltage at the terminal AG2 is lower than the low-potential voltage Vss, the voltage generated by the generator 100 enables a charging current to flow into the high-capacitance capacitor 140, and it is not preferred to force the transistor P1 to be turned off during this duration.

Since the threshold voltage Vth21 is set to be higher than the low-potential voltage Vss, no such inconvenience occurs.

The transistor P1 is controlled for an on-and-off operation by the output signal of the OR gate 11. Even if the output signal of the comparator COM1 is at a low level for the duration Ta, during which the transistor P1 should be turned off, the transistor P1 can be forcibly turned off after time t1 (t3) at which the output signal of the generated voltage detector circuit 21 is driven to a high level. With the transistor P1 turned off, the duration during which the voltage at the terminal AG1 coincides with the high-potential voltage Vdd is shortened. The voltage at the terminal AG1 falls at an angle substantially equal to an angle of the rising edge thereof, and the voltage waveform of the voltage at the terminal AG1 becomes symmetrical.

The generated voltage detector circuit 21, the comparator COM1, the OR gate 11, and the transistor P1 are symmetrically arranged to the generated voltage detector circuit 22, the comparator COM2, the OR gate 12, and the transistor P2.

In the same way as already discussed, the output signal of the generated voltage detector circuit 22 is driven to a high level even if the output signal of the comparator COM2 is at a low level for the duration Tb, during which the transistor P2 should remain off.

At time t2 thereafter, the transistor P2 is forcibly turned off. With the transistor P2 turned on, the duration during which the voltage at the terminal AG2 coincides with the high-potential voltage Vdd is shortened.

The voltage at the terminal AG2 falls at an angle substantially equal to an angle of the rising edge thereof, and the voltage waveform of the voltage at the terminal AG2 becomes symmetrical.

During the on-period of the transistor P1, a charging current flows in a closed loop of the terminal AG1→transistor P1→high-capacitance capacitor 140→transistor N4→terminal AG2, and during the on-period of the transistor P2, a charging current flows in a closed loop of the terminal AG2→transistor P2→high-capacitance capacitor 140→transistor N3→terminal AG1. The charging of the high-capacitance capacitor 140 is controlled with a short delay time relative with respect to variations (phase) in the voltage generated by the generator 100.

In accordance with the fifth embodiment, focusing on the other terminal AG2 (AG1) opposed to the one terminal AG1 (AG2) to which the transistor P1 (P2) is connected, the voltage at the other terminal AG2 (AG1) is compared with the threshold hold voltage Vth21 (vth22) to detect the duration of time during which the transistor P1 (P2) should be turned off. Based on the detection result, the transistor P1 (P2) is forced to turn off. For this reason, full-wave rectification is performed at a high rectification efficiency even if the comparators COM1 and COM2 having a long response delay time, namely, having a small power consumption are used. With this arrangement, both a reduction in the power consumption and an improvement in the rectification efficiency in the comparators COM1 and COM2 are satisfied at the same time, and the performance of the power supplying device is substantially improved.

8 Sixth Embodiment

[8.1] Construction of the Sixth Embodiment

The power supplying device of a sixth embodiment of the present invention is now discussed, referring to the drawings.

Figure 21:
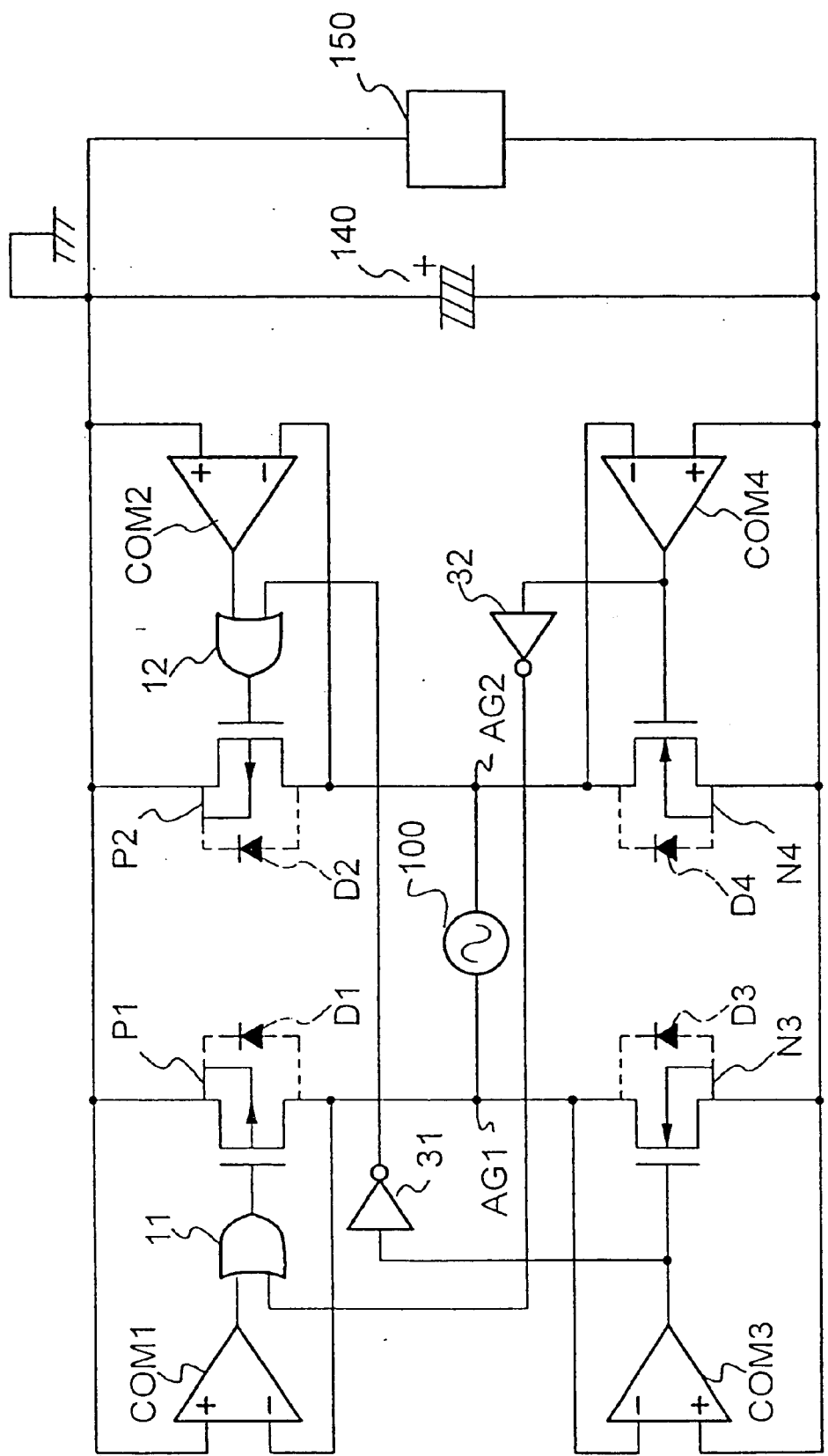
FIG. 21 is a circuit diagram showing the construction of the power supplying device of a sixth embodiment of the present invention.

FIG. 21 is a block diagram of the power supplying device of the sixth embodiment.

The power supplying device of the sixth embodiment is identical to the power supplying device of the fifth embodiment shown in FIG. 17, except that comparators COM3 and COM4 are arranged to control transistors N3 and N4 with the output signal thereof for on-and-off control, and that the output signals of the comparators COM1 and COM2, instead of the output signals of the generated voltage detector circuits 21 and 22, are fed to OR gates 11 and 12 through inverters 32 and 31.

The comparator COM3 is configured with the positive input terminal thereof connected to the low-potential voltage Vss and the negative input terminal thereof connected to the terminal AG1, and when the voltage at the terminal AG1 rises above the low-potential voltage Vss–offset voltage Voffset, the comparator COM3 outputs a high-level output signal, turning on the transistor N3.

The comparator COM4 is configured with the positive input terminal thereof connected to the low-potential voltage Vss and the negative input terminal thereof connected to the terminal AG2, and when the voltage at the terminal AG2 rises above the low-potential voltage Vss–offset voltage Voffset, the comparator COM4 outputs a high-level output signal, turning on the transistor N4.

The specific circuit arrangement of the comparators COM3 and COM4 remains unchanged from that shown in FIG. 5.

The comparator COM3 has an operating current larger than that of the comparator COM2, and is able to fast operate. For this reason, the response delay time of the comparator COM3 is short in comparison with that of the comparator COM2.

Similarly, the comparator COM4 has an operating current larger than that of the comparator COM1, and the response delay time of the comparator COM4 is short in comparison with that of the comparator COM1.

The comparator COM4 (COM3) can detect faster the duration during which the transistor P1 (P2) should be turned off, than the comparator COM1 (COM2). In the sixth embodiment, the transistor P1 (P2) is forced to turn off by feeding the output signal of the comparator COM4 (COM3) to the OR gate 11 (12) via the inverter 32 (31). The operation of the comparator COM1 (COM2) having a long response delay time is compensated for by the comparator COM4 (COM3) having a short response delay time. The transistors P1, P2, N3, and N4 are thus controlled with a short response delay time with respect to the variations in the voltage generated by the generator 100.

[8.2] Operation of the Sixth Embodiment

Figure 22:
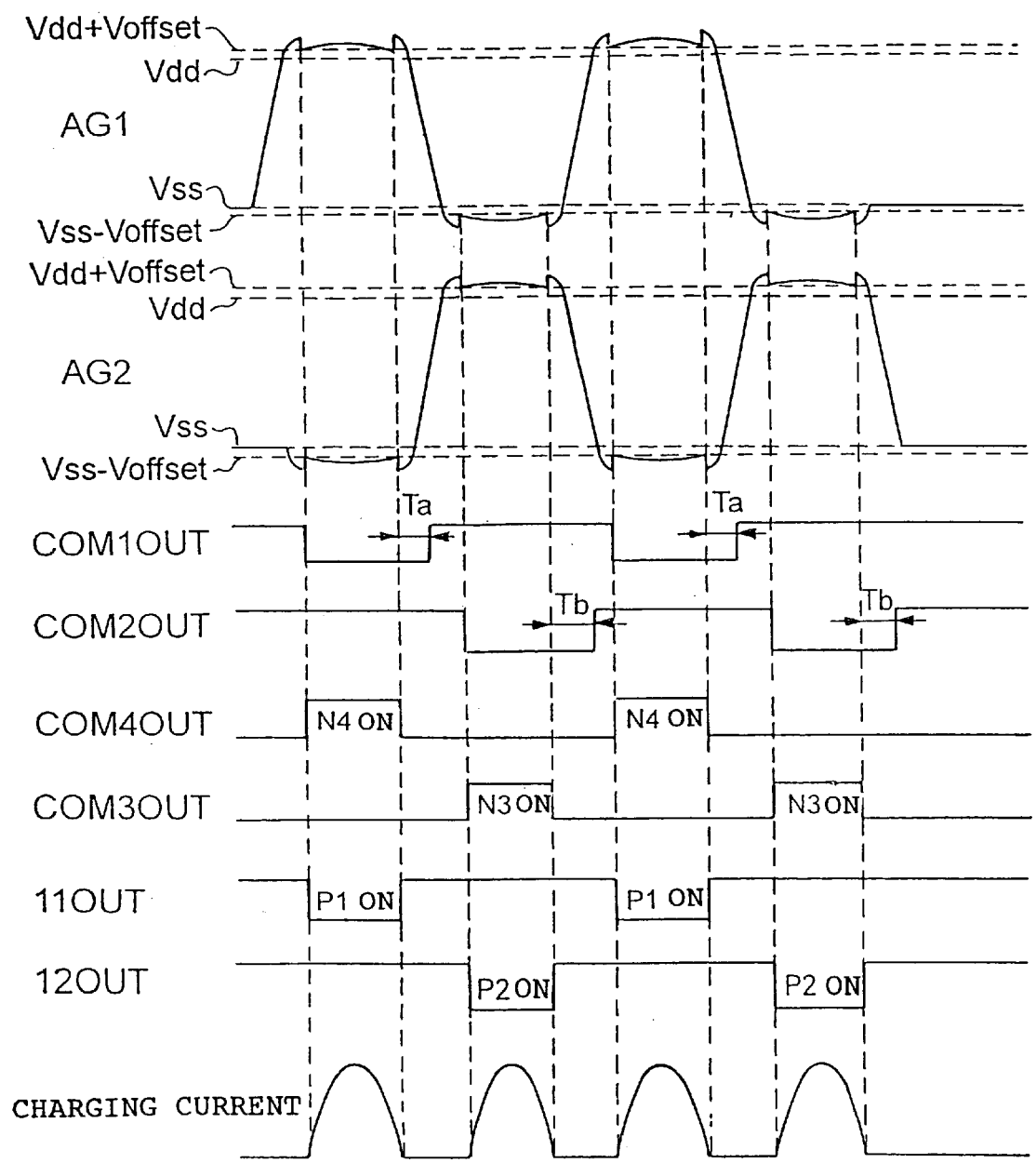
FIG. 22 is a timing diagram explaining the operation of the power supplying device of the sixth embodiment.
Figure 23:
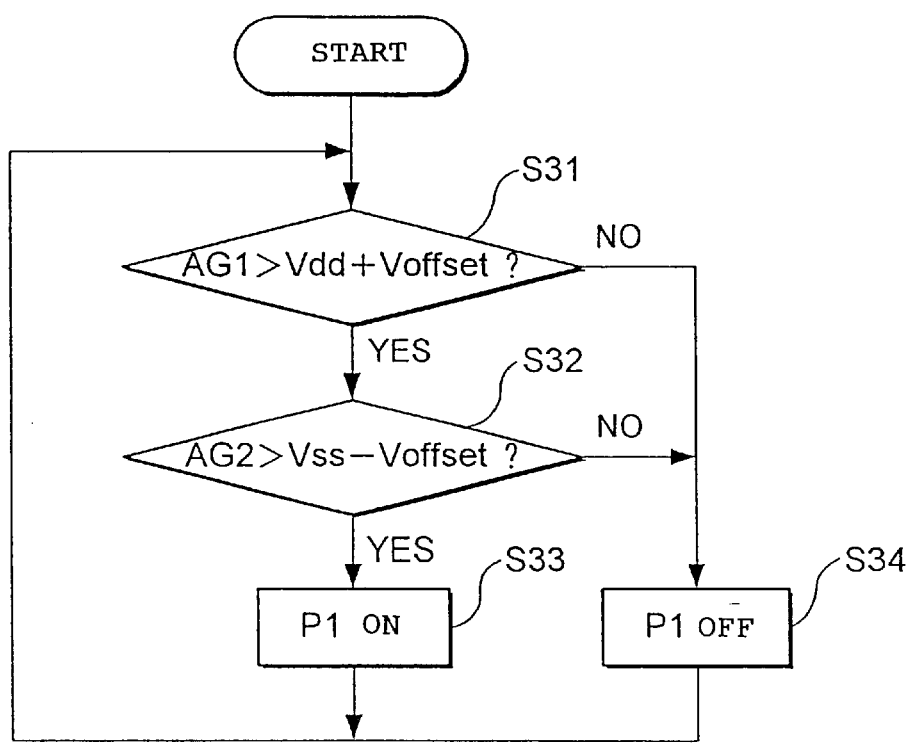
FIG. 23 is a process flow diagram explaining the operation of the power supplying device of the sixth embodiment.
Figure 23:
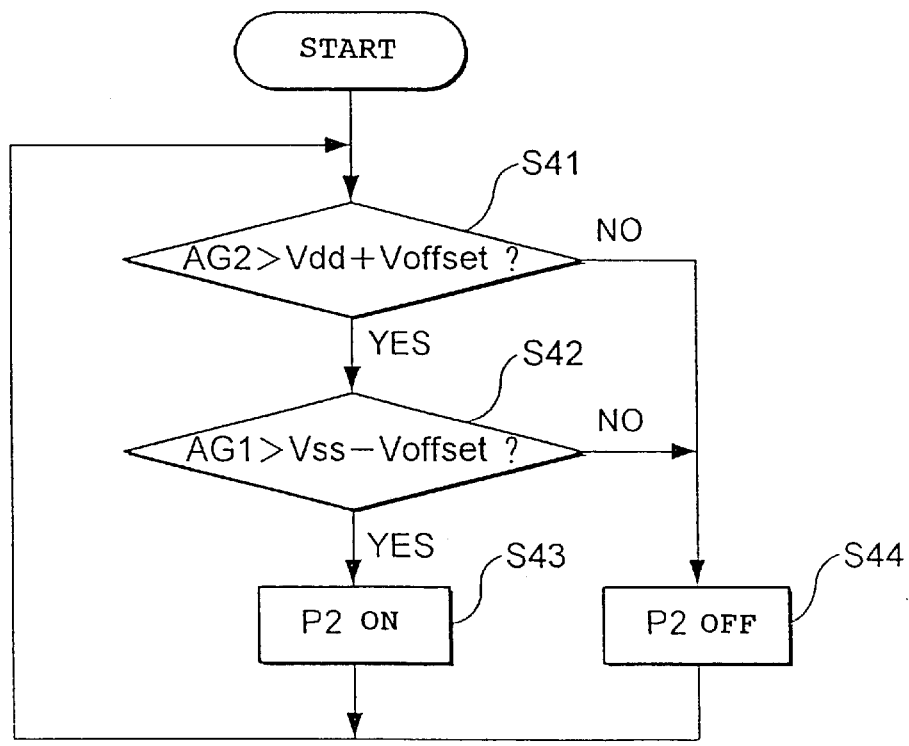

The operation of the power supplying device of this embodiment is discussed. FIG. 22 is a timing diagram of the power supplying device of the sixth embodiment, and FIG. 23(*a*) and FIG. 23(*b*) are process flow diagrams.

Since the comparators COM1 and COM2 have a reduced current consumption, they have a relatively long response delay time. For this reason, the output signals of the comparators COM1 and COM2 remain at a low level for durations Ta and Tb, during which the transistors P1 and P2 should respectively be turned off.

On the other hand, since the comparators COM3 and COM4 have a relatively large operating current, the response delay time thereof is short. The output signal of the comparator COM3 is at a high level for the duration throughout which the voltage at the terminal AG1 is lower than the low-potential voltage Vss–the offset voltage offset, and the output signal of the comparator COM4 is at a high level for the duration throughout which the voltage at the terminal AG2 is lower than the low-potential voltage Vss–the offset voltage Voffset.

The OR gate 11 gives the output thereof by OR-gating the output signal provided by the comparator COM4 and then inverted by the inverter 32 and the output signal of the comparator COM1. The output of the OR gate 11 is at a high level for the duration Ta during which the output signal of the comparator COM1 is at a low level because of the response delay time thereof. The transistor P1 is thus forced to turn off, although the output signal of the comparator COM1 is at a low level for the duration Ta.

Similarly, the OR gate 12 gives the output thereof by OR-gating the output signal provided by the comparator COM3 and then inverted by the inverter 31 and the output signal of the comparator COM2. The output of the OR gate 12 is at a high level for the duration Tb during which the output signal of the comparator COM2 is at a low level because of the response delay time thereof. The transistor P2 is forced to turn off, although the output signal of the comparator COM2 is at a low level for the duration Tb.

Specifically, the comparator COM1 determines whether the voltage at the terminal AG1 is higher than the high-potential voltage Vdd+the offset voltage Voffset (step S31).

When it is determined in step S31 that the voltage at the terminal AG1 is lower than the high-potential voltage Vdd+ the offset voltage Voffset (no in step S31), the transistor P1 is turned off in response to the output signal from the comparator COM1 (or is maintained at the off state) (step S34).

When it is determined in step S31 that the voltage at the terminal AG1 is higher than the high-potential voltage Vdd+the offset voltage Voffset (yes in step S31), the comparator COM4 determines whether the voltage at the terminal AG2 is higher than the low-potential voltage Vss–the offset voltage Voffset (step S32).

When it is determined in step S32 that the voltage at the terminal AG2 is lower than the low-potential voltage Vss– the offset voltage Voffset (no in step S32), the transistor P1 is turned off in response to the output signal of the comparator COM4 (or is maintained at the off state) (step S34).

When it is determined in step S32 that the voltage at the terminal AG2 is higher than the low-potential voltage Vss– the offset voltage Voffset (yes in step S32), the transistor P1 is turned on in response to the output signal of the comparator COM4 (step S34).

Similarly, the comparator COM2 determines whether the voltage at the terminal AG2 rises above the high-potential voltage Vdd+the offset voltage Voffset (step S41).

When it is determined in step S41 that the voltage at the terminal AG2 is lower than the high-potential voltage Vdd+ the offset voltage Voffset (no in step S41), the transistor P1 is turned off in response to the output signal of the comparator COM2 (or is maintained at the off state).

When it is determined in step S41 that the voltage at the terminal AG2 is higher than the high-potential voltage Vdd+the offset voltage Voffset (yes in step S41), the comparator COM3 determines whether the voltage at the terminal AG1 rises above the low-potential voltage Vss–the offset voltage Voffset (step S42).

When it is determined in step S42 that the voltage at the terminal AG1 is lower than the low-potential voltage Vss– the offset voltage Voffset (no in step S42), the transistor P2 is turned off in response to the output signal of the comparator COM3 (or is maintained at the off state) (step S44).

When it is determined in step S42 that the voltage at the terminal AG1 is higher than the low-potential voltage Vss– the offset voltage Voffset (yes in step S42), the transistor P2 is turned on in response to the output signal of the comparator COM3.

As a result, for a duration during which the voltage at the terminal AG1 is higher the high-potential voltage Vdd+the offset voltage Voffset, and during which the voltage at the terminal AG2 is lower than the low-potential voltage Vss–the offset voltage Voffset, a current flows through a closed loop of the terminal AG1→transistor P1→high-capacitance capacitor 140→transistor N4→terminal AG2.

For a duration during which the voltage at the terminal AG2 is higher the high-potential voltage Vdd+the offset voltage Voffset, and during which the voltage at the terminal AG1 is lower than the low-potential voltage Vss–the offset voltage Voffset, a current flows through a closed loop of the terminal AG2→transistor P2→high-capacitance capacitor 140→transistor N3→terminal AG1. The high-capacitance capacitor 140 is thus charged.

In accordance with the sixth embodiment, the response delay time caused by the comparators COM1 and COM2 with the reduced power consumption is substantially shortened by using the output signals of the fast comparators COM3 and COM4. The reduction in the power consumption and the improvement in the rectification efficiency are satisfied at the same time, and the performance of the power supplying device is substantially improved.

9 Seventh Embodiment

Discussed next is an electronic timepiece (wristwatch) as an example of the electronic equipment incorporating the power supplying device of the present invention.

The construction of the electronic timepiece remains identical to that of the electronic timepiece shown in FIG. 11 and the discussion thereabout is omitted here.

Figure 24:
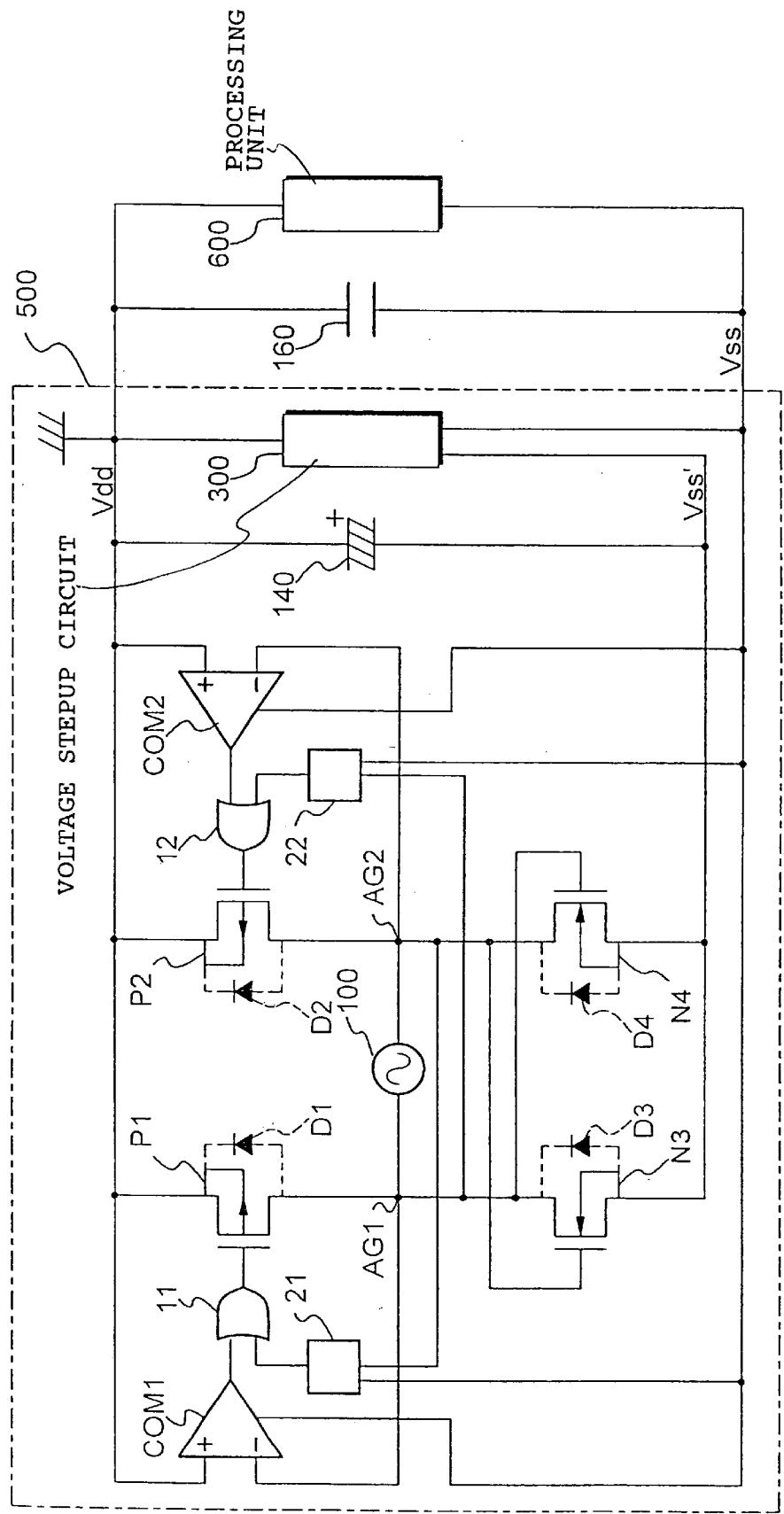
FIG. 24 is a diagram roughly showing the electronic timepiece of a seventh embodiment of the present invention.

FIG. 24 is a block diagram showing the electrical arrangement of the electronic timepiece. As shown, the electronic timepiece employs the power supplying device of the first embodiment. The power supplying device 500 in the electronic timepiece further includes a voltage boost circuit 300.

The voltage boost circuit 300 steps up a voltage charged at the capacitor 140 as necessary, and charges the auxiliary capacitor 160, and then feed power to the processing unit 600, the comparators COM1 and COM2, and the generated voltage detector circuits 21 and 22 as the load of the electronic timepiece. More in detail, when the power source voltage, represented by a line-to-line voltage (absolute value) between the low-potential voltage Vss and the high-potential voltage Vdd as a common voltage, drops down to a lower voltage limit value (or in the vicinity of the lower voltage limit value) able to drive circuits in operation, the voltage boost circuit 300 raises a voltage boost rate number by one step. When the power source voltage rises to an upper voltage limit value (or in the vicinity of the upper voltage limit value), the voltage boost circuit 300 lowers the voltage boost rate number by one step.

When the charging of the capacitor 140 is insufficient, the power source voltage Vss is maintained within an operating voltage range by the auxiliary capacitor 160, and the comparators COM1 and COM2, and the generated voltage detector circuit 21 and 22 are still able to control the transistors P1 and P2, thereby rectifying a small-amplitude alternating voltage.

Even when the comparators COM1 and COM2 are inoperative through voltage boost with the charging of the capacitor 140 insufficient, the capacitor 140 can be still charged through rectification by the diode bridge composed of the parasitic diodes D1–D4 as already discussed.

Alternatively, the power supplying device of the fifth embodiment may be employed.

10 Modifications of the Fifth Embodiment–the Seventh Embodiment

The fifth embodiment–seventh embodiment can be modified into a diversity of modifications.

[10.1] First Modification

Figure 25:
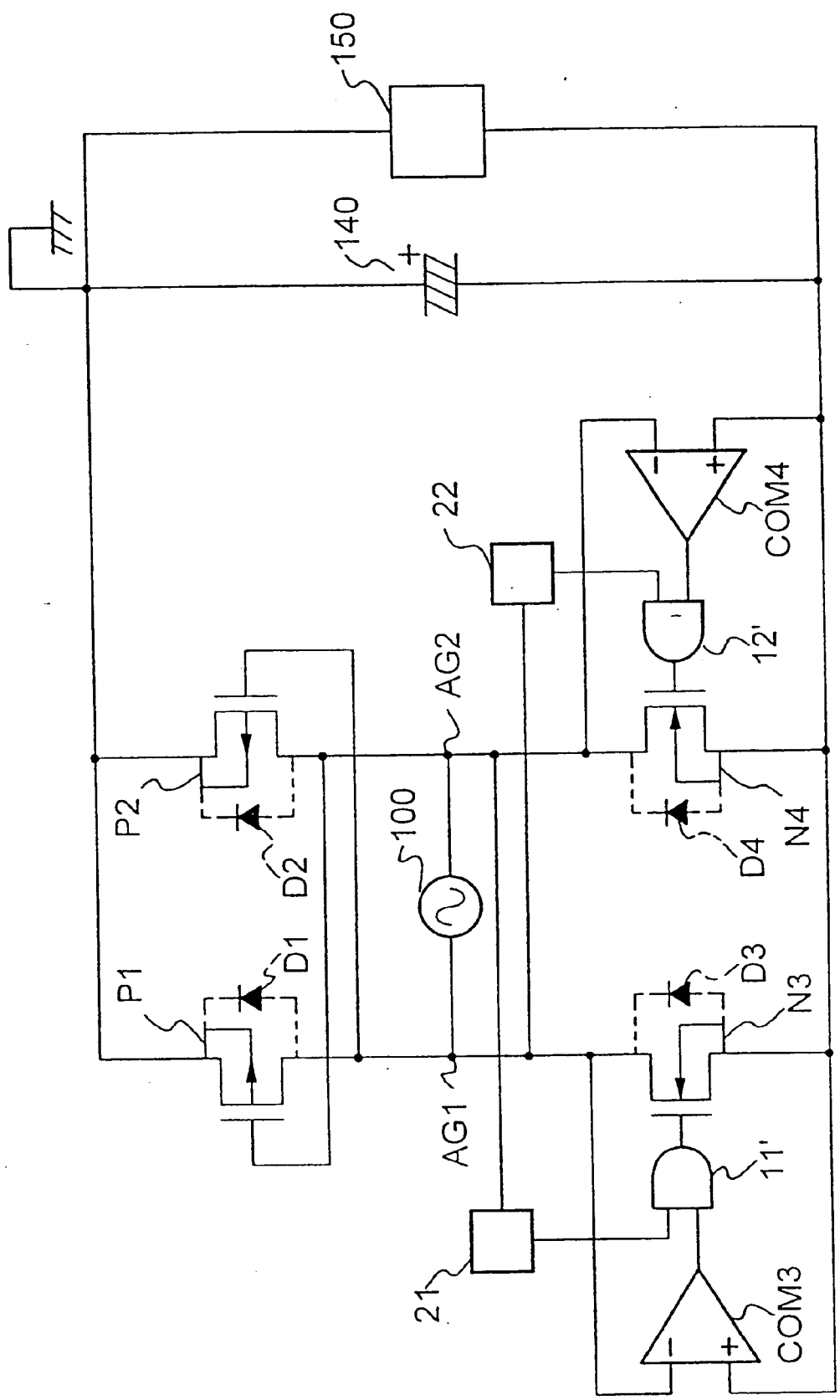
FIG. 25 is a circuit diagram showing the construction of a first modification of the power supplying device.

FIG. 25 is a circuit arrangement of a first modification.

In the power supplying device of the above-referenced fifth embodiment, the comparators COM1 and COM2 are connected to the high-potential voltage Vdd. Alternatively, the comparators COM1 and COM2 may be connected to the low-potential voltage Vss. In this case, the power supplying device may be arranged as shown in FIG. 25. The generated voltage detector circuit 21 (22) generates a signal which is transitioned to a low level when the voltage at the terminal AG2 (AG1) is lower than the threshold voltage Vth, and which is transitioned to a high level when the voltage at the terminal AG2 (AG1) is higher than the threshold voltage Vth. For this reason, AND gates 11' and 12' respectively force the transistors N3 and N4 to turn off even when the comparators COM3 and COM4 output high-level output signals. The modification provides the same advantage as that of the first embodiment.

[10.2] Second Modification

In the fifth embodiment, diodes may be substituted for the transistors N3 and N4. In the above second modification, diodes may be substituted for the transistors P1 and P2.

[10.3] Third Modification

Figure 26:
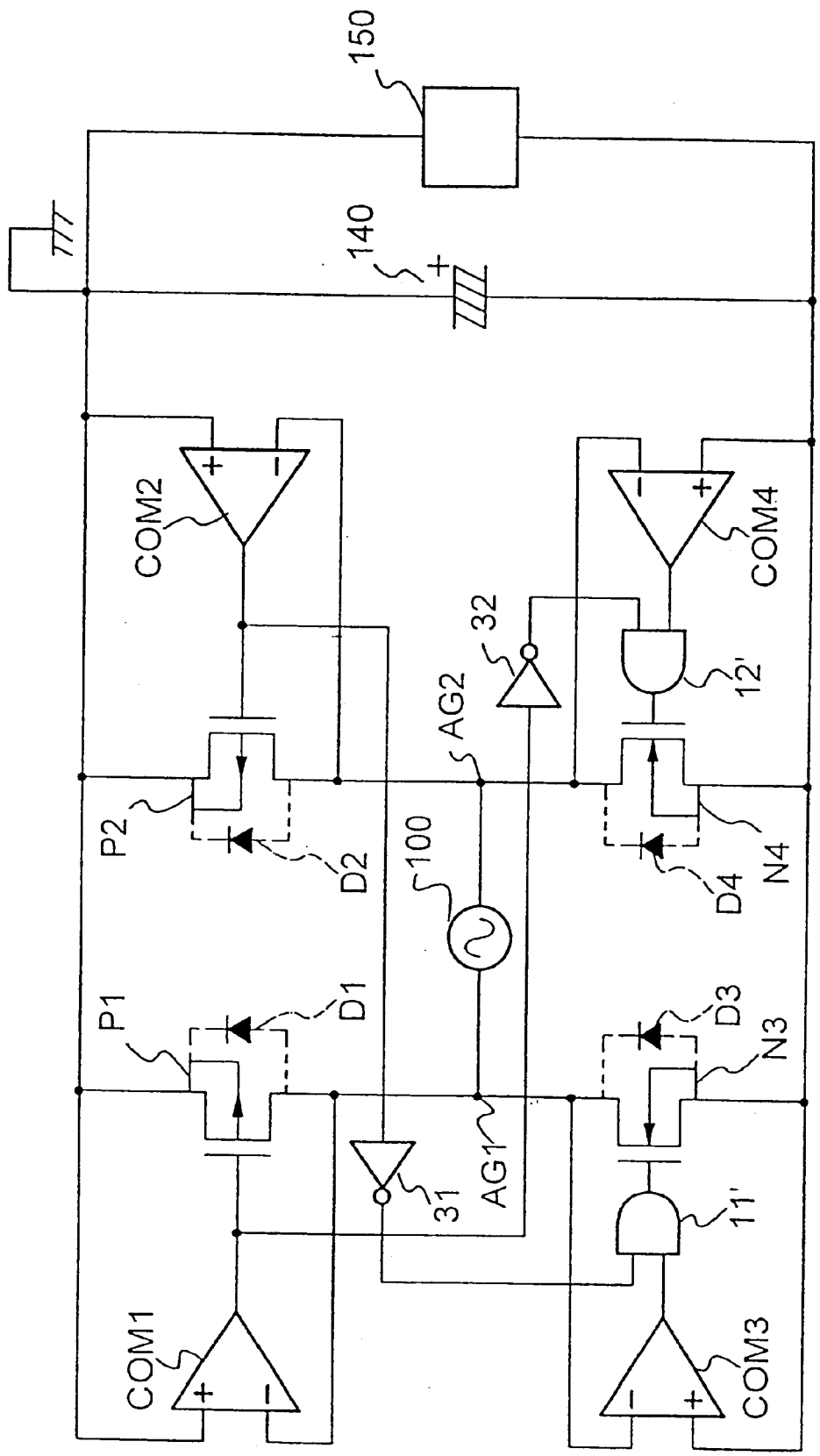
FIG. 26 is a circuit diagram showing the construction of a second modification of the power supplying device.

FIG. 26 shows a circuit arrangement of a third modification.

In the above-referenced sixth embodiment, the operating current of the comparator COM1 (COM2) may be set to be larger than that of the comparator COM4 (COM3). In this case, the power supplying apparatus may be arranged as shown in FIG. 26. In this example, when the output signal of the comparator COM1 (COM2) is transitioned to a high level (to switch the transistor P1 (P2) from on to off), the output signal is inverted through the inverter 32 (31), and is fed to the AND gate 12' (11'). Even if the output signal of the comparator COM4 (COM3) is a high-level signal, the transistor N4 (N3) is forced to turn off. The modification provides the same advantage as that of the second embodiment.

[10.4] Fourth Modification

As discussed above, the comparators (COM1–COM4) are continuously operated.

However, if the generator 100 does not generate power, the rectification operation is not needed, and leaving the comparators (COM1–COM4) in operation are not preferable from the standpoint of power consumption.

Figure 27:
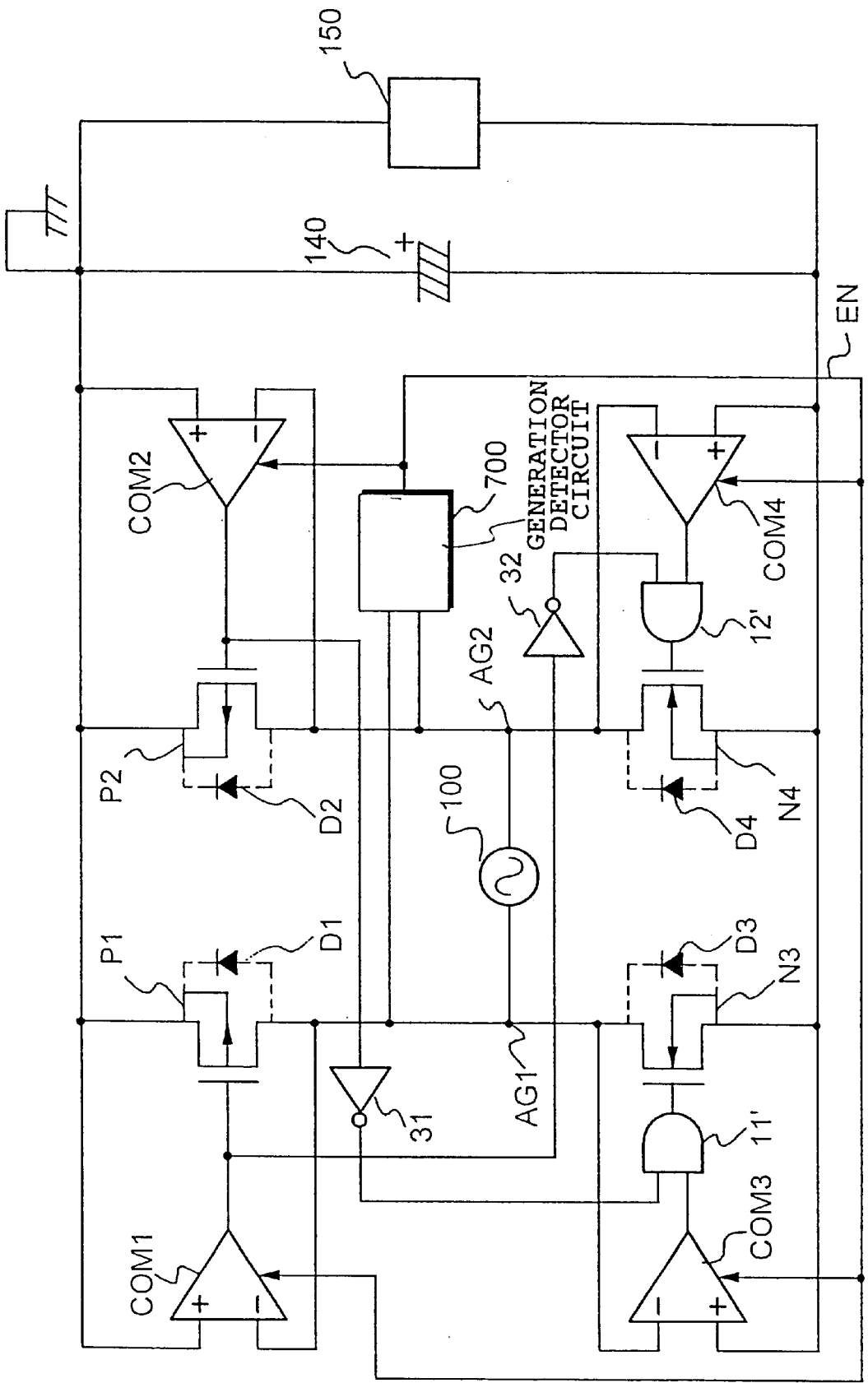
FIG. 27 is a circuit diagram showing the construction of a fourth modification of the power supplying device.

In a fourth modification, a generated voltage detector circuit 700 for detecting the voltage generated between the output terminals AG1 and AG2 of the generator 100 is arranged as shown in FIG. 27. The generated voltage detector circuit 700 detects generation (generated voltage), outputting enable signals to the comparators COM1–COM4 to put the comparators COM1–COM4 into operation. The generated voltage detector circuit 700 may have a construction identical to the one discussed in connection with the fifth embodiment, and may serve as the one discussed in connection with the fifth embodiment at the same time.

The power consumption during no-power generation period with rectification operation not needed is thus reduced, and the operating time of the portable electronic equipment is thus prolonged.

The fourth modification is applicable to the first through fourth embodiments.

[10.5] Fifth Modification

In the fifth through seventh embodiments and modifications, the transistors P1, P2, N3, N4, PS, and N6 are fabricated of N-channel field-effect transistors or P-channel field-effect transistors. Alternatively, the transistors may be NPN bipolar transistors or PNP bipolar transistors. In case of the bipolar transistors, the saturation voltage between the emitter and the collector is typically 0.3 V or so, and the field-effect type is preferred to the bipolar transistor when the voltage generated by the generator 100 remains small.

The transistors P1, P2, N3, N4, PS, and N6 are designed to form the parasitic diodes D1–D6. When no parasitic diodes are formed, separate diodes may be connected in parallel with the respective transistors.

In each of the preceding embodiments, the component storing power is the capacitor 140. Any component works, as long as the component stores electric power. For instance, a secondary battery is also acceptable.

In each of the above embodiments, the common potential is referenced to the high-potential voltage Vdd, but the low-potential voltage Vss may be used as a common potential.

[10.6] Sixth Modification

Besides the one shown in FIG. 11, the generator 100 may be a type which creates a rotary motion using a restoring force of a mainspring and generates an electromotive force from the rotary motion, or may be a type which makes use of the piezoelectric effect for power generation by exerting a vibration or displacement to a piezoelectric material externally or in a self-driving fashion. It is important that the generator generate an alternating-current voltage, and the form of the generator is not important.

[10.7] Seventh Modification

Besides the electronic timepiece, electronic equipment in which the power source device of each of the above embodiments and modifications is incorporated may be a liquid-crystal television set, a video cassette recorder, a notebook personal computer, a portable telephone, a PDA (Personal Digital Assistant), or an electronic calculator. The power source device of the present invention may find applications in any type of electronic equipment as long as it consumes electric power. In such electronic equipment, electrical circuits and a mechanical system are operated from power fed by the generator rather than from a storage device such as a capacitor or a secondary battery. The electronic equipment is operative any time anywhere, is free from a troublesome battery replacement, and creates no problems relating to battery disposal.

11 Advantages of the Fifth Embodiment–the Seventh Embodiment

In accordance with the fifth through seventh embodiments, as discussed above, first and second switching units are faster turned off even if first and second comparator have longer response delay time. The turning off of the first and second switching unit is thus executed in synchronization with the phase of the alternating current voltage supplied to the power supplying device. As a result, even with the first and second comparator having a slow operating speed, namely, having a small operating current, a high rectification efficiency results, and the performance of the power supplying device is substantially improved.

12 Alternate Embodiments

Besides the above embodiments, the following alternate embodiments can be arranged.

[12.1] First Alternate Embodiment

A first alternate embodiment of a power supplying device for full-wave rectifying an alternating current voltage supplied to two input terminals to supply power to a first power source line and a second power source line, includes a first switching unit connected between the one input terminal and the first power source line, a second switching unit connected between the other input terminal and the first power source line, a first unit, connected between the one input terminal and the second power source line, for allowing a current to flow in one direction only, a second unit, connected between the other input terminal and the second power source line, for allowing a current to flow in one direction only, a first comparator for comparing a voltage at the one input terminal with a voltage at the first power source line, a second comparator for comparing a voltage at the other input terminal with the voltage at the first power source line, a first controller which controls the first switching unit for an on-and-off operation in response to the comparison result provided by the first comparator, while forcing the first switching unit to turn off in response to the voltage at the other input terminal even when the comparison result provided by the first comparator indicates that the first switching unit is turned on, and a second controller which controls the second switching unit for an on-and-off operation in response to the comparison result provided by the second comparator, while forcing the second switching unit to turn off in response to the voltage at the other input terminal even when the comparison result provided by the second comparator indicates that the second switching unit is turned on.

[12.1.1] Modification of the First Alternate Embodiment

In the first alternate embodiment, the first control unit may include a first detector unit for detecting that a voltage difference between the other input terminal and the second power source line becomes larger than a predetermined reference value, and a first control unit which controls the first switching unit for an on-and-off operation in response to the comparison result provided by the first comparator, while forcing the first switching unit to turn off in response to the detection result provided by the first detector unit even when the comparison result provided by the first comparator indicates that the second switching unit is turned on, and the second controller may include a second detector unit for detecting that a voltage difference between the one input terminal and the second power source line becomes larger than a predetermined reference value, and a second control unit which controls the second switching unit for an on-and-off operation in response to the comparison result provided by second comparator, while forcing the second switching unit to turn off in response to the detection result provided by the detector unit even when the comparison result provided by the second comparator unit indicates that the second switching unit is turned on.

[12.1.2] Second Modification of the First Alternate Embodiment

In the first alternate embodiment, the first unit may be a third switching unit that is controlled for an on-and-off operation in response to the voltage at the one input terminal, and the second unit may be a fourth switching unit that is controlled for an on-and-off operation in response to the voltage at the other input terminal.

In the second modification of the first alternate embodiment, the first through fourth switching unit may be fabricated of field-effect transistors.

In the second modification of the first alternate embodiment, the power supplying device may include a first diode connected in parallel with the first switching unit, a second diode connected in parallel with the second switching unit, a third diode connected in parallel with the third switching unit, and a fourth diode connected in parallel with the fourth switching unit. In this case, the first through fourth switching unit may be fabricated of field-effect transistors and the first through fourth diodes may be parasitic diodes of the respective field-effect transistors.

[12.1.3] Third Modification of the First Alternate Embodiment

In the first alternate embodiment, the first and second units may be fabricated of diodes.

[12.1.4] Fourth Modification of the First Alternate Embodiment

In a first alternate embodiment, the power supplying device may include a storage unit for storing power supplied by the first power source line and the second power source line.

[12.1.5] Fifth Modification of the First Alternate Embodiment

In the first alternate embodiment, the power supplying device may include an alternating current generator unit for generating an alternating current and for supplying a generated voltage to each input terminal.

[12.2] Second Alternate Embodiment

In a second alternate embodiment, a power supplying device for full-wave rectifying an alternating current voltage supplied to two input terminals to supply power to the first power source line and the second power source line, may include a first comparator for comparing a voltage at the one input terminal with a voltage at the first power source line, a second comparator for comparing a voltage at the other input terminal with the voltage at the first power source line, a third comparator which compares the voltage at the one input terminal with a voltage at the second power source line and has a response delay time shorter than that of the second comparator, a fourth comparator which compares the voltage at the other input terminal with the voltage at the second power source line, and has a response delay time shorter than that of the first comparator, a first switching unit connected between the one input terminal and the first power source line, a second switching unit connected between the other input terminal and the first power source line, a third switching unit connected between the one input terminal and the second power source line, and controlled for an on-and-off operation in response to the comparison result provided by the third comparator, a fourth switching unit connected between the other input terminal and the second power source line, and controlled for an on-and-off operation in response to the comparison result provided by the fourth comparator, a first controller which controls the first switching unit for an on-and-off operation in response to the comparison result provided by the first comparator, while forcing the first switching unit to turn off when the comparison result provided by the fourth comparator indicates the turning off of the fourth switching unit even when the comparison result provided by the first comparator indicates that the first switching unit is turned on, and a second controller which controls the second switching unit for an on-and-off operation in response to the comparison result provided by the second comparator, while forcing the second switching unit to turn off when the comparison result provided by the third comparator indicates the turning off of the third switching unit even when the comparison result provided by the second comparator indicates that the second switching unit is turned on.

[12.2.1] First Modification of the Second Alternate Embodiment

In the second alternate embodiment, the first through fourth switching unit may be fabricated of field-effect transistors.

[12.2.2] Second Modification of the Second Alternate Embodiment

In the second modification of the second alternate embodiment, the power supplying device may include a first diode connected in parallel with the first switching unit, a second diode connected in parallel with the second switching unit, a third diode connected in parallel with the third switching unit, and a fourth diode connected in parallel with the fourth switching unit. In this case, the first through fourth switching unit may be fabricated of field-effect transistors and the first through fourth diodes may be parasitic diodes of the respective field-effect transistors.

[12.2.3] Third Modification of the Second Alternate Embodiment

In a second alternate embodiment, the power supplying device may include a storage unit for storing power supplied by the first power source line and the second power source line.

[12.2.4] Fourth Modification of the Second Alternate Embodiment

In the second alternate embodiment, the power supplying device may include an alternating current generator unit for generating an alternating current and for supplying a generated voltage to each input terminal.

[12.3] Third Alternate Embodiment

A third alternate embodiment lies in a control method for a power supplying device for full-wave rectifying an alternating current voltage supplied to two input terminals to supply power to the first power source line and the second power source line, including a first switching unit connected between the input terminal and the first power source line, a second switching unit connected between the other input terminal and the first power source line, a first unit, connected between the one input terminal and the second power source line, for allowing a current to flow in one direction only, a second unit, connected between the other input terminal and the second power source line, for allowing a current to flow in one direction only, wherein a first comparison result is obtained by comparing the voltage at the one input terminal with the voltage at the first power source line, a first detection result is obtained by detecting that the voltage difference between the other input terminal and the second power source line is larger than a predetermined reference value, the first switching unit is controlled for an on-and-off operation based on the first comparison result, the first switching unit is forced to turn off based on the first detection result even when the first comparison result indicates that the first switching unit is turned on, a second comparison result is obtained by comparing the voltage at the other input terminal with the voltage at the first power source line, a second detection result is obtained by detecting that the voltage difference between the one input terminal and the second power source line is larger than a predetermined reference value, the second switching unit is controlled for an on-and-off operation based on the second comparison result, and the first switching unit is forced to turn off based on the second detection result even when the second comparison result indicates that the second switching unit is turned on.

[12.4] Fourth Alternate Embodiment

A fourth embodiment lies in a power supplying method for a power supplying device for full-wave rectifying an alternating current voltage supplied to two input terminals to supply power to a first power source line and a second power source line, a first switching unit connected between the one input terminal and the first power source line, a second switching unit connected between the other input terminal and the first power source line, a third switching unit connected between the one input terminal and the second power source line, and a fourth switching unit connected between the other input terminal and the second power source line, wherein a first comparison result is obtained by comparing the voltage at the one input terminal with the voltage at the first power source line, a second comparison result is obtained by comparing the voltage at the other input terminal with the voltage at the first power source line, a third comparison result is obtained by faster comparing the voltage at the one input terminal with the voltage at the second power source line than the comparison operation for determining the first comparison result, the third switching unit is controlled for an on-and-off operation based on the third comparison result, a fourth comparison result is obtained by faster comparing the voltage at the other input terminal with the voltage at the second power source line than the comparison operation for determining the second comparison result, the fourth switching unit is controlled for an on-and-off operation based on the fourth comparison result, the first switching unit is controlled for an on-and-off operation based on the first comparison result, while the first switching unit is forced to turn off when the fourth comparison result indicates that the fourth switching unit is turned off even when the first comparison result indicates that the first switching unit is turned on, and the second switching unit is controlled for an on-and-off operation based on the second comparison result while the second switching unit is forced to turn off when the third comparison result indicates that the third switching unit is turned off even when the second comparison result indicates that the second switching unit is turned on.

[12.5] Fifth Alternate Embodiment

A fifth alternate embodiment includes a power supplying device according to the third modification of the second alternate embodiment, and a processing unit for performing a predetermined process, operated from power supplied by the power supplying device.

[12.6] Sixth Alternate Embodiment

A sixth alternate embodiment includes a power supplying device according to the third modification of the twelfth alternate embodiment, and a time measurement unit for performing a time measurement operation, operated from power supplied by the power supplying device.

What is claimed is:

1. A power supplying device for rectifying an alternating current voltage to supply power to a first power source line and a second power source line, comprising a uni-direction unit comprising two terminals, a comparator for comparing terminal voltages at the two terminals, and a switch means that is controlled for an on-and-off operation in response to a comparison result provided by the comparator, the uni-direction unit allowing a current to flow from one terminal to the other terminal through the switch means, the power supplying device comprising:

a storage device for storing power, arranged between the first power source line and the second power source line, wherein the uni-direction unit starts an operation for turning off the switch means with a duration in advance, corresponding to a response delay time.

2. A power supplying device according to claim 1, wherein the uni-direction unit turns off the switch means when the voltage level at the one terminal drops below a voltage level which is the sum of the voltage at the other terminal and a predetermined voltage.

3. A power supplying device for rectifying an alternating current voltage to supply power to a first power source line and a second power source line, comprising a plurality of uni-direction units, each uni-direction unit comprising two terminals, a comparator for comparing terminal voltages at the two terminals, and a switch that is controlled for an on-and-off operation in response to a comparison result provided by the comparator, each uni-direction unit allowing a current to flow from one terminal to the other terminal through the respective switch, the power supplying device comprising:

a storage device for storing power, arranged between the first power source line and the second power source line, wherein one terminal of a first uni-direction unit is connected to a first input terminal to which the alternating current voltage is supplied, the other terminal of the first uni-direction unit is connected to the first power source line, one terminal of a second uni-direction unit is connected to a second input terminal to which the alternating current voltage is supplied, the other terminal of the second uni-direction unit is connected to the first power source line, one terminal of a third uni-direction unit is connected to the second power source line, the other terminal of the third uni-direction unit is connected to the first input terminal, one terminal of a fourth uni-direction unit is connected to the second power source line, the other terminal of the fourth uni-direction unit is connected to the second input terminal, and at least two of the four uni-direction units start an operation for turning off the respective switch with a response delay time in advance.

4. A power supplying device according to claim 3, wherein at least two of the four uni-direction units turn off the respective switch when the voltage level at the one terminal drops below a voltage level which is the sum of the voltage at the other terminal and a predetermined voltage.

5. A power supplying device comprising a plurality of uni-direction units, each uni-direction unit comprising two terminals, a comparator for comparing terminal voltages at the two terminals, and a switch that is controlled for an on-and-off operation in response to a comparison result provided by the comparator, the uni-direction unit allowing a current to flow from one terminal to the other terminal through the respective switch, the power supplying device comprising:

a first storage device with one terminal thereof connected to a first input terminal to which an alternating current voltage is supplied, and a second storage device with one terminal thereof connected to a second input terminal to which the alternating current voltage is supplied, wherein one terminal of a first uni-direction unit is connected to the other terminal of the first storage device, and the other terminal of the first uni-direction unit is connected to the first input terminal to which the alternating current voltage is supplied, one terminal of a second uni-direction unit is connected to the other terminal of the second storage device, and the other terminal of the second uni-direction unit is connected to the other terminal of the first storage device, and the first and second uni-direction units start an operation for turning off the respective switch with a duration in advance, corresponding to response delay time.

6. A power supplying device according to claim 5, wherein the first and second uni-direction units turn off the respective switch when the voltage level at the one terminal drops below a voltage level which is the sum of the voltage at the other terminal and a predetermined voltage.

7. A power supplying device according to claim 1 for full-wave rectifying an alternating current voltage supplied to the two terminals to supply power to the first power source line and the second power source line, wherein the switch means comprises:
- a first switch connected between a first input terminal and the first power source line, and
- a second switch connected between a second input terminal and the first power source line, wherein the uni-direction unit comprises:
- a first direction controller, connected between the first input terminal and the second power source line, for allowing a current to flow in one direction only, and
- a second direction controller, connected between the second input terminal and the second power source line, for allowing a current to flow in one direction only, wherein the comparator comprises:
- a first comparator for comparing a voltage at the first input terminal with a voltage at the first power source line, and
- a second comparator for comparing a voltage at the second input terminal with the voltage at the first power source line, and wherein the power supplying device further comprises:
- a first controller which controls the first switch for an on-and-off operation in response to a comparison result provided by the first comparator, while forcing the first switch to turn off in response to the voltage at the second input terminal even when the comparison result provided by the first comparator indicates that the first switch is turned on, and
- a second controller which controls the second switch for an on-and-off operation in response to a comparison result provided by the second comparator, while forcing the second switch to turn off in response to the voltage at the second input terminal even when the comparison result provided by the second comparator indicates that the second switch is turned on.

8. A power supplying device according to claim 1, comprising a diode connected in parallel with the switch means.

9. A power supplying device according to claim 1, wherein the switch means is a field-effect transistor.

10. A power supplying device according to claim 8, wherein the switch means is a field-effect transistor while the diode is a parasitic diode of the field-effect transistor.

11. A power supplying device according to claim 1, wherein the uni-direction unit is integrated on a semiconductor substrate.

12. A power supplying device according to claim 7, wherein the first controller further comprises:
- a first detector for detecting that a voltage difference between the second input terminal and the first power source line becomes larger than a predetermined reference value, and
- a first control unit which controls the first switch for an on-and-off operation in response to the comparison result provided by the first comparator means, while forcing the first switch to turn off in response to a detection result provided by the first detector even when the comparison result provided by the first comparator indicates that the first switch is turned on; and the second controller further comprises:
- a second detector for detecting that a voltage difference between the first input terminal and the first power source line becomes larger than the predetermined reference value, and
- a second control unit which controls the second switch for an on-and-off operation in response to the comparison result provided by the second comparator, while forcing the second switch to turn off in response to the detection result provided by the second detector even when the comparison result provided by the second comparator indicates that the second switch is turned on.

13. A power supplying device according to claim 7, wherein the first direction controller is a third switch means that is controlled for an on-and-off operation in response to the voltage at the first input terminal, and the second direction controller is a fourth switch that is controlled for an on-and-off operation in response to the voltage at the second input terminal.

14. A power supplying device according to claim 7, further comprising a first detector for detecting that a voltage difference between the second input terminal and the first power source line is larger than a predetermined reference value, and a second detector for detecting that a voltage difference between the first input terminal and the first power source line is larger than the predetermined reference value,
wherein the first comparator and the second comparator are supplied with power when the first detector or the second detector means detects the voltage difference larger than the predetermined reference value.

15. A power supplying device according to claim 13, further comprising:
- a first diode connected in parallel with the first switch,
- a second diode connected in parallel with the second switch,
- a third diode connected in parallel with the third switch, and
- a fourth diode connected in parallel with the fourth switch.

16. A power supplying device according to claim 13, wherein the first through fourth switches are respectively field-effect transistors.

17. A power supplying device according to claim 15, wherein the first through fourth switches are respectively field-effect transistors, and the first and second diodes are respectively parasitic diodes of the first and second field-effect transistors.

18. A power supplying device according to claim 3 for full-wave rectifying an alternating current voltage supplied to the two terminals to supply power to the first power source line and the second power source line, wherein the comparator comprises:
- a first comparator for comparing a voltage at the first input terminal with a voltage at the first power source line,
- a second comparator for comparing a voltage at the second input terminal with the voltage at the first power source line,
- a third comparator which compares the voltage at the first input terminal with a voltage at the second power source line and has a response delay time shorter than that of the second comparator, and
- a fourth comparator which compares the voltage at the second input terminal with the voltage at the second power source line, and has a response delay time shorter than that of the first comparator, wherein the respective switches comprise:

a first switch connected between the first input terminal and the first power source line, a second switch connected between the second input terminal and the first power source line, a third switch connected between the first input terminal and the second power source line, and controlled for an on-and-off operation in response to a comparison result provided by the third comparator, and a fourth switch connected between the second input terminal and the second power source line, and controlled for an on-and-off operation in response to a comparison result provided by the fourth comparator, and wherein the power supplying device further comprises:

a first controller which controls the first switch for an on-and-off operation in response to a comparison result provided by the first comparator, while forcing the first switch to turn off when the comparison result provided by the fourth comparator indicates the turning off of the fourth switch even when the comparison result provided by the first comparator indicates that the first switch is turned on, and a second controller which controls the second switch for an on-and-off operation in response to a comparison result provided by the second comparator, while forcing the second switch to turn off when the comparison result provided by the third comparator indicates the turning off of the third switch even when the comparison result provided by the second comparator indicates that the second switch is turned on.

19. A power supplying device according to claim 18, further comprising:

a first detector for comparing the voltage at the second input terminal with the voltage at the second power source line, and a second detector for comparing the voltage at the first input terminal with the voltage at the first power source line, wherein the first through fourth comparators are supplied with power when one of the first detector and the second detector detects power generation.

20. A power supplying device according to claim 13, wherein the first through fourth switches are integrated on a semiconductor substrate.

21. A power supplying device according to claim 5, further comprising:

a first diode connected in parallel with a first switch, and a second diode connected in parallel with a second switch.

22. A power supplying device according to claim 5, wherein each switch is a field-effect transistor.

23. A power supplying device according to claim 5, wherein the first and second switches are respectively field-effect transistors.

24. A power supplying device according to claim 5, wherein each switch is integrated on a semiconductor substrate.

25. A power supplying device according to claim 1, further comprising an alternating current voltage generator for supplying the alternating current voltage.

26. A power supplying method for a power supplying device for rectifying an alternating current voltage to supply power to a first power source line and a second power source line, the power supplying device comprising a plurality of uni-direction units, each uni-direction unit comprising two terminals, a comparator for comparing terminal voltages at the two terminals, and a switching unit that is controlled for an on-and-off operation in response to a comparison result provided by the comparator, each uni-direction unit allowing a current to flow from one terminal to the other terminal through the switching unit, and a storage unit, for storing power, arranged between the first power source line and the second power source line, wherein an operation for turning off the switching unit is started in advance according to a response delay time.

27. A power supplying method for a power supplying device for rectifying an alternating current voltage to supply power to a first power source line and a second power source line, comprising a plurality of uni-direction units, each uni-direction unit comprising two terminals, a comparator for comparing terminal voltages at the two terminals, and a switching unit that is controlled for an on-and-off operation in response to a comparison result provided by the comparator, the uni-direction units allowing a current to flow from one terminal to the other terminal through the switching unit, and a storage unit for storing power, arranged between the first power source line and the second power source line, wherein one terminal of a first uni-direction unit is connected to a first input terminal to which the alternating current voltage is supplied, the other terminal of the first uni-direction unit is connected to the first power source line, one terminal of a second uni-direction unit is connected to a second input terminal to which the alternating current voltage is supplied, the other terminal of the second uni-direction unit is connected to the first power source line, one terminal of a third uni-direction unit is connected to the second power source line, the other terminal of the third uni-direction unit is connected to the first input terminal, one terminal of a fourth uni-direction unit is connected to the second power source line, the other terminal of the fourth uni-direction unit is connected to the second input terminal, wherein an operation for turning off the switching units of at least two of the four uni-direction units is started with a duration in advance corresponding to a response delay time.

28. A power supplying method for a power supplying device comprising a plurality of uni-direction units, each uni-direction unit comprising two terminals, a comparator for comparing terminal voltages at the two terminals, and a switching unit that is controlled for an on-and-off operation in response to a comparison result provided by the comparator, the uni-direction unit allowing a current to flow from one terminal to the other terminal through the switching unit, and a first storage unit with one terminal thereof connected to a first input terminal to which an alternating current voltage is supplied, and a second storage unit with one terminal thereof connected to a second input terminal to which the alternating current voltage is supplied, wherein one terminal of a first uni-direction unit is connected to the other terminal of the first storage unit, the other terminal of the first uni-direction unit is connected to the first input terminal to which the alternating current voltage is supplied, one terminal of a second uni-direction unit is connected to the other terminal of the second storage unit, and the other terminal of the second uni-direction unit is connected to the other terminal of the first storage unit, wherein an operation for turning off the respective switching units for the first and second uni-direction units is started with a duration in advance, corresponding to a response delay time.

29. Portable electronic equipment comprising a power supplying device according to claim 1, and a processor for performing a predetermined process, operated from power supplied by the power supplying device.

30. Portable electronic equipment according to claim 29, wherein at least a portion of the processor means is integrated on a semiconductor substrate.

31. An electronic timepiece comprising a power supplying device according to claim 1, and a time measurer for performing a time measurement operation, operated from power supplied by the power supplying device.

32. An electronic timepiece according to claim 31, wherein at least a portion of the time measurer is integrated on a semiconductor substrate.

* * * * *

UNITED STATES PATENT AND TRADEMARK OFFICE
CERTIFICATE OF CORRECTION

PATENT NO. : 6,324,084 B1
DATED : November 27, 2001
INVENTOR(S) : Teruhiko Fujisawa It is certified that error appears in the above-identified patent and that said Letters Patent is hereby corrected as shown below:

Column 44,
Line 18, after "switch" delete "means"

Column 45,
Line 59, change "claim 5" to -- claim 21 -- and
Line 61, between "transistors" and "." insert -- and the first and second diodes are parasitic diodes of the respective field-effect transistors. --

Column 47,
Line 6, after "processor" delete "means"

Signed and Sealed this

Eighteenth Day of June, 2002

Attest:

JAMES E. ROGAN
Attesting Officer        Director of the United States Patent and Trademark Office